United States Patent [19]

Hayashi

[11] Patent Number: 5,528,515
[45] Date of Patent: Jun. 18, 1996

[54] IMAGE PROOFING APPARATUS FOR GRAVURE PRINTING

[75] Inventor: Motoyasu Hayashi, Kyoto, Japan

[73] Assignee: Dainippon Screen Mfg. Co., Ltd., Kyoto, Japan

[21] Appl. No.: 293,332

[22] Filed: Aug. 22, 1994

[30] Foreign Application Priority Data

Aug. 23, 1993 [JP] Japan .................................. 5-230934
Dec. 9, 1993 [JP] Japan .................................. 5-341462

[51] Int. Cl.⁶ .................................................. B41N 3/03
[52] U.S. Cl. ........................... 364/525; 430/49; 355/239; 355/245
[58] Field of Search .................................. 355/239, 245; 364/514, 525; 101/453, 463.1, 465, 467, 469, 471; 156/905; 430/49, 56, 204

[56] References Cited

FOREIGN PATENT DOCUMENTS

| 0308858 | 9/1988 | European Pat. Off. . |
| 0426113 | 10/1990 | European Pat. Off. . |
| 58-21259 | 4/1983 | Japan . |
| 3-145876 | 6/1991 | Japan . |
| 5-66557 | 3/1993 | Japan . |
| 2077548 | 5/1981 | United Kingdom . |
| 2191655 | 6/1987 | United Kingdom . |

Primary Examiner—Emanuel T. Voeltz
Assistant Examiner—Thomas Peeso
Attorney, Agent, or Firm—Lowe, Price, LeBlanc & Becker

[57] ABSTRACT

Image data of Y, M, C and K color separations received from a layout system through an interface circuit are applied through a color computation circuit to a chemical element adjusting LUT (lookup table). The chemical element adjusting LUT identifies coloring densities based on the image data of the color separations and chemical conditions set through a setter for forming cells. The coloring density of K separation is separated into three chromatic color components which are added to the coloring densities of the three chromatic color separations, taking superposition with the coloring densities of the three chromatic color separations into account. A dot generator determines cell portions and gravure screen wall portions synchronously with the coloring density identifying process. AOMs modulate light beams based on the voltages applied thereto, to expose halftone images. A color proof is obtained for prints to be made with printing cylinders prepared by the conventional gravure system.

17 Claims, 41 Drawing Sheets

FIG. 5A
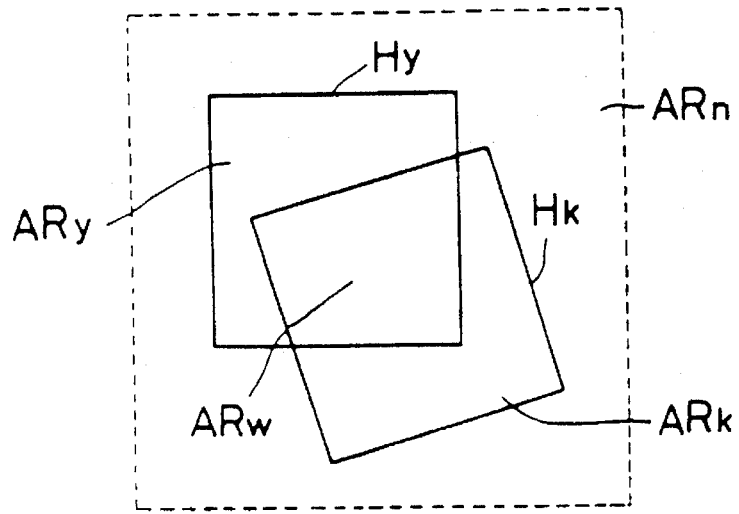
FIG. 5B
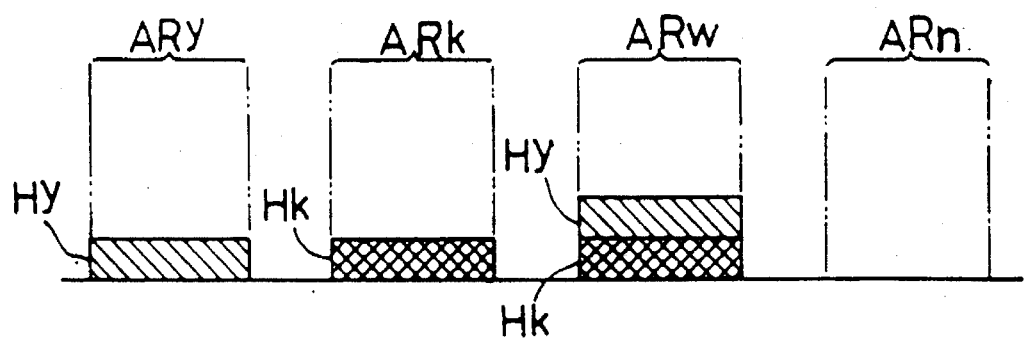
FIG.19A    FIG.19B    FIG.19C
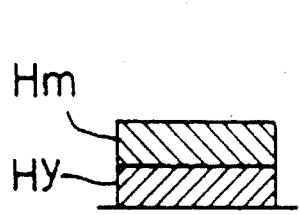 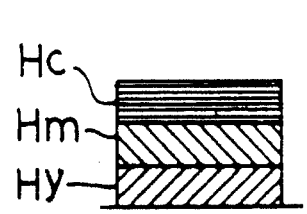 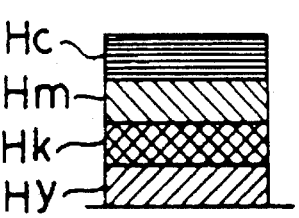

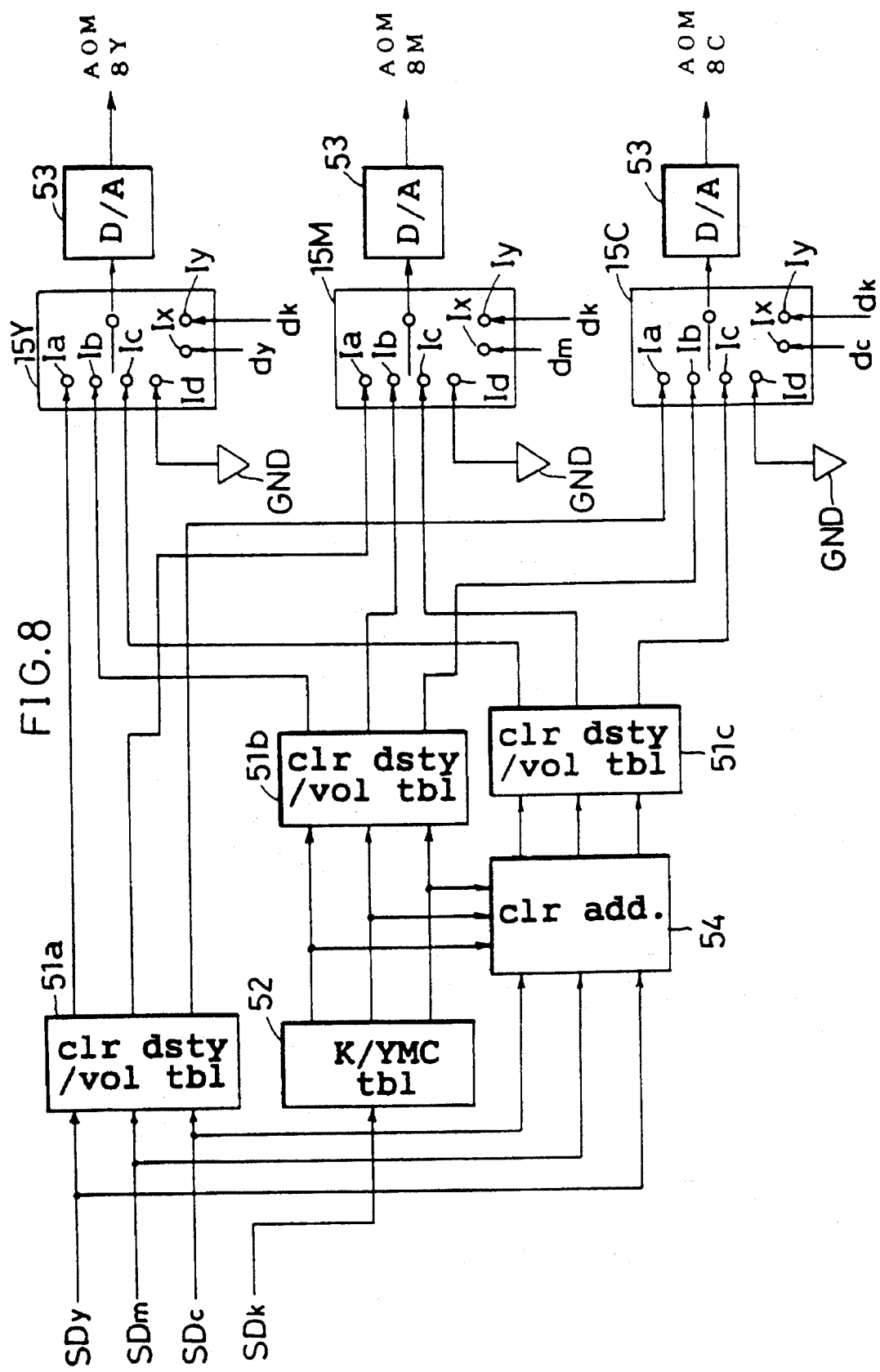

FIG.15A        FIG.15B
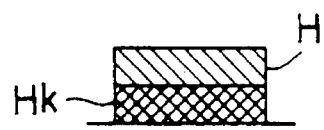
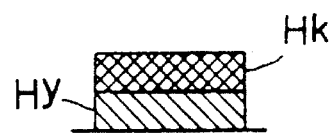
FIG.16A         FIG.16B
Y color pattern     K color pattern
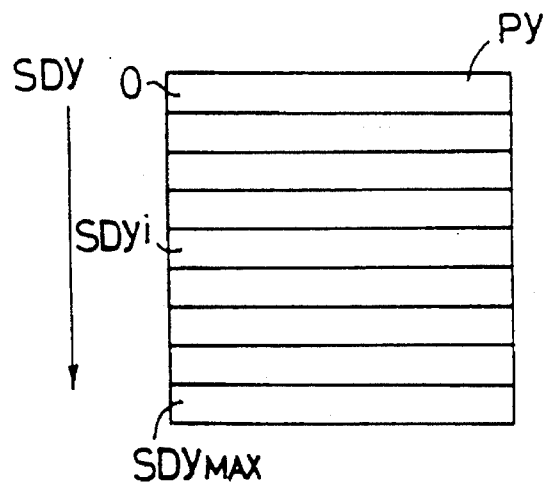
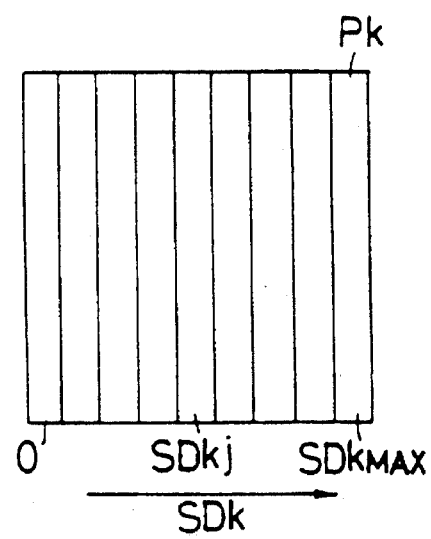
FIG.16C
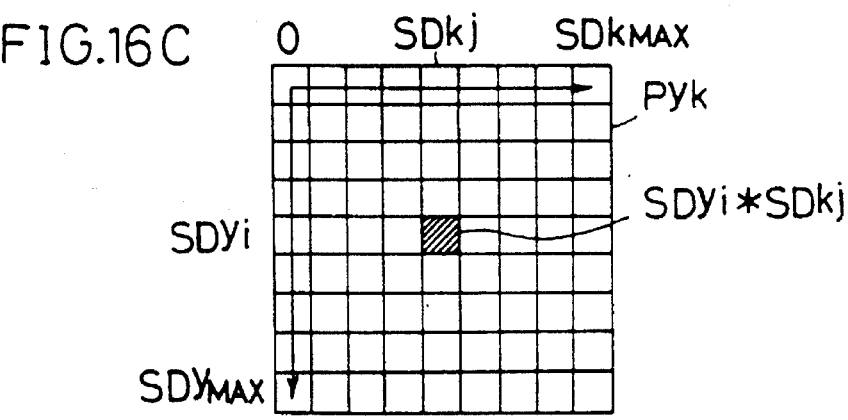

FIG. 35A
FIG. 35C
FIG. 35B
FIG. 35D
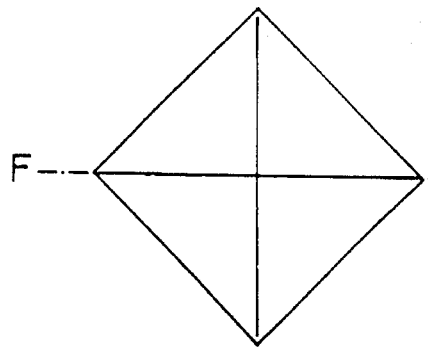
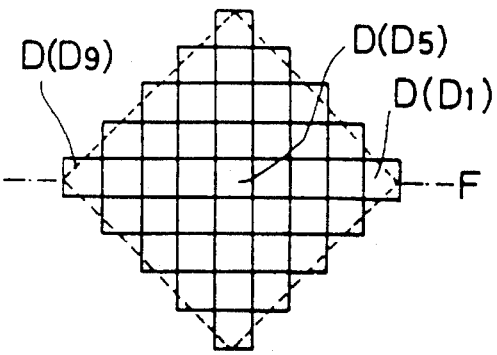
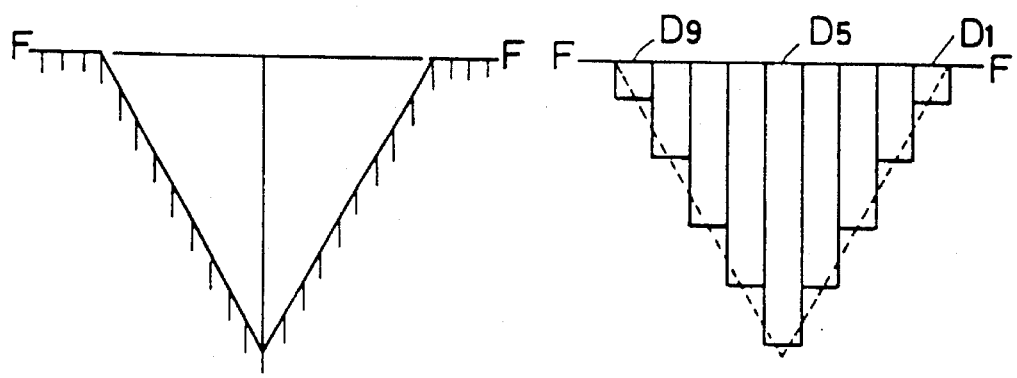
FIG. 39
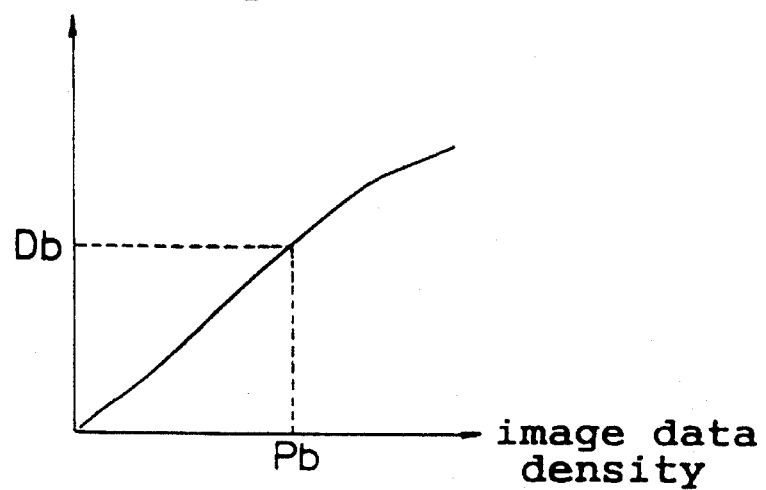

FIG. 37
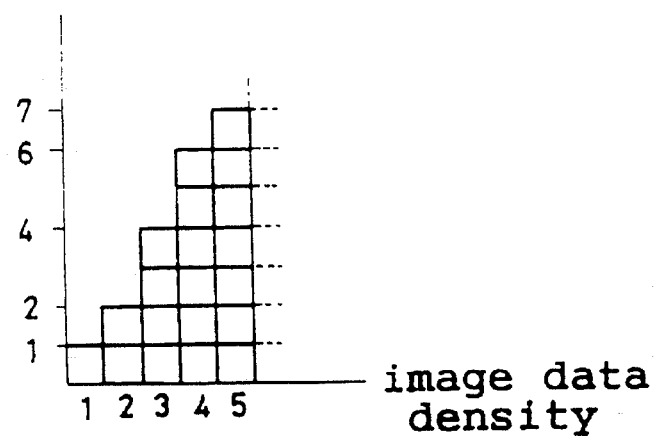
FIG 38
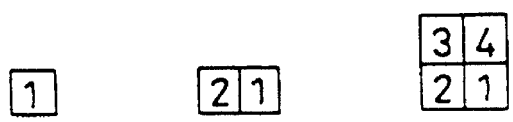
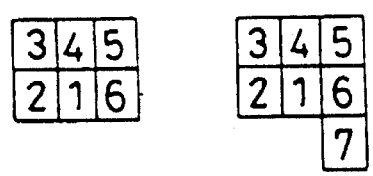
FIG. 40A   FIG. 40B   FIG. 40C
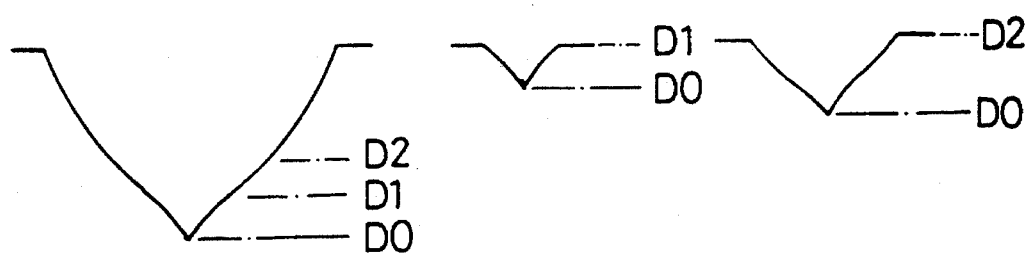

FIG. 50A

|     | (1) | (2) | (3) | (4) | (5) | (6) | (7) | (8) | (9) |
|-----|-----|-----|-----|-----|-----|-----|-----|-----|-----|
| 1st | (1) | (2) | (3) | (4) | (5) | (6) | (7) | (8) | (9) |
| 2nd | (1) | (2) | (3) | (4) | (5) | (6) | (7) | (8) | (9) |
| 3rd | (1) | (2) | (3) | (4) | (5) | (6) | (7) | (8) | (9) |
| 4th | (1) | (2) | (3) | (4) | (5) | (6) | (7) | (8) | (9) |
| 5th | (1) | (2) | (3) | (4) | (5) | (6) | (7) | (8) | (9) |
| 6th | (1) | (2) | (3) | (4) | (5) | (6) | (7) | (8) | (9) |
| 7th | (1) | (2) | (3) | (4) | (5) | (6) | (7) | (8) | (9) |
| 8th | (1) | (2) | (3) | (4) | (5) | (6) | (7) | (8) | (9) |
| 9th | (1) | (2) | (3) | (4) | (5) | (6) | (7) | (8) | (9) |

FIG. 50B

|     | (1) | (2) | (3) | (4) | (5) | (6) | (7) | (8) | (9) |
|-----|-----|-----|-----|-----|-----|-----|-----|-----|-----|
| 1st | (1) | (2) | (3) | (4) | (5) | (6) | (7) | (8) | (9) |
| 2nd | (1) | (2) | (3) | (4) | (5) | (6) | (7) | (8) | (9) |
| 3rd | (1) | (2) | (3) | (4) | (5) | (6) | (7) | (8) | (9) |
| 4th | (1) | (2) | (3) | 3 (4) | 4 (5) | 5 (6) | (7) | (8) | (9) |
| 5th | (1) | (2) | (3) | 2 (4) | 1 (5) | 6 (6) | (7) | (8) | (9) |
| 6th | (1) | (2) | (3) | (4) | (5) | 7 (6) | (7) | (8) | (9) |
| 7th | (1) | (2) | (3) | (4) | (5) | (6) | (7) | (8) | (9) |
| 8th | (1) | (2) | (3) | (4) | (5) | (6) | (7) | (8) | (9) |
| 9th | (1) | (2) | (3) | (4) | (5) | (6) | (7) | (8) | (9) |

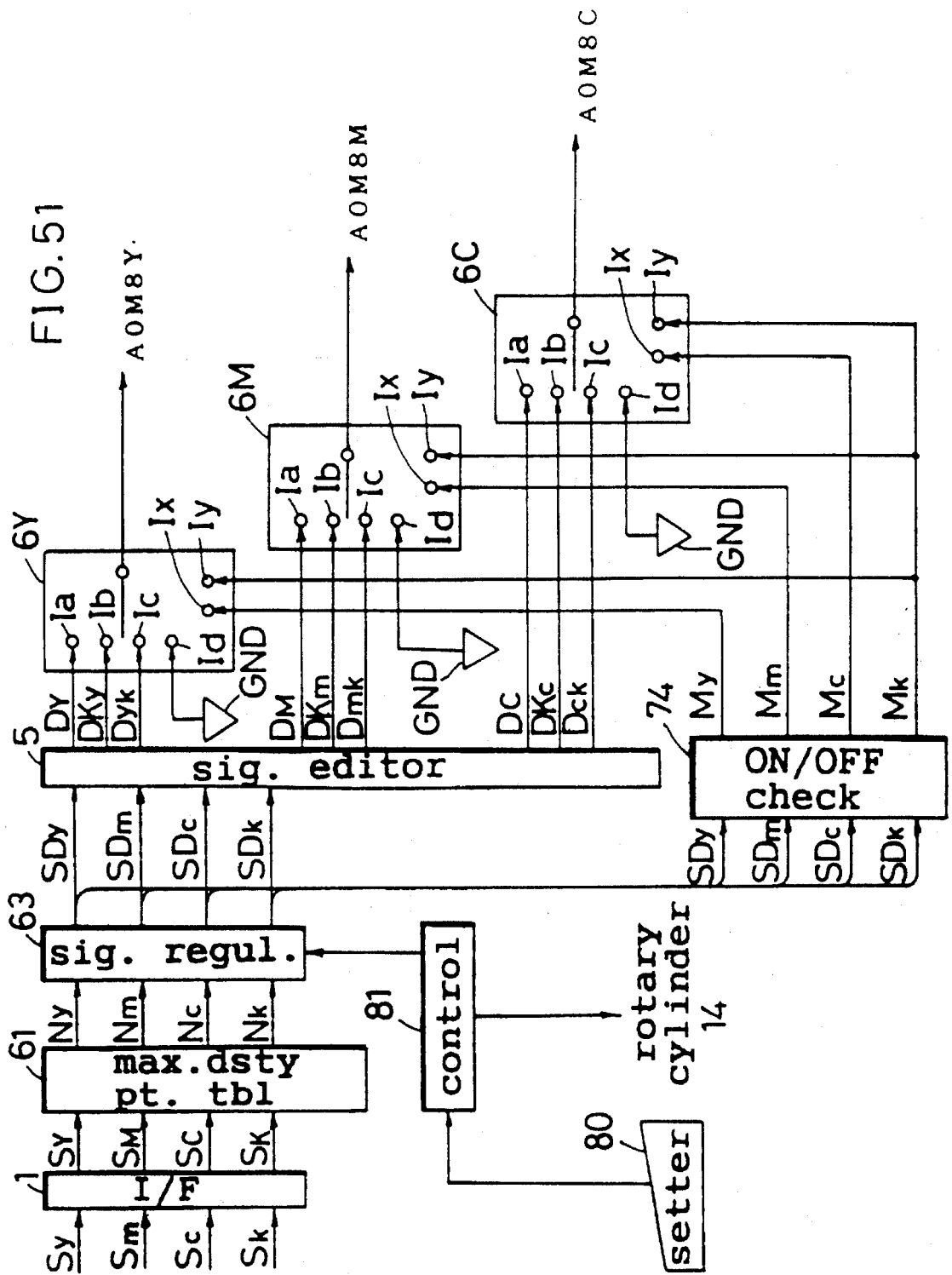

IMAGE PROOFING APPARATUS FOR GRAVURE PRINTING

BACKGROUND OF THE INVENTION (1) Field of the Invention

This invention relates to image proofing apparatus for use in gravure printing, in which halftone images with coloring densities adjusted according to conditions for forming cells on a gravure cylinder are exposed in cell patterns on a photosensitive material mounted on the cylinder to record a proof image on the photosensitive material.

(2) Description of the Related Art

In gravure printing, gravure ink is filled into minute depressions called cells which are formed in an orderly pattern on a printing cylinder, and the ink is transferred onto printing paper or the like. Density tones of prints are expressed by the varying depth and/or area of the cells.

Known techniques of making gravure plates for preparing such printing cylinders include the conventional gravure system, halftone gravure system and electronic engraving system. The features of these systems will be described hereinafter.

<(1) Conventional Gravure System>

This system expresses density tones by varying the cell depth while maintaining the cell area constant. In this system, a continuous tone positive and a gravure screen with an overall screen pattern are successively exposed to carbon tissue whose rate of permeation by an etching solution is variable with exposure. Subsequently, the carbon tissue is transferred onto a cylinder, and passed through developing and etching steps, to form on the cylinder cells having depths corresponding to the density tones of the continuous tone positive. The boundaries of the respective cells formed on the cylinder are in form of gravure screen walls for preventing ink leakage.

<(2) Halftone Gravure System>

This system includes a procedure for expressing density tones by varying the cell area while maintaining the cell depth constant (also called the direct gravure system), and a procedure for expressing density tones by varying both the cell depth and cell area (e.g. the two-positive system). In the former, a photosensitive solution is applied to a cylinder, and a halftone gravure positive is placed and exposed on the cylinder. After the developing and etching steps, the cylinder has formed thereon cells having areas corresponding to the halftone areas of the halftone gravure positive. In the latter, a continuous tone positive and a halftone gravure positive are successively placed and exposed on carbon tissue. After the transfer, developing and etching steps as in the conventional gravure system, the cylinder has formed thereon cells having depths corresponding to the density tones of the continuous-tone positive and areas corresponding to the halftone areas of the halftone gravure positive.

Further, Japanese Patent Publication (Examined) No. 1983-21259 (Japanese Patent Publication (Unexamined) No. 1975-26603) discloses an offset/gravure conversion technique one example of which is known as the TH gravure system. This is one of the systems which express density tones by varying the cell depth and cell area. In this system, a gravure screen with an overall screen pattern is placed and exposed on carbon tissue, and then a diffusion sheet and a halftone offset positive are placed and exposed. After the transfer, developing and etching steps as in the conventional gravure system, the cylinder has formed thereon cells having areas corresponding to the halftone areas of the halftone offset positive and depths produced by action of the diffusion sheet.

<(3) Electronic Engraving System>

This system expresses density tones by cell depths engraved according to engraving depths and by area variations corresponding thereto. A cutting tool called stylus is used to engrave in a printing cylinder cells having depths corresponding to image signals.

In color gravure printing, a printing cylinder is prepared for each of Y (yellow), M (magenta), C (cyan) and K (black) separations by one of the above platemaking systems. The cylinders are used to press the respective color separations successively on paper to print an image.

It is a normal printing procedure to prepare a proof prior to production in order to confirm quality of final prints.

In gravure printing, density tones in prints are expressed by the varying depth and/or area of the cells formed on the printing cylinder as noted above. In the conventional gravure system and halftone gravure system, the cells are formed through the exposing, developing and etching steps. Consequently, two cylinders produced at different etching times, for example, have different cell depths even if the same continuous tone positive and halftone positive are used, with the result that prints produced with these cylinders are different in finish. A print of the same finish is desirable as a proof used to confirm quality of final prints. Generally, therefore, a proof is printed by using the cylinder or cylinders intended for final production printing or by using a small cylinder or cylinders prepared specially for printing the proof.

However, where a proof is printed by using the cylinder or cylinders intended for final production printing, the cylinder or cylinders must be prepared all over again unless the proof printed is satisfactory in finish. This involves additional trouble and cost. Further, preparation of the small cylinder or cylinders specially for printing a proof is also troublesome and costly.

According to the TH gravure system, which alleviates the above drawback, a proof may be prepared by offset printing using the halftone offset positive intended for use in preparing a cylinder or cylinders for final production printing. However, density variations based on cell depths are not reflected in the proof thus prepared, failing to secure sufficient quality.

In the electronic engraving system, a proof must be printed by using a cylinder or cylinders prepared for production printing since a different type of stylus engraves cells of a different configuration on the cylinder or cylinders. This involves trouble and cost for the same reason as noted above. A proof may be prepared by offset printing where a halftone offset positive is used in preparing a cylinder. In this case, however, sufficient quality cannot be obtained as in the TH gravure system noted above.

The above problem may be solved by a color image proofing apparatus as proposed by Applicant in Japanese Patent Publication (Unexamined) No. 1993-66557, for example.

This apparatus produces a color-corrected image on a color sensitive material while adjusting transmitted light quantities of B (blue), G (green) and R (red) beams with voltages applied to acousto-optic modulators based on Y, M, C and K image data derived from color separation of a color original. Thus, the color-corrected image produced has density tones. The apparatus may be applied to proofing of gravure printing expressing density tones. According to this apparatus, therefore, the above problem may be solved in that printing finishes may be confirmed by using a proof image reproduced on a photosensitive material.

However, the prior color image proofing apparatus has the following disadvantages.

In gravure printing, density tones of prints are expressed by variations in the area and/or depth of the cells formed on cylinders as noted hereinbefore. The cell area and depth are variable with conditions for forming the cells in actual gravure platemaking, such as exposure time, etching time and the like in the conventional gravure system and halftone gravure system, and the type of stylus and the like in the electronic engraving system. Even when the same plate is used, the cylinders prepared have different cell depths or the like under different cell-forming conditions. The cylinders having the different cell depths produce prints of different finishes.

However, the prior color image proofing apparatus adjusts transmitted light quantities of R, G and B beams based only on density values of plates, without taking into account the cell-forming conditions (i.e. chemical conditions, the type of stylus, and so on) for preparing cylinders for final production printing. Consequently, proof images obtained from the same plate always have the same finish. That is, in gravure printing in which the same plate produces prints of different finishes if the cell-forming conditions are different, the proof images prepared with the prior color image proofing apparatus do not necessarily have the same finish as final production prints. Thus, the prior apparatus does not always enable an accurate confirmation of finished states of prints.

Further, in portions of prints where the color separations overlap one another, density is lower than a simple sum of densities of the color separations superposed. That is, an additivity failure occurs in such portions. With the color image proofing apparatus, which prints halftone images on a photosensitive material, the additivity failure is negligible for practical purposes for dots exposed by superposing light beams on the photosensitive material in corresponding relations to the portions of prints where the color separations overlap one another. Thus, exposure light quantities of B, G and R beams are determined from the image data of the respective color separations, and for the portions of prints where the color separations overlap one another, each point on the photosensitive material is superposed and exposed with the exposure light quantities of the beams determined. In this case, density is greater at that point than the density of production prints corresponding to that point by the additivity failure occurring in the production prints.

However, the prior color image proofing apparatus is not devised to cope with the above additivity failure occurring in gravure printing. Consequently, a color proof prepared does not present, in the portions where the color separations overlap one another, a faithful reproduction of final production printing. Such a proof is not satisfactory.

SUMMARY OF THE INVENTION

The present invention has been made having regard to the state of the art noted above. A primary object of the invention, therefore, is to provide an image proofing apparatus for gravure printing, which enables a gravure printing proof to be created accurately on a photosensitive material according to conditions for forming cells on a printing cylinder or cylinders for final production printing.

Another object of the present invention is to provide an image proofing apparatus for gravure printing, which compensates for the additivity failure in superposed portions of prints, thereby to create a color gravure printing proof faithfully on a photosensitive material.

The above objects are fulfilled, according to the present invention, by an image proofing apparatus for gravure printing, in which halftone images with coloring densities adjusted according to conditions for forming cells on a gravure cylinder are exposed on a photosensitive material in cell patterns on the cylinder to record a proof image on the photosensitive material, the apparatus comprising:

light sources for emitting light beams to expose the halftone images on the photosensitive material;

a light quantity modulating device for modulating quantities of the light beams;

a coloring density identifying device for identifying coloring densities of the halftone images according to conditions for forming cells on the gravure cylinder;

a modulating information identifying device for identifying, according to the coloring densities, modulating information to be applied to the light quantity modulating device; and an exposure control device for causing the light beams modulated by the light quantity modulating device based on the modulating information to expose the halftone images on the photosensitive material in the cell patterns on the gravure cylinder.

With this apparatus, the coloring density identifying device identifies coloring densities of the halftone images according to conditions for forming cells on the gravure cylinder, so that the halftone images constitute a proof image with finish corresponding to production prints. The cell forming conditions include exposure time, etching time and a type of stylus, for example. Based on the coloring densities identified by the coloring density identifying device, the modulating information identifying device identifies modulating information to be applied to the light quantity modulating device. The exposure control device causes the light beams modulated by the light quantity modulating device based on the modulating information supplied from the modulating information identifying device, to expose the halftone images on the photosensitive material in the cell patterns on the gravure cylinder. Consequently, a proof image is created on the photosensitive material, with the halftone images exposed thereon in the cell patterns and with the coloring densities corresponding to the density tones of the respective cells. The proof image has the same finish as production prints. Since the proof image is created on the photosensitive material, the finish of prints may be confirmed prior to preparation of production printing cylinders. This eliminates the wasteful procedure of preparing production cylinders all over again.

The above apparatus may further comprise a density distributing device for distributing a coloring density of an achromatic K (black) separation to coloring densities of chromatic Y (yellow), M (magenta) and C (cyan) separations, wherein:

the light sources are operable to emit light beams of B (blue), G (green) and R (red) which are complementary colors of the three chromatic colors;

the light quantity modulating device is operable to modulate the light beams of R, G and B;

the coloring density identifying device is operable to identify the coloring densities of halftone images of the three chromatic and one achromatic color separations according to conditions for forming cells on gravure cylinders for the three chromatic and one achromatic color separations;

the modulating information identifying device is operable to identify, according to the coloring densities of the three chromatic color separations identified by the coloring density identifying device with the coloring density of the achromatic color separation distributed by the density distributing device, modulating information on the three chromatic color separations to be applied to the light quantity modulating device; and the exposure control device is operable to cause the light beams of B, G and R modulated by the light quantity modulating device based on the modulating information to expose the halftone images on the photosensitive material in cell patterns on the gravure cylinders for the three chromatic and one achromatic color separations;

whereby a color proof image for color gravure printing is recorded on the photosensitive material.

The above apparatus for creating a color proof may further comprise a coloring density adjusting device for decreasing the coloring densities identified by the coloring density identifying device to expose halftone positions (dots) corresponding to areas of superposition of the color separations, by amounts of density lowered by additivity failure occurring with the superposition of the color separations. With this construction, the coloring densities for exposing the dots corresponding to superposed portions of production prints are in substantially the same level as the densities influenced by the additivity failure occurring in the superposed portions of the production prints. Thus, the color proof image created faithfully expresses the densities of the production prints including those of the portions where the color separations are superposed. This color proof image has the same finish as the production prints.

The various devices in the apparatus for compensating for the additivity failure may be constructed as follows:

The coloring density adjusting device is operable to decrease coloring density of one of the Y, M and C separations superposed on the K separation when exposing dots corresponding to areas of superposition of a chromatic color separation (i.e. at least one of Y, M and C separations) on the K separation, by an amount of density lowered by additivity failure occurring with the superposition of the one of the Y, M and C separations on the K separation, and to decrease coloring density of the K separation when exposing dots corresponding to areas of superposition of the K separation on the chromatic color separations, by an amount of density lowered by additivity failure occurring with the superposition of the K separation on one of the Y, M and C separations.

The density distributing device comprises:

a K/YMC conversion device for converting the coloring density of the K separation into chromatic Y, M and C components; and a color adding device for adding coloring densities of the Y, M and C separations including the coloring density of one of the Y, M and C separations adjusted by the coloring density adjusting device, and coloring densities of the Y, M and C components of the K separation converted by the K/YMC conversion device, for dots corresponding to areas of superposition of the chromatic color separations on the K separation, and adding coloring densities of the Y, M and C components converted by the K/YMC conversion device from the coloring density of the K separation adjusted by the coloring density adjusting device, and the coloring densities of the Y, M and C separations, for dots corresponding to areas of superposition of the K separation on the chromatic color separations.

The exposure control device is operable to expose the photosensitive material with the densities added by the color adding device, for the dots corresponding to the areas of superposition of K separation and the chromatic color separations.

With this type of color image proofing apparatus, since the photosensitive material is exposed with R, G and B light beams, the coloring density of K separation is converted into Y, M and C components to express K separation with Y, M and C, and the photosensitive material is exposed for portions where K separation is printed, with the coloring densities of Y, M and C components converted from K separation. Where K separation and at least one of Y, M and C separations are superposed, the photosensitive material is exposed with coloring densities combining the coloring densities of Y, M and C components converted from K separation and the coloring density of the color separation superposed with K separation. In such an adding process (for superposition of achromatic K separation and a chromatic color), according to the present invention, the coloring densities added are decreased by an amount corresponding to densities lowered by the additivity failure. Consequently, the densities of production prints are faithfully expressed where the chromatic and achromatic colors are superposed.

The color adding device adds coloring densities of Y, M and C separations including the coloring density of the chromatic color separation adjusted by the coloring density adjusting device, and coloring densities of Y, M and C components converted by the K/YMC conversion device, for dots corresponding to areas of superposition of the chromatic colors on the achromatic color, and adds the coloring densities of Y, M and C components converted by the K/YMC conversion device from the coloring density of the K separation adjusted by the coloring density adjusting device, and the coloring densities of the chromatic color separations, for dots corresponding to areas of superposition of the achromatic color on the chromatic colors. The exposure control device exposes the photosensitive material with the densities of Y, M and C separations added by the color adding device, for the dots corresponding to the areas of superposition of the chromatic colors and the achromatic color.

The color image proofing apparatus having this construction is capable of compensating for the additivity failure occurring particularly in the areas of superposition of the chromatic colors and achromatic color.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

FIGS. 5A and 5B are views used for explaining superposition of Y separation and K separation.

FIG. 8 is a block diagram of a modified principal portion of the apparatus in the first embodiment.

FIGS. 15A and 15B are views used for explaining an additivity failure occurring in superposed printing.

FIGS. 16A through 16C are views illustrating a method of preparing a gravure print for checking the additivity failure.

FIGS. 19A through 19C are views used for explaining a principle of compensating for additivity failure between chromatic colors.

FIGS. 35A through 35D are views showing a relationship between shape of a cell engraved in a cylinder and dot matrix.

FIG. 37 is a view showing a relationship between density of image data and number of dots forming a dot matrix.

FIG. 38 is a view showing an example of dot matrix arrangement.

FIG. 39 is a view showing a relationship between density of image data and maximum density.

FIGS. 40A through 40C are views showing a shape of a cell engraved.

FIGS. 50A and 50B are views used for explaining allotment of a dot matrix to beam numbers.

FIG. 51 is a block diagram of a color image proofing apparatus in an eleventh embodiment of the present invention.

DETAILED DESCRIPTION OF THE PREFERRED EMBODIMENTS

Preferred embodiments of the present invention will be described in detail hereinafter with reference to the drawings.

First Embodiment

A first embodiment of the present invention will be described with reference to FIGS. 1 and 2.

The apparatus in the first embodiment is used to create a color proof image on a photosensitive material (negative) for prints to be made with printing cylinders prepared by the conventional gravure system.

Figure 1:
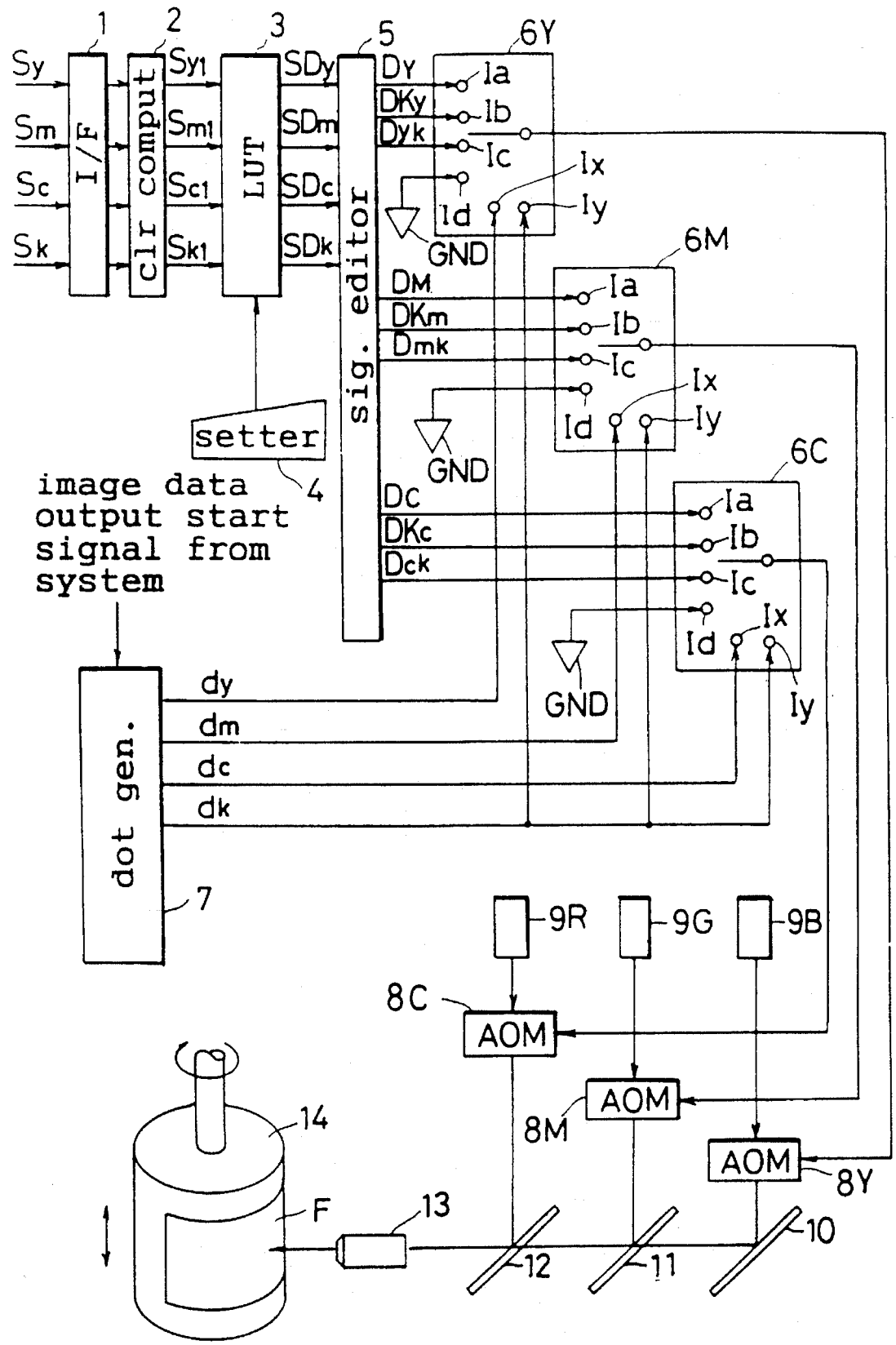
FIG. 1 is a block diagram of a color image proofing apparatus in a first embodiment of the present invention.

Reference is made to FIG. 1. The apparatus receives through an interface circuit (I/F) 1, and applies to a color computation circuit (clr comput.) 2, image data Sy, Sm, Sc and Sk of color separations derived from color image data (i.e. data obtained by color-separating a color image) including picture patterns, diagrams, characters and the like and stored in a layout system not shown. In this embodiment, the image data Sy, Sm, Sc and Sk received by the apparatus have the same density tones as in a continuous tone positive used in preparing printing cylinders for final production printing.

The color computation circuit 2 effects a color correction and tone correction to establish an agreement in color tone between the color proof produced with this apparatus and final production prints. The color correction and tone correction are based on corrections obtained by experimentation. Image data Sy1, Sm1, Sc1 and Sk1 corrected by the color computation circuit 2 are applied to a lookup table (LUT) 3 for chemical element adjustment.

The LUT 3 determines coloring densities of halftone images constituting the proof created according to conditions for forming cells on the production printing cylinders.

The cells formed on the cylinders have depths basically dependent on the density tones of the continuous tone positive. The cell depths actually produced according to the density tones of the positive vary with chemical conditions such as exposure time and etching time. A light portion of the positive, for example, has a small cell depth (e.g. 0.04 mm) if etching time is short, and a large cell depth (e.g. 0.08 mm) if etching time is long, although the density is the same.

Figure 3A:
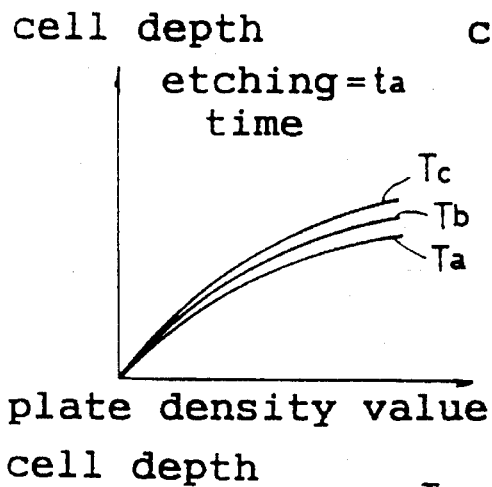
FIGS. 3A through 3C are views showing relationships between density in a positive and depth of cells formed.
Figure 3B:
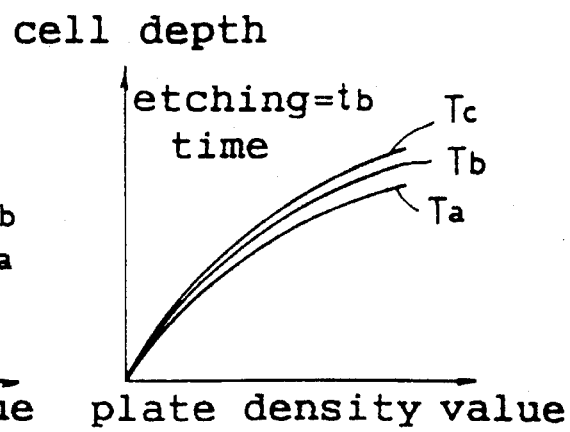
Figure 3C:
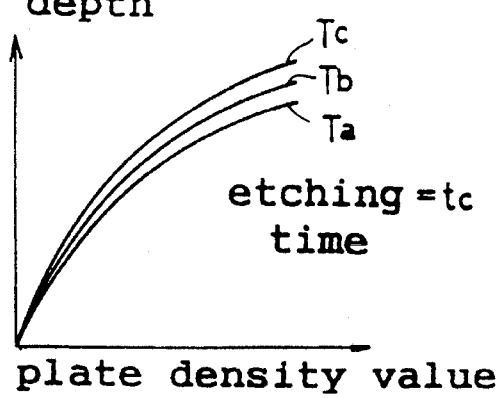

Examples of this relationship are shown in FIGS. 3A through 3C. These figures are graphic representations showing the density of the positive and the depth of cells formed varying with the chemical conditions (etching time and exposure time in these drawings). FIG. 3A shows cell depths formed according to the density of the positive in etching time "ta" and exposure times "Ta", "Tb" and "Tc" (Ta>Tb>Tc) FIGS. 3B and 3C show cell depths formed according to the density of the positive in etching times "tb" and "tc", respectively, and exposure times "Ta", "Tb" and "Tc". In the above examples, ta<tb<tc.

Figure 4:
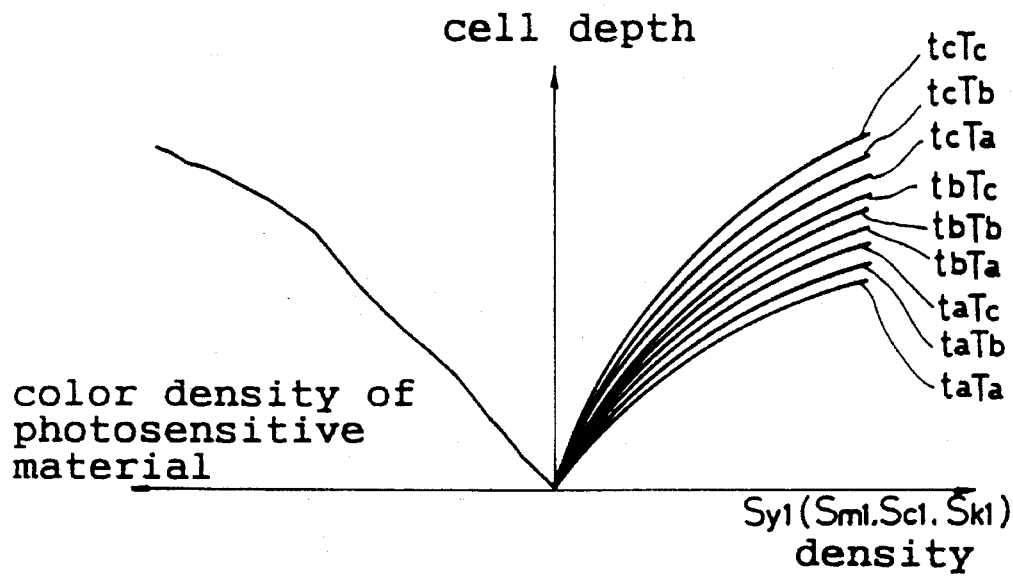
FIG. 4 is a view showing relationships among image data, cell depth and coloring density.

This relationship as applied to the apparatus in this embodiment is depicted in FIG. 4.

FIG. 4 shows what relationships coloring densities on a photosensitive material F should form with the density of data Sy1 (Sm1, Sc1 or Sk1) corrected by the color computation circuit 2 and the cell depth. The curves in the righthand half of FIG. 4 represent the relationship of the cell depth to the density of data Sy1 varying with the chemical conditions as in FIGS. 3A through 3C. Once the cell depth is determined, a relationship between the cell depth and the coloring density on the photosensitive material F is unequivocally determined so as to correspond to a relationship between the cell depth and the density of final production prints. The curve in the left half represents this relationship between the cell depth and the coloring density on the photosensitive material F. In FIG. 4, reference "taTa" denotes a curve determining a relationship between data Sy1 and cell depth where etching time is "ta" and exposure time is "Ta". The other curves are referenced likewise.

The chemical element adjusting LUT 3 is a table of relationships as shown in FIG. 4 determined according to chemical conditions. The chemical conditions include exposure time during an exposure process, density of an etching solution used and etching time during an etching process, temperature, humidity and so on. These chemical conditions are set through a setter 4 according to chemical conditions for forming cells on the cylinders for final production printing. The chemical element adjusting LUT 3 determines coloring densities from the densities of data Sy1, Sm1, Sc1 and Sk1 according to the chemical conditions set, and outputs the coloring densities.

In this embodiment, the densities of data Sy1, Sm1, Sc1 and Sk1 and the chemical conditions applied to the chemical element adjusting LUT 3 correspond to the cell forming conditions according to the present invention. The chemical element adjusting LUT 3 corresponds to the coloring density identifying device of the present invention. The interface circuit 1 and setter 4 correspond to the input device of the present invention. The chemical element adjusting LUT 3 corresponds also to the conversion table of the present invention.

Coloring densities SDy, SDm, SDc and SDk identified by the LUT 3 are applied to a signal editing circuit (sig. editor) 5. The signal editing circuit 5 plays the following role. The color photosensitive material F used in this embodiment is a negative material having such a property that, when exposed to light of three wavelength components, B, G and R, their respective complementary colors, Y, M and C, are expressed. On the other hand, production prints are made in superposition by cylinders of Y, M, C and K color separations. Thus, it is necessary with this apparatus to prepare a proof image by expressing the coloring density of K separation in the respective coloring densities of Y, M and C.

By way of example, expression of the coloring density of K separation in Y separation is considered with reference to FIGS. 5A and 5B.

It is assumed that, as illustrated, a print having Y separation Hy and K separation Hk printed in superposition includes an area ARy where only Y separation is printed, an area ARk where only K separation is printed, an area ARw where Y separation and K separation are superposed, and an area ARn where neither Y separation nor K separation is printed. Based on this printing mode, the signal editing circuit 5 converts the coloring density of K separation into three color data of Y, M and C, and creates data only for Y separation, data for only Y component of K separation, and data combining the data for Y separation and the data for Y component of K separation. For M separation and C separation, necessary data are created likewise by taking into account their superposition with M component and C component of K separation and other conditions. This technique is disclosed in Japanese Patent Publication (Unexamined) No. 1991-145876.

A specific construction of the signal editing circuit 5 will be described with reference to FIG. 2.

Coloring densities SDy, SDm and SDc of Y, M and C separations among the coloring densities SDy, SDm, SDc and SDk identified by the chemical element adjusting LUT 3 are applied to a coloring density-to-voltage conversion table (clr dsty/vol tbl) 51a for conversion into voltages corresponding to the coloring densities, i.e. voltages to be applied to acousto-optic modulators (AOMs) described hereinafter. Coloring density SDk of K separation is applied to a K/YMC conversion table 52 for conversion into coloring densities of Y, M and C components of K separation.

A relationship between coloring density and voltage application to AOMs will be described with reference to FIG. 6.

Figure 6:
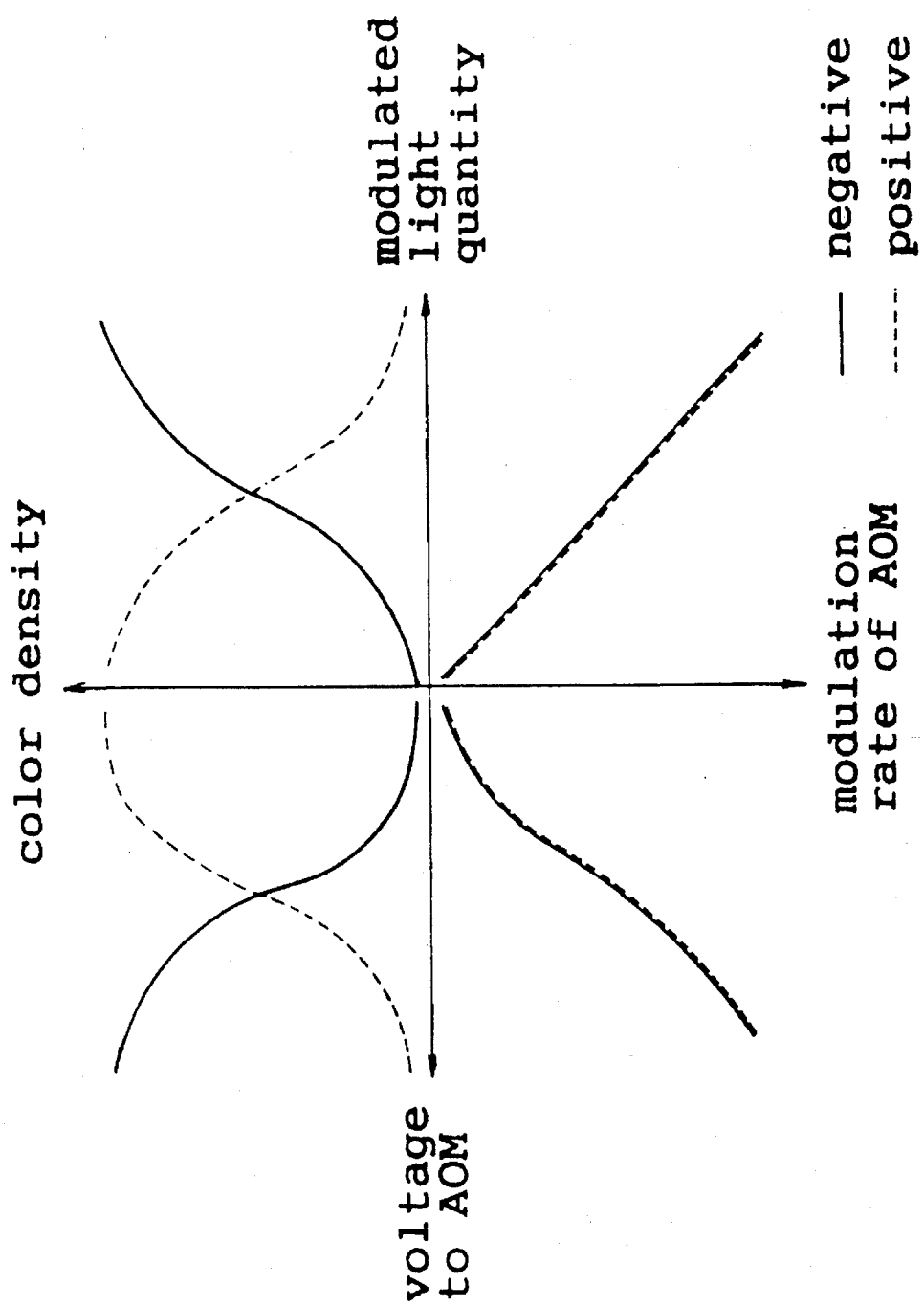
FIG. 6 is a view showing a relationship between coloring density and voltage application to AOMs.

FIG. 6 shows, in solid lines, relationships among voltage application to AOMs, modulation rate of the AOMs, modulated light quantity of the AOMs and coloring density of the photosensitive material where the color photosensitive material F is a negative. The modulated light quantity and coloring density are known as γ-characteristics of the photosensitive material. The relationship of voltage application to the AOMs to the coloring density of the photosensitive material shown in the second quadrant in FIG. 6 may be derived from the relationships shown in the first, third and fourth quadrants.

The coloring density-to-voltage conversion table 51a is a table of the relationships of voltage application to the AOMs to the coloring densities derived as above. Data outputted from the coloring density-to-voltage conversion table 51a are applied to digital-to-analog (D/A) converters 53 for conversion into analog signals, respectively. As a result, the signal editing circuit 5 outputs applied voltage signal DY for Y separation, applied voltage signal DM for M separation, and applied voltage signal DC for C separation. These signals DY, DM and DC are inputted to input terminals Ia of multiplexers 6Y, 6M and 6C, respectively, as shown in FIG. 1. These signals DY, DM and DC are used in preparing the proof image as data for creating the area of Y separation (ARy in FIGS. 5A and 5B) and similar areas of M separation and C separation set apart from K separation, respectively.

In this embodiment, the voltages applied to the AOMs correspond to the modulating information according to the present invention. The coloring density-to-voltage conversion table 51a and coloring density-to voltage conversion tables (clr dsty/vol tbls) 51b and 51c described hereinafter correspond to the modulating information identifying device of the present invention.

The K/YMC conversion table 52 converts coloring density SDk of K separation into coloring densities Ky, Km and Kc of Y, M and C components. This conversion mode is determined by a CMY/CMYK conversion mode in the layout system which supplies image data Sy, Sm, Sc and Sk of Y, M, C and K separations to this apparatus. The layout system reads RGB signals from a color original, converts the RGB signals into YMC signals, and outputs the YMCK signals converted from the YMC signals. Thus, the K/YMC conversion table 52 is a table for converting the K signal into YMC signals by a conversion mode reversed from the YMC/YMCK conversion mode of the layout system. Output data Ky, Km and Kc of the K/YMC conversion table 52 are applied to the coloring density-to-voltage conversion table 51b and a color adding circuit (clr add.) 54.

The coloring density-to-voltage conversion table 51b is similar in construction to the coloring density-to-voltage conversion table 51a described above. Output data of the coloring density-to-voltage conversion table 51b are applied to respective D/A converters 53 for conversion into analog signals. As a result, the signal editing circuit 5 outputs applied voltage signal DKy for Y component of K separation, applied voltage signal DKm for M component of K separation, and applied voltage signal DKc for C component of K separation. These signals DKy, DKm and DKc are inputted to input terminals Ib of multiplexers 6Y, 6M and 6C, respectively, as shown in FIG. 1. These signals DKy, DKm and DKc are used in preparing the proof image as data for creating areas of only K separation (such as area ARk in FIGS. 5A and 5B) in Y separation, M separation and C separation, respectively.

The color adding circuit 54 receives output data Ky, Km and Kc of the K/YMC conversion table 52 as well as coloring densities SDy, SDm and SDc of Y, M and C separations. In this circuit, data Ky is added to density SDy, data Km to density SDm, and data Kc to density SDc. That is, coloring density Ky of Y component obtained by color-separating K separation by the K/YMC conversion table 52 is added to coloring density SDy of Y separation, coloring density Km of M component obtained by color-separating K separation is added to coloring density SDm of M separation, and coloring density Kc of C component obtained by color-separating K separation is added to coloring density SDc of C separation.

Output data of the color adding circuit 54 are applied to the coloring density-to-voltage conversion table 51c (similar in construction to the coloring density-to-voltage conversion table 51a described above) for conversion to voltages corresponding to the respective coloring densities. The voltages are applied to respective D/A converters 53 for conversion into analog signals. As a result, the signal editing circuit 5 outputs applied voltage signal Dyk for Y separation, applied voltage signal Dmk for M separation, and applied voltage signal Dck for C separation. These signals Dyk, Dmk and Dck are inputted to input terminals Ic of multiplexers 6Y, 6M and 6C, respectively, as shown in FIG. 1. These signals Dyk, Dmk and Dck are used in preparing the proof image as data for creating areas overlapping K separation (such as area ARw in FIGS. 5A and 5B) in Y separation, M separation and C separation, respectively.

In this embodiment, the coloring density of K separation is converted into Y, M and C components. The coloring densities of Y, M and C separations are added to the coloring densities of Y, M and C components according to superimposing modes of Y, M and C separations and K separation. Thus, the coloring density of K separation is distributed to Y, M and C separations. The K/YMC conversion table 52 and color adding circuit 54 constitute the density distributing device of the present invention.

Reverting to FIG. 1, a dot generator (dot gen.) 7 stores gravure screen patterns for the respective color separations used in preparing the printing cylinders, with angles for the respective separations applicable in preparing the cylinders. Upon receipt of an image data output start signal from the layout system, the dot generator 7 searches for the gravure screen patterns corresponding to the image data of the respective color separations supplied to the color computation circuit 2. The dot generator 7 checks whether or not dots correspond to portions of the gravure screen with an overall screen pattern, i.e. whether or not the dots form the cells or the gravure screen walls surrounding the cells when the printing cylinders are prepared. If the dots form the gravure screen walls, an "OFF" signal is outputted since the gravure screen walls do not hold ink for printing. If the dots form the cells, an "ON" signal is outputted since the cells hold ink for printing. Signal "dy" represents a result of checking as to the gravure screen with an overall screen pattern for Y separation Similarly, signals "dm", "dc" and "dk" represent results of checking as to the gravure screen with an overall screen pattern for M, C and K separations, respectively. Signal "dy" is supplied to a control input terminal Ix of the multiplexer 6Y. Signal "dm" is supplied to a control input terminal Ix of the multiplexer 6M. Signal "dc" is supplied to a control input terminal Ix of the multiplexer 6C. Signal "dk" is supplied to control input terminals Iy of the respective multiplexers 6Y, 6M and 6C.

In this embodiment, the gravure screen with an overall screen pattern for the respective color separations and the screen angles of the patterns stored in the dot generator 7 correspond to the cell patterns formed on the gravure printing cylinders according to the present invention. The dot generator 7 and multiplexers 6Y, 6M and 6C correspond to the exposure control device of the present invention.

By inputting the image data output start signal to the dot generator 7, it is possible to synchronize input timing of the voltage signals to the input terminals Ia–Ic of the multiplexers 6Y, 6M and 6C, and input timing of the "ON", "OFF" signals to the control input terminals Ix and Iy. Further, as described hereinafter, halftone images exposed to the photosensitive material F can be made to correspond to the cell patterns formed on the gravure printing cylinders.

In response to the signals inputted to the control input terminals Ix and Iy, the multiplexers 6Y, 6M and 6C switch the applied voltage signals inputted to the respective input terminals Ia, Ib, Ic and Id, and output the voltage signals to AOMs 8Y, 8M and 8C.

Input terminals Id receive ground voltage GND. The ground voltage here is an applied voltage (e.g. zero volt) for causing no coloring of the photosensitive material (negative). This voltage is used as data for creating blank areas (such as ARn in FIGS. 5A and 5B) of Y, M and C separations when preparing the proof image.

The ground voltage may have such an applied voltage, taking the quality of paper used in actual printing and other printing conditions into account, that provides the same coloring density as the density of blank areas in actual prints. Then, the density of blank areas may be approximated to actual prints according to the quality of printing paper and other printing conditions.

Switching of input terminals Ia–Id of the multiplexers 6Y, 6M and 6C is controlled as follows. Input terminals Ia are selected when terminals Ix are "ON" and terminals Iy are "OFF", since this represents printed portions (dots) that include only Y, M and C separations. Input terminals Ib are selected when terminals Ix are "OFF" and terminals Iy are "ON" since this represents printed portions (dots) of Y, M and C separations that include only K separation. Input terminals Ic are selected when both terminals Ix and Iy are "ON", since this represents printed portions (dots) that include K separation superposed on Y, M and C separations. Input terminals Id are selected when both terminals Ix and Iy are "OFF", since this represents blank portions (dots).

The applied voltages outputted from the multiplexers 6Y, 6M and 6C are applied to AOMs 8Y, 8M and 8C, respectively. Laser sources (gas laser sources) 9B, 9G and 9R acting as the light sources of the present invention output light beams to AOMs 8Y, 8M and 8C for modulation to light quantities corresponding to the above applied voltages, respectively. The light beam having a light quantity modulated by AOM 8Y is reflected by a total reflection mirror 10, the light beam having a light quantity modulated by AOM 8M is reflected by a dichroic mirror 11, and the light beam having a light quantity modulated by AOM 8C is reflected by a dichroic mirror 12, all to travel along one optical axis through an imaging lens 13 to the photosensitive material (negative) F mounted on a rotary cylinder 14. Rotation of the rotary cylinder 14 (main scan feed) and auxiliary scan feed thereof are controlled to occur with output timing of voltages from the multiplexers 6Y, 6M and 6C, so that the light beams are projected to predetermined positions on the photosensitive material F in response to the image data outputted from the layout system.

In this and subsequent embodiments, the acousto-optic modulators (AOMs) 8Y, 8M and 8C are used as the light quantity modulating device of the present invention since gas laser sources are used as the light sources. However, a different device may be used to modulate the quantities of the light beams for exposing halftone images to the photosensitive material F. Where, for example, semiconductor lasers are used as the light sources, the voltages outputted from the multiplexers 6Y, 6M and 6C may be applied directly to the semiconductor lasers to adjust the laser beams outputted from the semiconductor lasers to the light quantities corresponding to the coloring densities. In this case, no AOMs are required since the semiconductor lasers act as both the light sources and light quantity modulating device of the present invention.

Figure 7A:
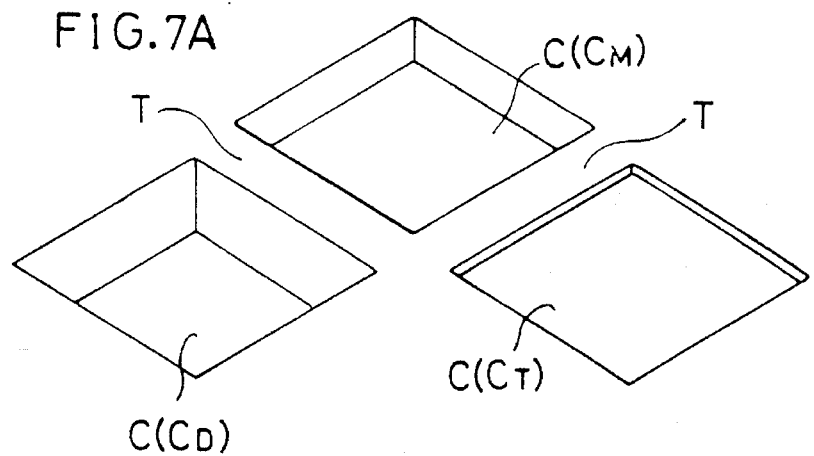
FIGS. 7A through 7C are views showing a relationship between cells formed on printing cylinders and dots exposed to a photosensitive material.
Figure 7B:
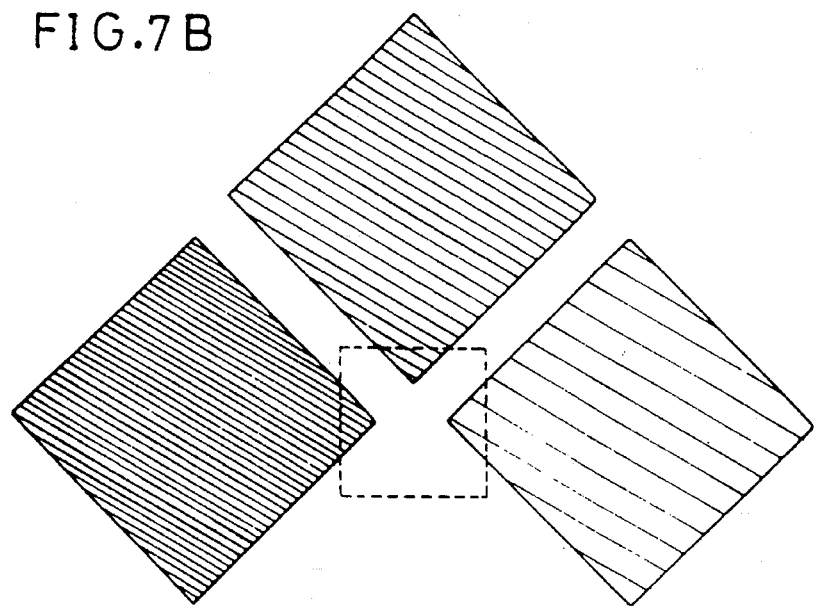
Figure 7C:
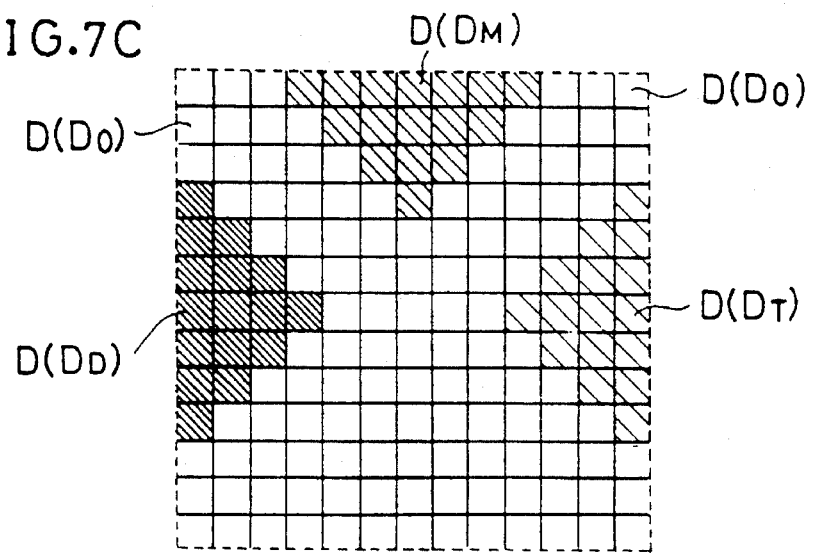

FIGS. 7A through 7C show a relationship between the cells formed on the printing cylinders and exposure conditions provided by B light beam corresponding to Y separation. FIG. 7A is a perspective view showing cells formed on a printing cylinder. FIG. 7B is a plan view showing the exposure conditions provided by B light beam corresponding to Y separation. FIG. 7C is an enlarged view of a portion marked with a dotted line in FIG. 7B. In these drawings, reference C denotes the cells, $C_D$ a dark cell, $C_M$ an intermediate cell, $C_T$ a light cell, and T gravure screen walls. Reference D denotes exposure unit dots, $D_D$ dots exposed with a high coloring density, $D_M$ dots exposed with a mean coloring density, $D_T$ dots exposed with a low coloring density, and $D_0$ dots not colored. As seen, the dots are colored with the coloring densities corresponding to cell depths, with the gravure screen walls remaining uncolored, according to the cell pattern. For M and C separations also, dots are exposed in superposition on the photosensitive material F according to the respective cell arranging angles.

Table 1 below shows relationships reflected in production printing between superposing conditions of inks for Y, M, C and K separations and selections of the output signals of the multiplexers 6Y, 6M and 6C for the dots on the photosensitive material F. For positions (dots) in production prints where the inks for Y, M, C and K separations are superposed, for example, transmitted light quantities of the light beams projected to the dots on the photosensitive material F corresponding to such positions are provided when the multiplexers 6Y, 6M and 6C select applied voltages Dyk, Dmk and Dck at input terminals Ic, and supply these voltages to AOMs 8Y, 8M and 8C. The coloring densities in those positions on the photosensitive material F correspond to the densities occurring when Y, M, C and K separations are superposed (Table 1 (1)). For positions in the production prints where the inks for Y, M and C separations are superposed, the multiplexers 6Y, 6M and 6C select and output applied voltages DY, DM and DC at input terminals Ia (Table 1 (2)).

TABLE 1

| No. | Superposition in Production Prints | | | | Selection at Multiplexers | | |
|---|---|---|---|---|---|---|---|
| | | | | | 6Y | 6M | 6C |
| (1) | Y | M | C | K | 1c | 1c | 1c |
| (2) | Y | M | C | | 1a | 1a | 1a |
| (3) | Y | M | | K | 1c | 1c | 1b |
| (4) | Y | | C | K | 1c | 1b | 1c |
| (5) | | M | C | K | 1b | 1c | 1c |
| (6) | Y | M | | | 1a | 1a | 1d |
| (7) | Y | | C | | 1a | 1d | 1a |
| (8) | Y | | | | 1c | 1b | 1b |
| (9) | | M | C | | 1d | 1a | 1a |
| (10) | | M | | K | 1b | 1c | 1b |
| (11) | | | C | K | 1b | 1b | 1c |
| (12) | Y | | | | 1a | 1d | 1d |
| (13) | | M | | | 1d | 1a | 1d |
| (14) | | | C | | 1d | 1d | 1a |
| (15) | | | | K | 1b | 1b | 1b |
| (16) | blank | | | | 1d | 1d | 1d |

The cells formed on the cylinders for production printing have the depths determined by the density tones and exposure of the continuous tone positive and the chemical conditions for the developing, etching and other steps. The cell depths in turn determine the density tones, i.e. finish, of the prints. With the apparatus having the above construction, variations in the cell depth according to the chemical conditions are adjusted for the image data having densities corresponding to the density tones of the continuous tone positive. On the other hand, the AOMs are controlled according to the gravure screen with an overall screen pattern (i.e. screen ratio, the screen ruling, cell arranging angles for the respective color separations, and so on) for forming cell patterns for the respective color separations, in a way to correspond to superposition of the color separations. A proof is prepared by exposing halftone images on the photosensitive material to achieve adjusted coloring densities. Thus, a color proof corresponding to final production prints may be created on the photosensitive material (negative).

In the apparatus in the first embodiment described above, D/A converters 53 are arranged upstream of the multiplexers 6Y, 6M and 6C. FIG. 8 shows a modification of the first embodiment. In this construction, applied voltages are inputted as digital data to input terminals Ia, Ib, Ic and Id of selectors 15Y, 15M and 15C. The selectors 15Y, 15M and 15C output data by a switching operation similar to that effected at the multiplexers 6Y, 6M and 6C. These output data are converted into analog signals by D/A converters 53 to be supplied to the AOMs 8Y, 8M and 8C. This construction achieves a reduction in the number of D/A converters 53. The same modification is applicable to the other embodiments described hereinafter.

The first embodiment has been described, assuming that the color proof image is formed on a negative material. The color proof image may be formed on a positive material instead. This will be described hereunder.

Properties of negative and positive materials will be described first with reference to FIGS. 9A and 9B. The colors in parentheses in the drawings are colors expressed on the photosensitive materials. Reference Y denotes yellow, M magenta, C cyan, B blue, G green, R red, Bl black, and W white.

Figure 9A:
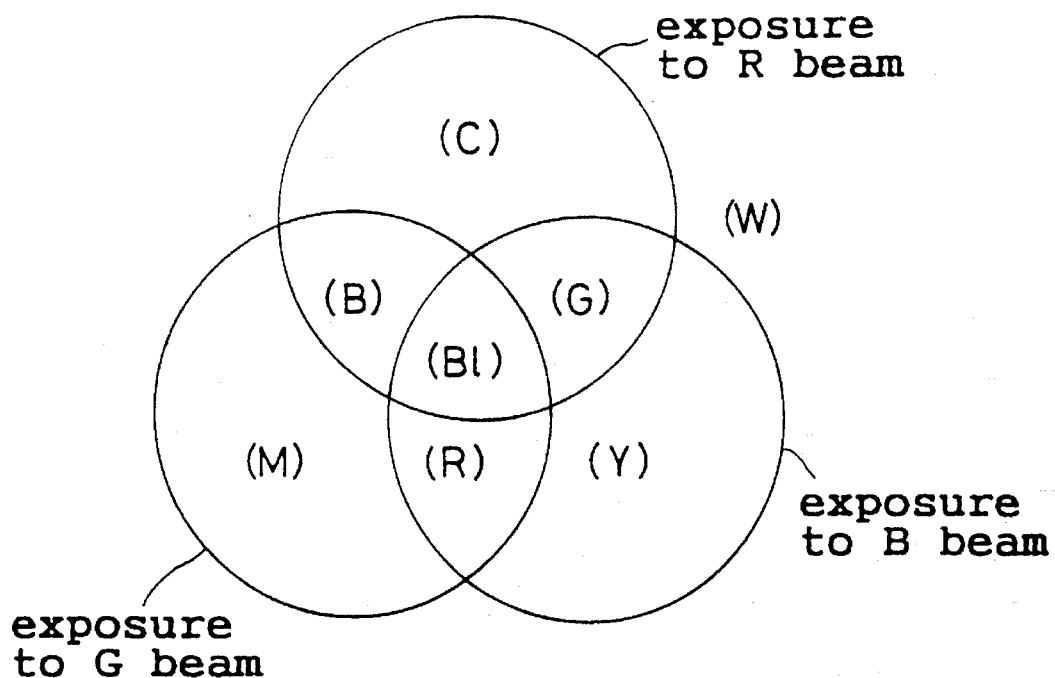
FIGS. 9A and 9B are view used for explaining properties of a negative photosensitive material and a positive photosensitive material.
Figure 9B:
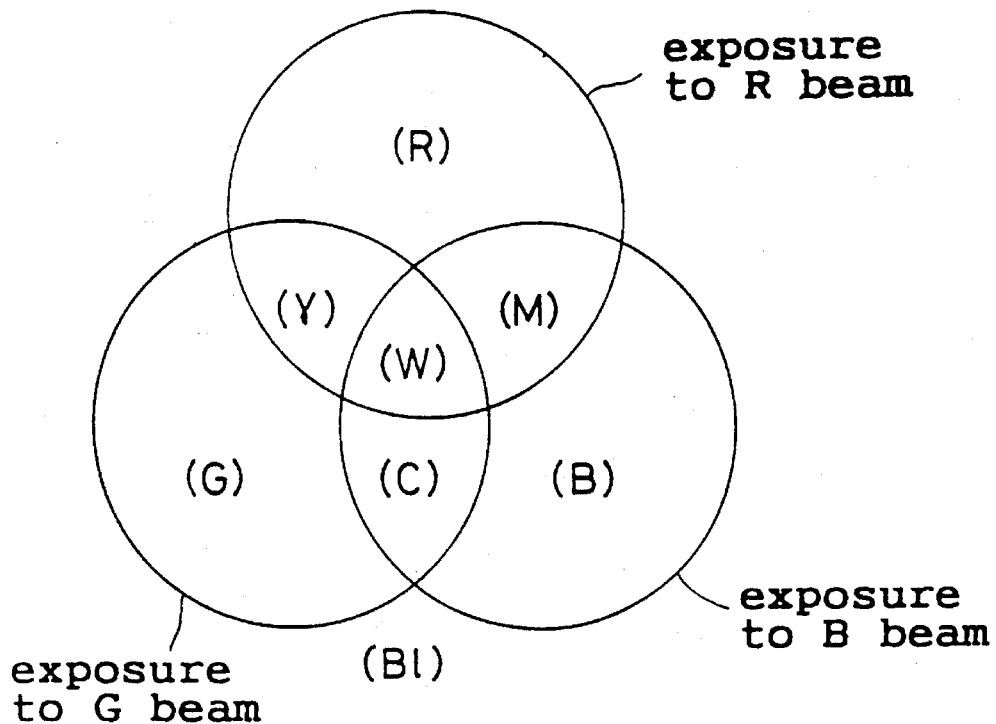

As shown in FIG. 9A, the negative material has a property to express Y, M and C colors with dark coloring densities by exposing with increased light quantities of B, G and R light beams which are the complementary colors of Y, M and C colors. To give a dark color to Y separation, for example, B light beam may be exposed in a greater light quantity than G and R beams. On the other hand, the positive material, as shown in FIG. 9B, has a property to express Y, M and C colors with dark coloring densities by exposing with decreased light quantities of B, G and R light beams which are the complementary colors of Y, M and C colors. To give a dark color to Y separation, for example, B light beam is exposed in a smaller light quantity than G and R beams.

Figure 10:
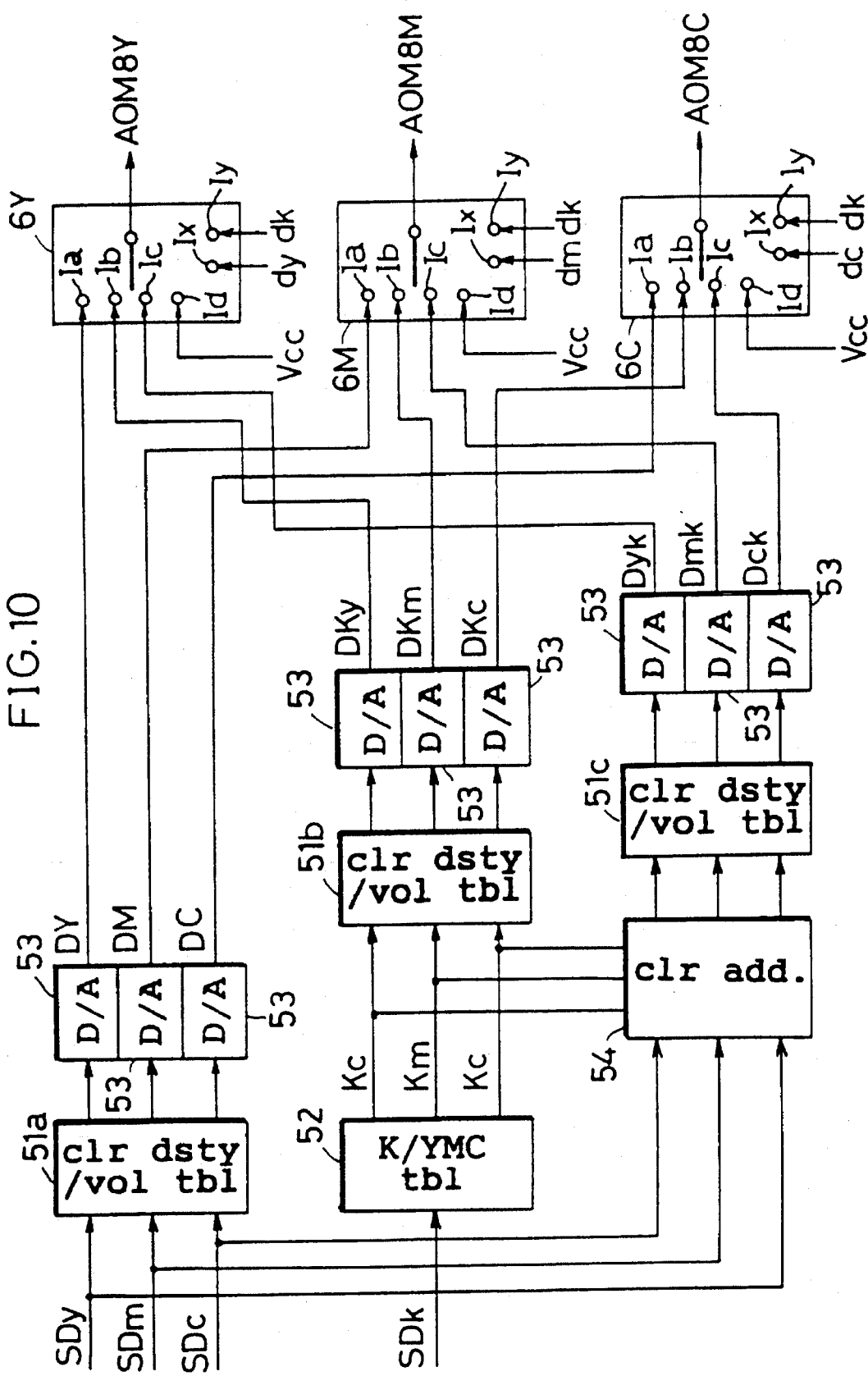
FIG. 10 is a block diagram of a modified principal portion of the apparatus in the first embodiment for forming a color proof on the positive photosensitive material.

In view of the difference in property, a principal portion of the apparatus in the first embodiment may be modified as shown in FIG. 10 when the color proof image is formed on the positive material.

The multiplexers 6Y, 6M and 6C receive, at input terminals 1a, voltages DY, DM and DC corresponding to coloring densities SDy, SDm and SDc of Y, M and C separations, at input terminals 1b, voltages DKy, DKm and DKc corresponding to the coloring densities of Y, M and C components obtained by color-separating the coloring density SDk of K separation, and at input terminals 1c, voltages Dyk, Dmk and Dck corresponding to the coloring densities outputted from a color adding circuit 54.

However, with the positive material, as noted above, the lower exposure, the stronger coloring. Thus, a voltage is set such that the darker of a light beam corresponding to a color separation to be expressed is decreased according to its coloring density. The relationships among voltage application to the AOMs, modulation rate of the AOMs, modulated light quantity of the AOMs and coloring density of the photosensitive material where the color photosensitive material is a positive are as shown in dotted lines in FIG. 6. Thus, the coloring density-to-voltage conversion tables 51a, 51b and 51c convert the coloring densities into voltages for application to the AOMs according to the relationship shown in the dotted line in the second quadrant of FIG. 6.

Further, the multiplexers 6Y, 6M and 6C receive Vcc at input terminals Id thereof. The Vcc is an applied voltage (high voltage) for expressing white on the positive material, and is used as data for creating blank areas (such as ARn in FIGS. 5A and 5B) in the proof image for Y, M and C separations.

The multiplexers 6Y, 6M and 6C receive, at control input terminals Ix, signals "dy", "dm" and "dc" from the dot generator 7, and at input terminals Iy, signal "dk". These signals "dy", "dm", "dc" and "dk" are the same as in the first embodiment.

In response to signals "dy", "dm", "dc" and "dk", the same control as in the first embodiment is carried out for switching input terminals Ia, Ib, Ic and Id to apply the voltages to the AOMs 8Y, 8M and 8C.

For dots expressing only Y separation, for example, the multiplexer 6Y outputs signal DY while the multiplexers 6M and 6C output Vcc. As a result, compared with G and R light beams, B light beam has a small light quantity corresponding to the coloring density of Y separation. Thus, as shown in FIG. 9B, G and R light beams overlapping each other express "Y" with the coloring density of Y separation.

The following embodiments will be described, basically in relation to use of the negative sensitive material for forming a color proof image. However, these embodiments may also be modified as described above to use a positive material for forming the color proof image.

Second Embodiment

A second embodiment of the present invention will be described with reference to FIGS. 11 through 14.

The apparatus in the second embodiment also is used to create a color proof image on a photosensitive material (negative) for prints to be made with printing cylinders prepared by the conventional gravure system. The characterizing feature of this apparatus lies in compensation for an additive failure occurring when superposing chromatic and achromatic colors. In the following description, like reference numerals are used to identify like parts in FIGS. 1 and 2 which are the same as in the first embodiment and will not be described again to avoid repetition.

Figure 11:
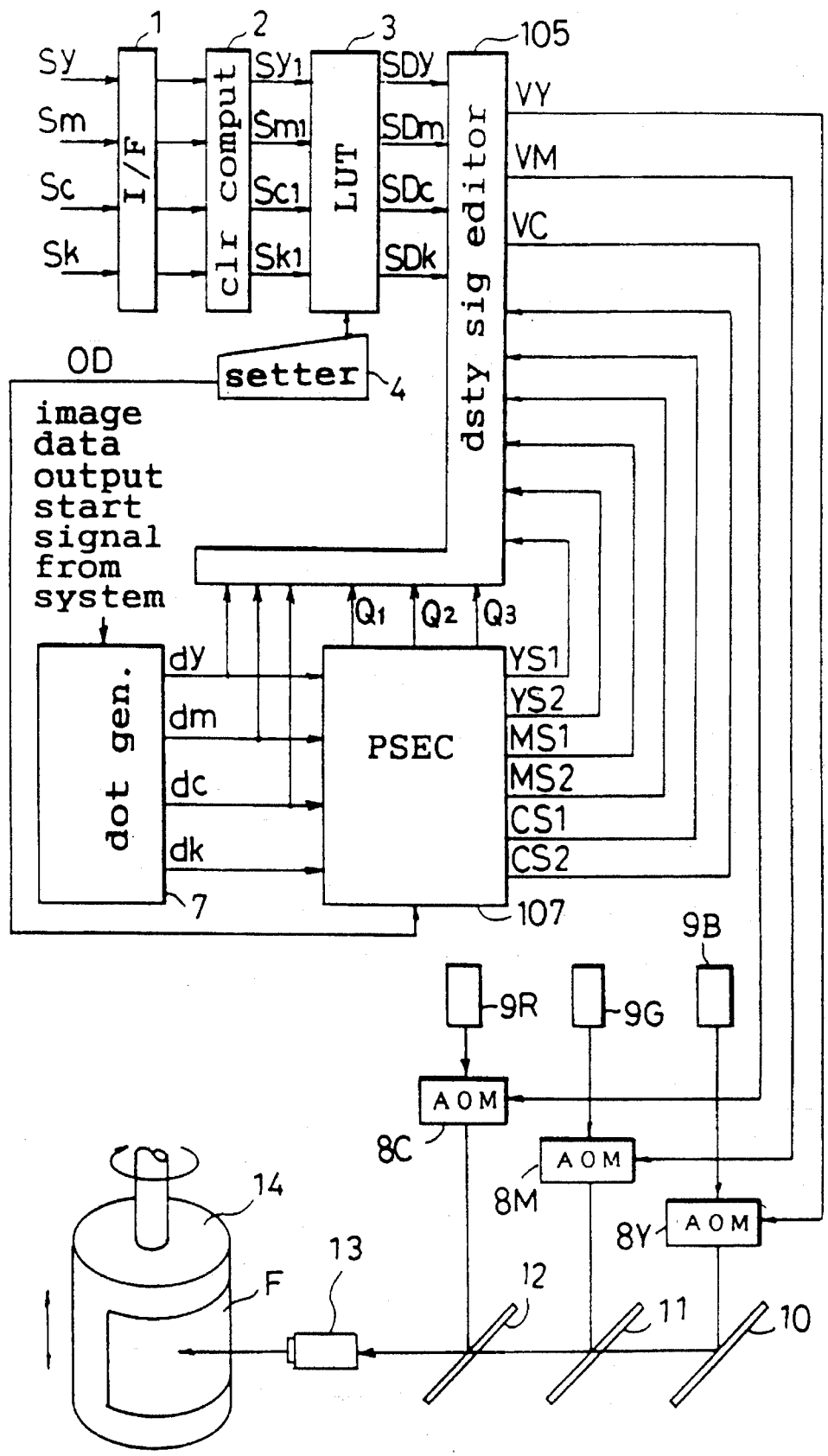
FIG. 11 is a block diagram of a color image proofing apparatus in a second embodiment of the present invention.

Reference is made to FIG. 11. The apparatus receives image data Sy, Sm, Sc and Sk of color separations from the system not shown, through an interface circuit 1. These data are applied to a color computation circuit 2 for color correction and tone correction. The corrected data are applied to a lookup table (LUT) 3 which determines coloring densities of halftone images constituting the proof image created according to conditions for forming cells on production printing cylinders. The coloring densities determined by the LUT 3 are applied to a signal editing circuit 105 described hereinafter. The processes up to this point are the same as in the first embodiment.

As in the first embodiment, a dot generator 7 outputs signals "dy", "dm", "dc" and "dk" representing results of checking as to the angled gravure screen with an overall screen pattern for Y, M, C and K color separations and arranging angles therefor. Signals "dy", "dm", "dc" and "dk" are supplied to a pattern signal editing circuit 107, while signals "dy", "dm" and "dc" are supplied also to the density signal editing circuit 105.

The pattern signal editing circuit 107, based on the signals "dy", "dm", "dc" and "dk" supplied from the dot generator 7 and an order of superposing the color separations in actual printing, edits selection control signals for selecting input terminals of multiplexers in the density signal editing circuit 105 and color addition control signals for controlling a color adding circuit in the density signal editing circuit 105 as described hereinafter. Data (hereinafter called "superposing order data" also) OD showing the order of superposing the color separations in actual printing is set through a setter 4 according to an order in which the color separations are superposed for final production printing. The superposing order data OD is supplied to the pattern signal editing circuit 107.

Table 2 below shows examples of relationship between the superposing order data OD and the order of superposing the color separations in production prints.

TABLE 2

| OD | printing order | | | | OD | printing order | | | |
|----|---|---|---|---|----|---|---|---|---|
|    | 1 | 2 | 3 | 4 |    | 1 | 2 | 3 | 4 |
| 1  | Y | M | C | K | 12 | C | Y | M | K |
| 2  | Y | M | K | C | 13 | C | Y | K | M |
| 3  | Y | C | M | K | 14 | C | M | Y | K |
| 4  | Y | C | K | M | 15 | C | M | K | Y |
| 5  | Y | K | M | C | 16 | C | K | Y | M |
| 6  | Y | K | C | M | 17 | C | K | M | Y |
| 7  | M | Y | C | K | 18 | K | Y | M | C |
| 8  | M | Y | K | C | 19 | K | Y | C | M |
| 9  | M | C | Y | K | 20 | K | M | Y | C |
| 10 | M | C | K | Y | 21 | K | M | C | Y |
| 11 | M | K | Y | C | 22 | K | C | Y | M |
|    | M | K | C | Y | 23 | K | C | M | Y |

The numbering of the printing order shows orders of superposition onto the printing cylinders. For example, when data OD is "0", Y separation is printed first, then M separation is printed, C separation is printed thereon, and finally K separation is printed. The setter 4 is operable to set the superposing order data OD (number 0 to 23) corresponding to a superposing order for actual printing selected from the relationships shown in Table 2 above. The superposing order data OD set is supplied to the pattern signal editing circuit 107.

A specific construction of the pattern signal editing circuit 107 will be described with reference to FIG. 12.

The pattern signal editing circuit 107 includes a selection control signal editing circuit 121 for editing the selection control signals for selecting the input terminals of the multiplexers in the density signal editing circuit 105 described hereinafter, and a color addition control signal editing circuit 122 for editing the color addition control signals for controlling the color adding circuit in the density signal editing circuit 105 also described hereinafter.

The selection control signal editing circuit 121 substitutes signals "dy", "dm", "dc" and "dk" (which are either "ON" or "OFF" i.e. "1" or "0") into the following logical expressions, and derives selection control signals YS1 and YS2 for selecting the input terminals of the multiplexer for Y separation, selection control signals MS1 and MS2 for selecting the input terminals of the multiplexer for M separation, and selection control signals CS1 and CS2 for selecting the input terminals of the multiplexer for C separation:

$$YS1 = dy \cdot \overline{dk} + dk \cdot \overline{dy} \cdot \overline{dm} \cdot \overline{dc} \qquad (1)$$

$$YS2 = dy + dm \cdot dk + dc \cdot dk \qquad (2)$$

$$MS1 = dm \cdot \overline{dk} + dk \cdot \overline{dy} \cdot \overline{dm} \cdot \overline{dc} \qquad (3)$$

$$MS2 = dm + dc \cdot dk + dy \cdot dk \qquad (4)$$

$$CS1 = dc \cdot \overline{dk} + dk \cdot \overline{dy} \cdot \overline{dm} \cdot \overline{dc} \qquad (5)$$

$$CS2 = dc + dy \cdot dk + dm \cdot dk \qquad (6)$$

where "·" is an AND, "+" an OR, and bars "‾" a NOT.

For example, $\overline{dy}$ corresponds to (1−dy), and so $\overline{dy}=1$ when dy=0, and $\overline{dy}=0$ when dy=1.

Further, $\overline{dm}=(1-dm)$, $\overline{dc}=(1-dc)$, and $\overline{dk}=(1-dk)$.

For selection control signals YS1 and YS2 supplied to the multiplexer for Y separation, for example, if signals "dy", "dm", "dc" and "dk" are all "1", YS1 becomes "0" and YS2 "1" based on the above expressions (1) and (2), as follows:

$$\begin{aligned} YS1 &= 1 \cdot (1-1) + 1 \cdot (1-1) \cdot (1-1) \cdot (1-1) \\ &= 1 \cdot 0 + 1 \cdot 0 \cdot 0 \cdot 0 \\ &= 0 + 0 \\ &= 0 \end{aligned}$$

$$\begin{aligned} YS2 &= 1 + 1 \cdot 1 + 1 \cdot 1 \\ &= 1 + 1 + 1 \\ &= 1 \end{aligned}$$

Thus, the results of computation for signals YS1 and YS2 are either "0" or "1" ("OFF" or "ON"), and the selection of the input terminals of the multiplexer for Y separation is based on a combination of "0" and "1" of signals YS1 and YS2. For signals MS1, MS2, CS1 and CS2, "0" or "1" is similarly derived from the above expressions (3) through (6), and the input terminals of the multiplexers for M separation and C separation are selected by combinations "0" and "1".

As shown in FIG. 11, the results of computation YS1, YS2, MS1, MS2, CS1 and CS2 are supplied to the density signal editing circuit 105.

Figure 12:
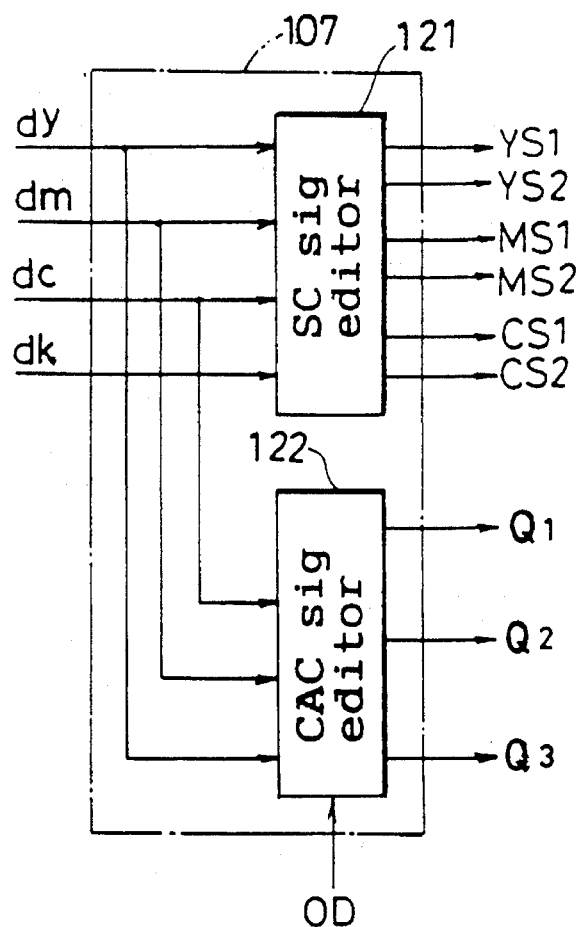
FIG. 12 is a block diagram of a pattern signal editing circuit in the second embodiment.

Reverting to FIG. 12, the color addition signal editing circuit 122 determines, for the dots of signals "dy", "dm", "dc" and "dk" applied thereto, data Q1 (2 bits) indicating a color separation to be printed after K separation (i.e. superposed on K separation), and data Q2 (1 bit) indicating whether K separation is printed first, i.e. whether a color separation is printed before (i.e. under) K separation. The color addition signal editing circuit 122 also determines, for the dots of signals "dy", "dm" and "dc", data Q3 (2 bits) indicating a color separation printed before K separation.

Data Q1 identifies, from the superposing order data OD, separations having a possibility of being printed after K separation, and identifies, from "0" or "1" of signals "dy", "dm" and "dc" applied thereto, a separation printed after K separation from the dots of signals "dy", "dm" and "dc".

When the superposing order data OD applied is "18", for example, K separation is printed first, and therefore the separations having a possibility of being printed after K separation are Y, M and C separations. Next, based on the order shown in the superposing order data OD, whether or not Y separation following K separation should be printed in a given dot is checked against signal "dy" applied. If signal "dy" is "1", Y separation is identified as the separation to be printed after K separation in that dot according to the superposing order. If signal "dy" is "0", the separation to be printed after K separation in that dot is M separation or C separation. Subsequently, whether or not M separation likely to be printed after K separation should actually be printed is checked against signal "dm" applied. If M separation is not to be printed, whether C separation should be printed is checked against signal "dc". In this way, data Q1 is determined which identifies the separation to be printed after K separation for the dots of signals "dy", "dm" and "dc". Number "1" is outputted when the separation printed after K separation is Y separation, "2" for M separation, and "3" for C separation. When, in the above example, the superposing order data OD is "18" and signals "dy", "dm" and "dc" are all "0", or when the superposing order data OD is "0" in which case K separation is the last separation to be printed, data Q1 outputted is "0" indicating that no separation is to be printed after K separation.

Data Q2 determines whether K separation should be printed first, from the superposing order data OD and signals "dy", "dm" and "dc" applied. When, for example, the superposing order data OD is "18", it is determined from the superposing order that K separation is to be printed first. When, for example, the superposing order data OD is "0" showing a possibility of the other separations being printed before K separation, whether these separations should be printed before K separation in a given dot is determined from signals "dy", "dm" and "dc". Number "1" is outputted when K separation is printed first according to the superposing order or when the superposing order shows a possibility of the other separations being printed before K separation but these separations are not printed in a given dot. Number "0" is outputted when K separation is not the first separation to be printed.

Data Q3 determines a separation to be printed immediately before K separation in a given dot of signals "dy", "dm" and "dc" applied, in a sequence similar to the case of data Q1, Number "1" is outputted when the separation printed immediately before K separation is Y separation, "2" for M separation, "3" for C separation, and "0" in the absence of a separation printed immediately before K separation.

Data Q1, Q2 and Q3 outputted from the color addition control signal editing circuit 105 are supplied to the density signal editing circuit 105 as shown in FIG. 11.

A construction of the density signal editing circuit 105 will be described next.

The density signal editing circuit 105, as does the signal editing circuit 5 in the first embodiment, creates necessary data by taking superposition of K, Y, M and C separations (see FIGS. 5A and 5B) and other conditions into account. Specifically, the density signal editing circuit 105 converts the coloring density of K separation into three color data Y, M and C, and creates data of only Y, M and C separations (DY, DM and DC), data of only Y, M and C components of K separation (DKy, DKm and DKc), and data combining Y, M and C separations and Y, M and C components of K separation (Dyk, Dmk and Dck), respectively. In this embodiment, the data combining Y, M and C separations and Y, M and C components of K separation are created by taking into account reductions in the coloring densities due to additivity failure.

The density signal editing circuit 105 includes multiplexers 6Y, 6M and 6C for selectively outputting the data created to acousto-optic modulators (AOMs), described hereinafter, according to patterns on the printing cylinders.

Figure 13:
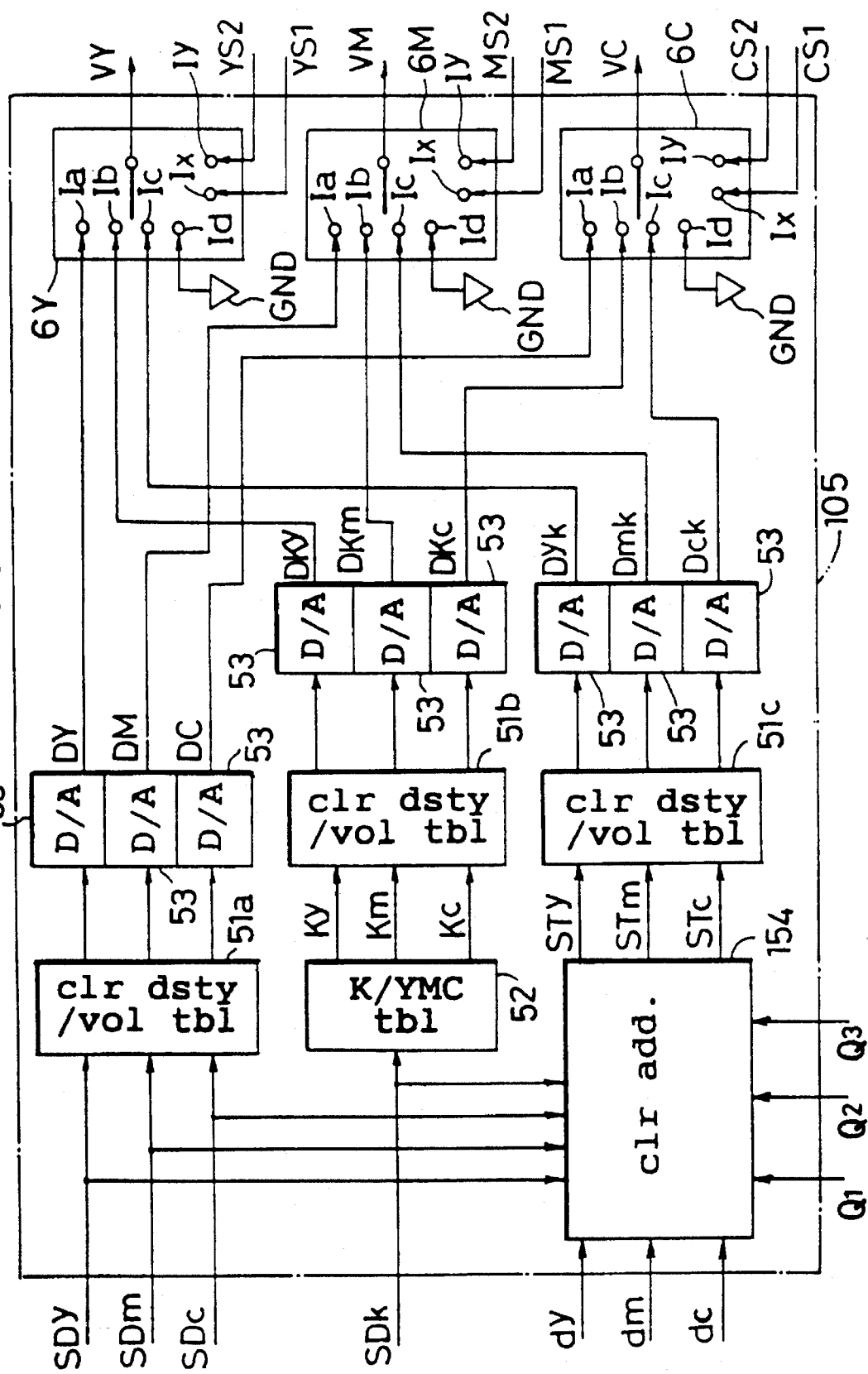
FIG. 13 is a block diagram of a density signal editing circuit in the second embodiment.

A specific construction of the density signal editing circuit 105 will be described with reference to FIG. 13.

Coloring densities SDy, SDm and SDc of Y, M and C separations among the coloring densities SDy, SDm, SDc and SDk identified by the chemical element adjusting LUT 3 are applied to a coloring density-to-voltage conversion table (clr dsty/vol tbl) 51a for conversion into voltages corresponding to the coloring densities (i.e. voltages to be applied to the AOMs). Coloring density SDk of K separation is applied to a K/YMC conversion table 52 for conversion into coloring densities of Y, M and C components of K separation. Coloring densities SDy, SDm, SDc and SDk of Y, M, C and K separations, signals "dy", "dm" and "dc" from the dot generator 7, and color addition control signals Q1, Q2 and Q3 are applied to a color adding circuit 154 for color addition with a compensation effected for the additivity failure.

Data (i.e. voltages corresponding to the coloring densities) outputted from the coloring density-to-voltage conversion table 51a are applied to digital-to-analog (D/A) converters 53 for conversion into analog signals, respectively. As a result, applied voltage signal DY for Y separation, applied voltage signal DM for M separation, and applied voltage signal DC for C separation are inputted to input terminals Ia of multiplexers 6Y, 6M and 6C, respectively.

The K/YMC conversion table 52 converts coloring density SDk of K separation into coloring densities Ky, Km and Kc of Y, M and C components. The results of conversion Ky, Km and Kc are applied to the coloring density-to-voltage conversion table 51b.

Output data of the coloring density-to-voltage conversion table 51b are applied to respective D/A converters 53 for conversion into analog signals. As a result, applied voltage signal DKy for Y component of K separation, applied voltage signal DKm for M component of K separation, and applied voltage signal DKc for C component of K separation are inputted to input terminals Ib of multiplexers 6Y, 6M and 6C, respectively.

The color adding circuit 154 adds colors for areas where all or any of Y, M and C separations of chromatic colors and K separation of achromatic color are superposed, while compensating for the additivity failure between the chromatic colors and achromatic color. The apparatus in this embodiment is constructed to create a color proof image with a compensation for the additivity failure between the chromatic colors and achromatic color. This embodiment will be described in this connection hereinafter.

In color printing, the inks of the respective color separations are applied one over the other to paper. In this case, additivity failure occurs between the superposed inks. Where, as shown in FIG. 15A, for example, Y separation Hy is printed after (or superposed on) K separation Hk, a trapping shortage occurs with the upper, Y separation Hy. As a result, Y separation Hy has a lower density level than an actual density level.

The additivity failure as shown in FIG. 15A and a method of compensating for the additivity failure will be described with reference to FIGS. 16A through 16C.

As shown in FIGS. 16A and 16B, monochromatic gravure print samples Py and Pk of Y separation and K separation are prepared. Each sample has a parallel arrangement of strip-shaped regions with a plurality of varied cell depth stages. In these drawings, reference "SDyi" denotes a monochromatic density in a region of Y separation corresponding to cell depth "i" of a cylinder for sample Py, and reference "SDkj" denotes a monochromatic density in a region of K separation corresponding to cell depth "j" of a cylinder for sample Pk. The densities here refer to actual densities measured, from which the density of paper on which the samples are printed is subtracted. This applies also to the other densities mentioned hereinafter.

Next, a gravure print sample Pyk having Y separation superposed on K separation, as shown in FIG. 16C, is prepared by using the same cylinders used in printing the monochromatic patterns Py and Pk. A monochromatic density SDyi*SDkj of Y component (blue light density in this case) in this sample Pyk obtained by measuring a patch designated by densities SDyi and SDkj is less than a simply added density (SDyi+SDkj) of densities SDyi and SDkj. This is an additivity failure. This additivity failure has a characteristic to increase with the simply added density (SDyi+SDkj).

A sufficiency rate Ry of the Y component density resulting from the additivity failure is derived from the following equation (Ry is hereinafter called density sufficiency rate, and hence (1−Ry) shows a density lowering rate):

$$Ry = (SDyj*SDkj)/(SDyi+SDkj) \quad (7)$$

Additivity failure is a phenomenon occurring with superposition of inks on a print. On the other hand, where light beams are superposed on a photosensitive material, additivity failure is negligible for practical purposes. Thus, additivity failure on a print may be compensated for (simulated) by deriving, from equation (7) in advance, density sufficiency rate Ry by the combination of density SDkj of K separation and density SDyi of Y separation superposed thereon, and lowering the density SDyi of Y component according to density sufficiency rate Ry.

Given the coloring density SDy of Y separation and coloring density SDk of K separation, for example, coloring density Yt of Y separation after a compensation for additivity failure may be derived from the following equation by determining density sufficiency rate Ry by the combination of coloring densities SDy and SDk, and based on density sufficiency rate Ry determined and coloring density SDy of Y separation given:

$$Yt = Ry \times SDy \quad (8)$$

Where M separation or C separation is printed on K separation, additivity failure for M separation or C separation may be compensated for in the same way as described above.

Where K separation is printed on Y separation, M separation or C separation, e.g. where, as shown in FIG. 15B, K separation Hk is superposed on Y separation Hy, a trapping shortage occurs with the upper, K separation Hk. As a result, K separation Hk has a lower density level than an actual density level. In this case, coloring density Kyt of K separation after a compensation for the additivity failure may be derived from the following equation by determining density sufficiency rate Rk using a gravure print sample with K separation superposed on Y separation, instead of sample Pyk shown in FIG. 16C, and based on density sufficiency rate Rk and coloring density of K separation given:

$$Kyt = Rk \times SDk \quad (9)$$

Where K separation is printed on M separation or C separation, additivity failure for K separation may be compensated for in the same way as described above.

The color adding circuit 154 adds Y, M and C separations to K separation after compensating for the additivity failure in each separation as described above.

Figure 14:
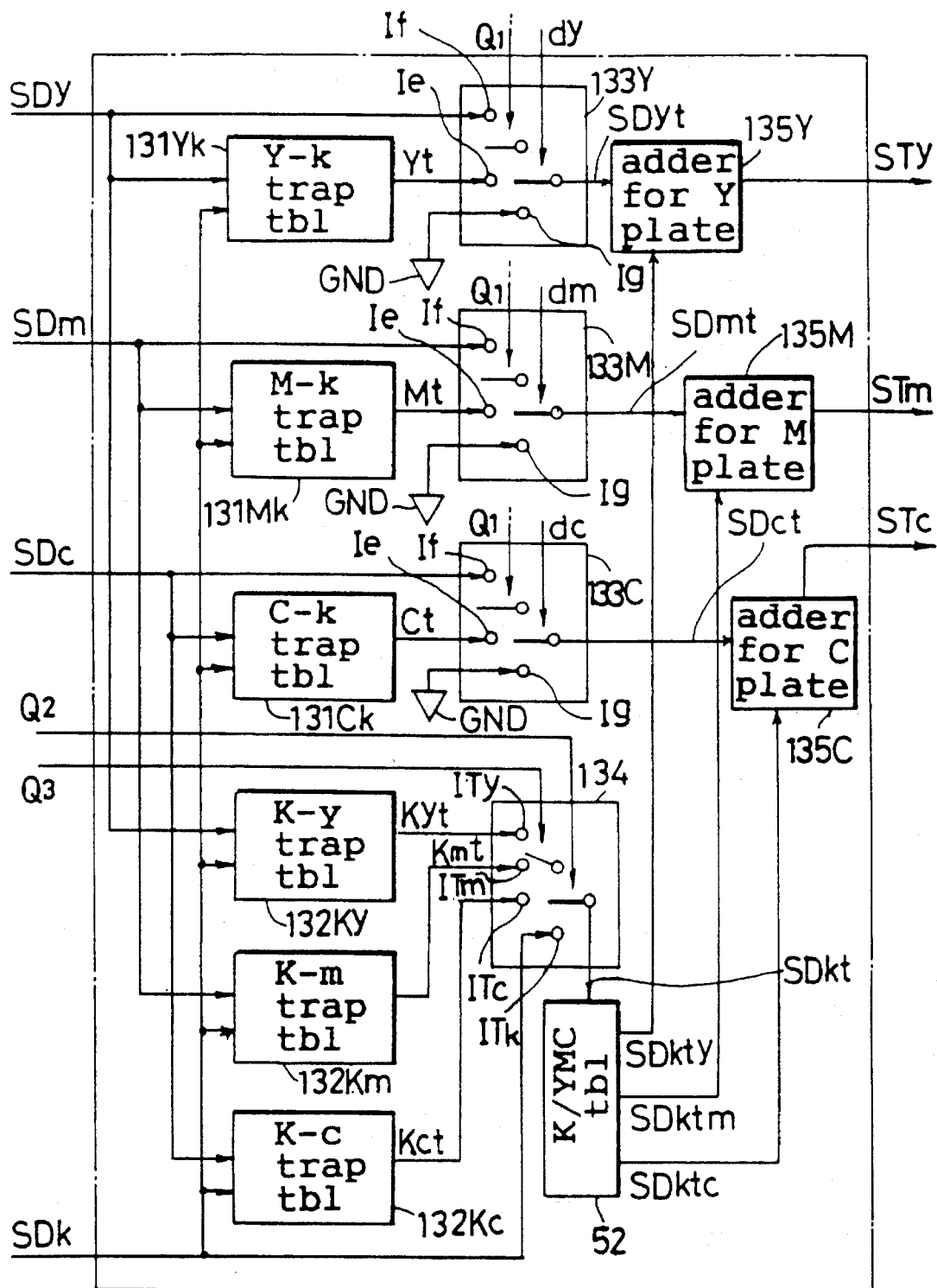
FIG. 14 is a block diagram of a color adding circuit in the density signal editing circuit.

A specific construction of the color adding circuit 154 will be described with reference to FIG. 14.

A Y-k trapping table 131Yk is used to determine coloring density Yt of Y separation after a compensation for additivity failure where Y separation is superposed on K separation. When coloring density SDk of K separation and coloring density SDy of Y separation are given, the Y-k trapping table 131Yk outputs density Yt which is the product of coloring density SDy of Y separation given and density sufficiency rate. Ry corresponding to the combination of coloring densities SDk and SDy (see equations (7) and (8)). The Y-k trapping table 131Yk stores relationships between coloring densities SDk and SDy of K separation and Y separation given and density Yt derived from equations (7) and (8) based on these data.

An M-k trapping table 131Mk and a C-k trapping table 131Ck are used to determine coloring density Mt of M separation after a compensation for additivity failure where M separation is superposed on K separation, and coloring density Ct of C separation after a compensation for additivity failure where C separation is superposed on K separation, respectively. These trapping tables 131Mk and 131Ck have the same construction as the Y-k trapping table 131Yk.

Output data Yt, Mt and Ct of the respective trapping tables 131Yk, 131Mk and 131Ck are applied to input terminals Ie of switches 133Y, 133M and 133C, respectively. The switches 133Y, 133M and 133C receive coloring density SDy of Y separation, coloring density SDm of M separation and coloring density SDc of C separation at input terminals If, and ground voltage GND at input terminals Ig, respectively. The ground voltage represents a coloring density corresponding to an applied voltage which causes no coloring of the photosensitive material F.

The input terminals Ie and If of the switches 133Y, 133M and 133C are switchable by data Q1 provided by the color addition control signal editing circuit 122. When data Q1 is "1", Y separation is printed on K separation. Hence input terminal Ie is selected only for the switch 133Y while input terminal If is selected for the other switches 133M and 133C. When data Q1 is "2", input terminal Ie is selected only for the switch 133M. When data Q1 is "3" input terminal Ie is selected only for the switch 133C. When data Q1 is "0", no separation is printed on K separation. Hence input terminal If is selected for all of the switches 133Y, 133M and 133C.

Switching between a selected one of input terminals Ie and If and the input terminal Ig of the switches 133Y, 133M and 133C is effected by signals "dy", "dm" and "dc" provided by the dot generator 6. When signal "dy" is "0" for example, Y separation is not pointed in a given dot. Consequently, input terminal Ig (i.e. GND) is selected for the switch 133Y. When signal "dy" is "1", Y separation is printed in a given dot. Consequently, one of the input terminals Ie and If, i.e. density Yt or SDy, is selected for the switch 133Y. Similar switching is made for the other switches 133M and 133C according to signals "dm" and "d" applied thereto.

Output data SDyt (i.e. a selected one of Yt, SDy and GND), SDmt (i.e. a selected one of Mt, SDm and GND) and SDct (i.e. a selected one of Ct, SDc and GND) of the switches 133Y, 133M and 133C are applied to an adding circuit 135Y for Y separation, an adding circuit 135M for M separation, and an adding circuit 135C for C separation, respectively.

A K-y trapping table 132Ky is used to determine coloring density Kyt of K separation after a compensation for additivity failure where K separation is superposed on Y separation. When coloring density SDk of K separation and coloring density SDy of Y separation are given, the K-y trapping table 132Ky outputs density Kyt which is the product of coloring density SDk of K separation given and density sufficiency rate Rk corresponding to the combination of coloring densities SDk and SDy (see equation (9)). The K-y trapping table 132Ky stores relationships between coloring densities SDk and SDy of K separation and Y separation given and density Kyt.

A K-m trapping table 132Km and a K-c trapping table 132Kc are used to determine coloring density Kmt of K separation after a compensation for additivity failure where K separation is superposed on M separation, and coloring density Kct of K separation after a compensation for additivity failure where K separation is superposed on C separation, respectively. These trapping tables 132Km and 132Kc have the same construction as the K-y trapping table 132Ky.

Output data Kyt, Kmt and Kct of the respective trapping tables 132Ky, 132Km and 132Kc are applied to input terminals Ie, If and Ig of a switch 134, respectively. The switch 134 receives coloring density SDk of K separation at an input terminal Ih thereof.

The input terminals ITy, ITm and ITc of the switch 134 are switchable by data Q3 provided by the Color addition control signal editing circuit 122. When data Q3 is "1", Y separation is printed before K separation. Hence coloring density Kyt after a compensation for additivity failure in K separation superposed on Y separation, i.e. input terminal Ie, is selected. When data Q3 is "2", input terminal ITm is selected. When data Q3 shows a different value ("3" or "0"), input terminal ITc is selected. Switching between a selected one of input terminals ITy, ITm and ITc and the input terminal ITk of the switch 134 is effected by data Q2 provided by the color addition control signal editing circuit 122. When data Q2 is "0", no color separation is printed before K separation and therefore the coloring density of K separation with the compensation effected for additivity failure is unnecessary. Consequently, coloring density SDk of K separation, i.e. input terminal ITk is selected at this time. When data Q2 is "1", a color separation is printed before K separation. The coloring density of K separation with the compensation effected for additivity failure, i.e. one of the input terminals ITy, ITm and ITc is selected.

In the above construction, input terminal Ig is selected first when data Q3 is "0", i.e. when no color separation is printed before K separation. This does not present any problem since input terminal ITk is selected next when no color separation is printed before K separation. Further, one of the input terminals ITy, ITm, ITc and ITk of the switch 134 may be selected according to the value ("1", "2", "3" or "0") of data Q3 instead of using data Q2.

Output data SDkt (i.e. a selected one of Kyt, Kmt, Kct and SDk) of the switch 134 is applied to a K/YMC conversion table 52 acting as a K/YMC conversing device. This data is thereby converted into coloring densities SDkty, SDktm and SDktc of Y, M and C components, which are applied to the respective adding circuits 135Y, 135M and 135C.

The adding circuits 135Y, 135M and 135C carry out simple addition of the data applied thereto, i.e. add SDyt and SDkty, SDmt and SDktm, and SDct and SDktc, respectively. Output data STy, STm and STc of the adding circuits 135Y, 135M and 135C are applied to a coloring density-to-voltage conversion table 51c as shown in FIG. 13, to be converted into corresponding voltages. These voltages are converted into analog signals by digital-to-analog (D/A) converters 53. Then, applied voltage signal Dyk for Y separation, applied voltage signal Dmk for M separation, and applied voltage signal Dck for C separation are inputted to input terminals Ic of multiplexers 6Y, 6M and 6C, respectively.

The adding circuits 135Y, 135M and 135C carry out simple addition of the data applied thereto. Since the added data are results of diminishment of the density reductions due to the additivity failure, the data outputted from the adding circuits 135Y, 135M and 135C reflect the compensation for additivity failure.

The Y-k trapping table 131Yk, M-k trapping table 131Mk, C-k trapping table 131Ck, K-y trapping table 132Ky, K-m trapping table 132Km and K-c trapping table 132Kc described above correspond to the coloring density adjusting device of the present invention. The adding circuits 135Y, 135M and 135C correspond to the color adding device of the present invention.

The manner in which all or any of the Y, M and C separations and K separation are printed in superposition will be described with reference to FIGS. 17A through 17F, taking Y separation for example.

Figure 17A:
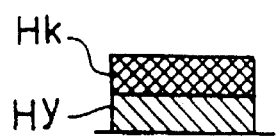
FIGS. 17A through 17F are views showing how Y separation and K separation are printed in superposition.

In FIG. 17A, K separation Hk is superposed on Y separation Hy, in which case a trapping shortage occurs with K separation Hk. The switch 134 selects and outputs data Kyt received from K-y trapping table 132Ky, and Y component is supplied from K/YMC conversion table 52 to the adding circuit 135Y for Y separation. Since Y separation is free from the trapping problem of K separation, the switch 133Y selects coloring density SDy of Y separation and applies this coloring density SDy to the adding circuit 135Y. The adding circuit 135Y adds coloring density SDy of Y separation and Y component of coloring density Kyt of K separation having the additivity failure compensated for. The applied voltage corresponding to the result of the addition is applied to input terminal Ic of multiplexer 6Y and to the AOM, whereby the photosensitive material F is exposed with B light beam in a modulated quantity. That is, the photosensitive material F is exposed with the coloring density combining the coloring density of Y separation and Y component of K separation having the additivity failure compensated for. Although M separation and C separation are not printed at this time, the dots on the photosensitive material where Y separation is exposed must be exposed also with G and R light beams for M component and C component of K separation to be printed. Thus, applied voltages corresponding to M component and C component with density Kyt of K separation having the additivity failure compensated for are applied to the multiplexers 6M and 6C for M and C separations (with the switches 133M and 133C selecting and outputting GND).

Figure 17B:
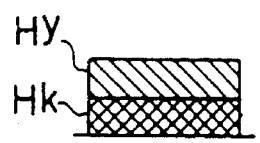

In FIG. 17B, Y separation Hy is superposed on K separation Hk, in which case a trapping shortage occurs with Y separation Hy, K separation Hy being free from the problem of trapping. Consequently, the multiplexer 6Y receives an applied voltage corresponding to the addition of coloring density Yt of Y separation having the additivity failure compensated for and Y component of coloring density SDk of K separation. At this time, the multiplexers 6M and 6C for M separation and C separation receive M component and C component of coloring density SDK of K separation, respectively.

Figure 17C:
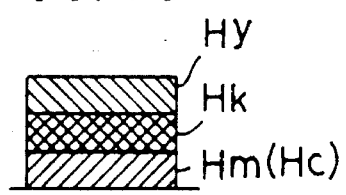

In FIG. 17C, K separation Hk is superposed on M separation Hm (or C separation Hc) and Y separation Hy superposed on K separation Hk. In this case, a trapping shortage occurs with Y separation Hy, and one with K separation Hy in relation to M separation Hm (or C separation Hc). Consequently, the multiplexer 6Y receives an applied voltage corresponding to the addition of coloring density Yt of Y separation having additivity failure compensated for and Y component of coloring density Ktm (or Ktc) of K separation with a compensation for the additivity failure due to the trapping shortage in relation to M separation (or C separation). The multiplexer 6M (or 6C) for M separation (or C separation) receives an applied voltage corresponding to the addition of coloring density SDm (or SDc) of M separation (or C separation) and M component (or C component) of coloring density Ktm (or Ktc) of K separation with the compensation for the additivity failure relating to M separation (or C separation).

Figure 17D:
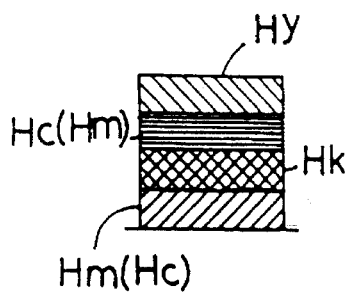

In FIG. 17D, K separation Hk is superposed on M separation Hm (or C separation Hc), C separation (or M separation) superposed on K separation Hk, and Y separation Hy superposed on C separation Hc (or M separation Hm). In this case, Y separation Hy has no trapping problem with respect to K separation Hk, but a trapping shortage occurs with K separation Hk in relation to M separation Hm (or C separation Hc). Consequently, the multiplexer 6Y receives an applied voltage corresponding to the addition of coloring density SDy of Y separation and Y component of coloring density Ktm (or Ktc) of K separation with a compensation for the additivity failure due to the trapping shortage in relation to M separation (or C separation).

Figure 17E:
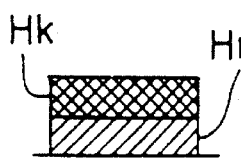

In FIG. 17E, K separation Hk is superposed on M separation Hm (or C separation Hc). Although Y separation is not printed, K separation is printed. It is therefore necessary to expose Y component of K separation Hk onto the photosensitive material with B light beam. Consequently, the adding circuit 135Y for Y separation adds Y component of coloring density Ktm (or Ktc) of K separation with a compensation for the additivity failure due to the trapping shortage in relation to M separation (or C separation) and GND (outputted from the switch 133Y since Y separation is not printed). As a result, the multiplexer 6Y receives an applied voltage corresponding to Y component of coloring density Ktm (or Ktc) of K separation with the compensation for the additivity failure due to the trapping shortage in relation to M separation (or C separation).

Figure 17F:
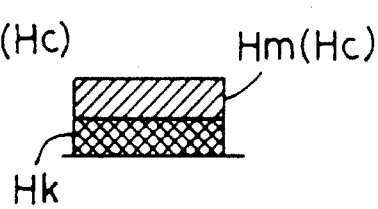

In FIG. 17F, M separation Hm (or C separation Hc) is superposed on K separation Hk. In this case, an applied voltage corresponding to Y component coloring density SDk of K separation (which is free from the trapping problem) is applied to the multiplexer 6Y in order to expose Y component of K separation Hk onto the photosensitive material with B light beam.

Superposition of M separation or C separation and K separation is processed in the same way as superposition of Y separation and K separation described above.

The multiplexers 6Y, 6M and 6C receive, at control input terminals Ix and Iy thereof, selection control signals YS1, YS2, MS1, MS2, CS1 and CS2 edited by the selection control signal editing circuit 121. In response to these selection control signals YS1, YS2, MS1, MS2, CS1 and CS2, i.e. combinations of "0" and "1" of the selection control signals inputted to the control input terminals Ix and Iy, the multiplexers 6Y, 6M and 6C switch the applied voltage signals inputted to the input terminals Ia, Ib, Ic and Id for output to AOMs 8Y, 8M and 8C, respectively. It is to be noted that ground voltage GND is applied to each input terminal Id.

Input terminals Ia are selected when both terminals Ix and Iy are "1". Input terminals Ib are selected when terminals Ix are "1" and terminals Iy are "0". Input terminals Ic are selected when terminals Ix are "0" and terminals Iy are "1". Input terminals Id are selected when both terminals Ix and Iy are "0".

Figures 18A, 18B, 18C, 18D:
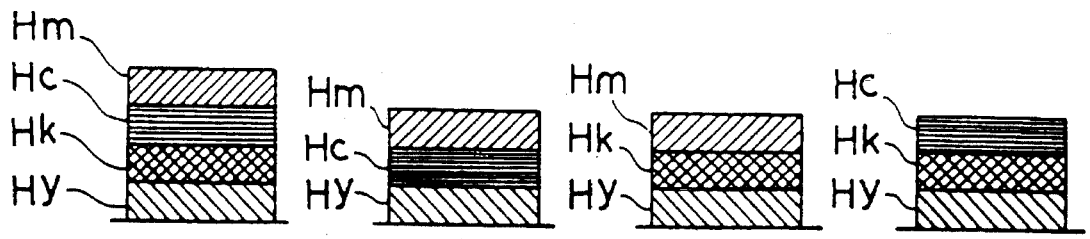
FIGS. 18A through 18P are views showing superposed states in production printing corresponding to different superposing combinations.
Figures 18E, 18F, 18G, 18H:
Figures 18I, 18J, 18K, 18L:
Figures 18M, 18N, 18O, 18P:

Table 3 below shows relationships, with respect to a given dot, among superposing combinations of the color separations, signals "dy", "dm", "dc" and "dk", outputted from the dot generator 7, selection control signals YS1, YS2, MS1, MS2, CS1 and CS2 outputted from the selection control signal editing circuit 121, and selection of input terminals Ia–Id of the multiplexers 6Y, 6M and 6C. Further, FIGS. 18A through 18P show superposed states in production printing corresponding to the superposing combinations of the color separations shown in Table 3, in which the color separations are printed in the order of Y, K, C and M (in the case the superposing order data OD=5).

TABLE 3

| Corres Fig. | Superpos. | | | | dy<br>dc | dm<br>dk | YS1<br>YS2 | MS1<br>MS2 | CS1<br>CS2 | MP Select. | | |
|---|---|---|---|---|---|---|---|---|---|---|---|---|
| | | | | | | | | | | 29Y | 29M | 29C |
| 18A | Y | K | C | M | 1<br>1 | 1<br>1 | 0<br>1 | 0<br>1 | 0<br>1 | Ic | Ic | Ic |
| 18B | Y | | C | M | 1<br>1 | 1<br>0 | 1<br>1 | 1<br>1 | 1<br>1 | Ia | Ia | Ia |
| 18C | Y | K | | M | 1<br>0 | 1<br>1 | 0<br>1 | 0<br>1 | 0<br>1 | Ic | Ic | Ic |

TABLE 3-continued

| Corres Fig. | Superpos. | | | dy / dc | dm / dk | YS1 / YS2 | MS1 / MS2 | CS1 / CS2 | MP Select. 29Y | 29M | 29C |
|---|---|---|---|---|---|---|---|---|---|---|---|
| 18D | Y | K | C | 1 / 1 | 0 / 1 | 0 / 1 | 0 / 1 | 0 / 1 | Ic | Ic | Ic |
| 18E |   | K | C M | 0 / 1 | 1 / 1 | 0 / 1 | 0 / 1 | 0 / 1 | Ic | Ic | Ic |
| 18F | Y |   | M | 1 / 0 | 1 / 0 | 1 / 1 | 1 / 1 | 0 / 0 | Ia | Ia | Id |
| 18G | Y | C |   | 1 / 1 | 0 / 0 | 1 / 1 | 0 / 0 | 1 / 1 | Ia | Id | Ia |
| 18H | Y | K |   | 1 / 0 | 0 / 1 | 0 / 1 | 0 / 1 | 0 / 1 | Ic | Ic | Ic |
| 18I |   | C | M | 0 / 1 | 1 / 0 | 0 / 0 | 1 / 1 | 1 / 1 | Id | Ia | Ia |
| 18J |   | K | M | 0 / 0 | 1 / 1 | 0 / 1 | 0 / 1 | 0 / 1 | Ic | Ic | Ic |
| 18K |   | K C |   | 0 / 1 | 0 / 1 | 0 / 1 | 0 / 1 | 0 / 1 | Ic | Ic | Ic |
| 18L | Y |   |   | 1 / 0 | 0 / 0 | 1 / 1 | 0 / 0 | 0 / 0 | Ia | Id | Id |
| 18M |   |   | M | 0 / 0 | 1 / 0 | 0 / 0 | 1 / 1 | 0 / 0 | Id | Ia | Id |
| 18N |   | C |   | 0 / 1 | 0 / 0 | 0 / 0 | 0 / 0 | 1 / 1 | Id | Id | Ia |
| 18O |   | K |   | 0 / 0 | 0 / 1 | 1 / 0 | 1 / 0 | 1 / 0 | Ib | Ib | Ib |
| 18P | blank |   |   | 0 / 0 | 0 / 0 | 0 / 0 | 0 / 0 | 0 / 0 | Id | Id | Id |

In Table 3, the references in column "Corres Fig." denote corresponding relations with FIGS. 18A–18P, and "MP" stands for multiplexers. In FIGS. 18A–18P, references "Hy", "Hm", "Hc" and "Hk" denote Y separation, M separation, C separation and K separation, respectively.

As also seen from Table 3, selection control signals YS1, YM1 and YC1 are "1" for the superposing states in which input terminals Ia and Ib are selected, and "0" for the superposing states in which input terminals Ic and Id are selected. Such selection control signals YS1, YM1 and YC1 are derived from equations (1), (3) and (5) set forth hereinbefore. Selection control signals YS2, YM2 and YC2 are "1" for the superposing states in which input terminals Ia and Ic are selected, and "0" for the superposing states in which input terminals Ib and Id are selected. Such selection control signals YS2, YM2 and YC2 are derived from equations (2), (4) and (6) set forth hereinbefore.

As shown in FIG. 11, applied voltages VY, VM and VC outputted from multiplexers 6Y, 6M and 6C are applied to AOMs 8Y, 8M and 8C, respectively. The subsequent operation is the same as in the first embodiment. B, G and R laser sources 9B, 9G and 9R output light beams to AOMs 8Y, 8M and 8C for modulation to light quantities corresponding to the above applied voltages VY, VM and VC, respectively. The modulated light beams are reflected by a total reflection mirror 10 and dichroic mirrors 11 and 12 to travel along one optical axis through an imaging lens 13 to the photosensitive material F mounted on a rotary cylinder 14, to expose halftone images according to patterns of cells formed on printing cylinders.

For areas of superposition of all or any of Y, M and C separations which are chromatic colors and K separation which is an achromatic color, as described with reference to FIGS. 17A–17F and 18A–18P and Table 3, compensation is effected for additivity failure of Y, M or C separation superposed on K separation, and for additivity failure of K separation superposed on Y, M or C separation. Consequently, the R, G and B coloring densities in the areas of superposition of all or any of Y, M and C separations and K separation become substantially the same as the densities of these areas in production prints. Thus, a color proof image formed on the photosensitive material F has a compensation effected for the additivity failure occurring on the production prints.

In this embodiment, the dot generator 7, pattern signal editing circuit 107, and multiplexers 6Y, 6M and 6C in the density signal editing circuit 105 correspond to the exposure control device of the present invention. The K/YMC conversion table 52 and color adding circuit 154 shown in FIG. 13 (including the K/YMC conversion device and color adding device) constitute the density distributing device of the present invention.

While the second embodiment has been described in relation to the compensation for additivity failure occurring between the chromatic and achromatic colors, a compensation may be effected for additivity failure between the chromatic colors based on the same principle.

This will be described taking a case of M separation Hm superposed on Y separation Hy for example as shown in FIG. 19A.

In this case a trapping shortage occurs with the upper, M separation Hm. Thus, the coloring density M separation Hm is adjusted by multiplying it by the density sufficiency rate, and the result is used for adjusting the modulated light quantity of G light beam. The device for adjusting the coloring density of M separation Hm may have constructions similar to the trapping tables described hereinbefore. On the other hand, B light beam is adjusted to a modulated light quantity according to the coloring density of Y separation Hy. By exposing B light and G light on the photosensitive material F, halftone images with a compensation effected for additivity failure are exposed in areas of superposition of Y separation and M separation on the photosensitive material F. The density sufficiency rate for adjusting the coloring density of M separation may be obtained from the sample of FIGS. 16A–16C created by superposing M separation on Y separation.

For areas of superposition of the other chromatic colors, halftone images with a compensation effected for additivity failure may similarly be exposed on the photosensitive material F. Where, as shown in FIG. 19B, the three chromatic colors are superposed, the coloring density of M separation Hm is adjusted according the trapping shortage of M separation Hm occurring in relation to Y separation Hy, and the coloring density of C separation Hc is adjusted according the trapping shortage of C separation Hc occurring in relation to M separation Hm.

Where, as shown in FIG. 19C, Y, K, M and C separations are superposed in the stated order, the coloring density of C separation Hc may be adjusted according the trapping shortage of C separation Hc occurring in relation to M separation Hm, besides the adjustment of the coloring densities of K separation Hk and M separation Hm as in the second embodiment described above.

The compensation for additivity failure between the chromatic colors may be effected in the same manner in the subsequent embodiments (if constructed to compensate for additivity failure). The device (such as the tables) for reducing the coloring density of a color separation encountering a trapping shortage, according to additivity failure, in order to compensate for additivity failure between the chromatic colors, also corresponds to the coloring density adjusting device of the present invention.

The second embodiment has been described, assuming that the color proof image with additivity failure compensated for is formed on a negative material. As noted in the first embodiment, the color proof image with additivity failure compensated for may, of course, be formed on a positive material instead. Further, in the following embodiments constructed to compensate for additivity failure, the color proof image with additivity failure compensated for may be formed on a positive material also.

Third Embodiment

A third embodiment of the present invention will be described next with reference to FIGS. 20 and 21.

The apparatus in the third embodiment is used to create a color proof image on a photosensitive material (negative) for prints to be made with printing cylinders prepared by the direct gravure system. As noted hereinbefore, the direct gravure system is a type of the halftone gravure system, which expresses density tones by varying cell area while maintaining cell depth constant. In the following description, like reference numerals are used to identify like parts in FIGS. 1 and 2 which are the same as in the first embodiment and will not particularly be described again.

In this direct gravure system, density tones are expressed by varying dot %, i.e. area, of the cells. However, depending on chemical conditions such as etching for preparing the printing cylinders, the cells formed have varied depths throughout, to vary ink quantities transferred to paper, thereby varying finish of prints. In the third embodiment of the invention, therefore, coloring densities on the photosensitive material F are adjusted according to cylinder preparing conditions, i.e. conditions varying cell depth, and operation of the AOMs is controlled according to dot % of the cells.

Condition-to-color density conversion tables (cond/clr dsty tbls) 21Y, 21M and 21C identify coloring densities of the respective color separations based on cell depth determining conditions.

Figure 22:
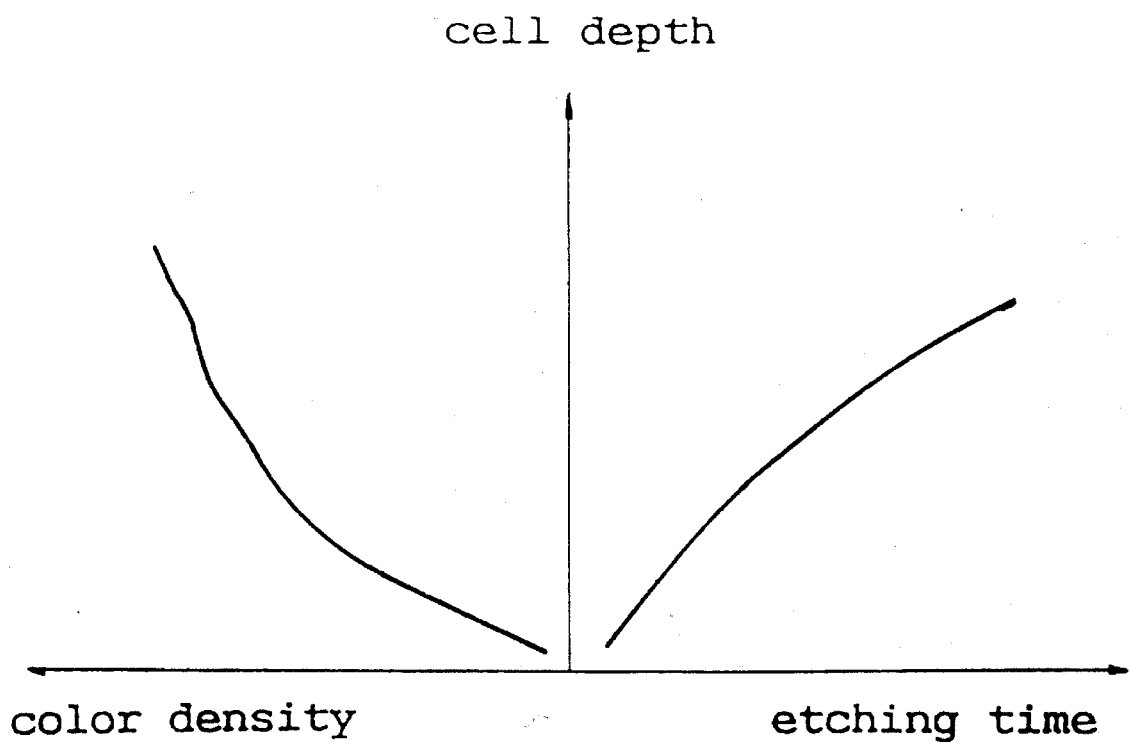
FIG. 22 is a view showing relationships among cell depth determining chemical condition, cell depth formed and coloring density.

FIG. 22 shows cell depth variations occurring with variations in etching time which is one example of the cell depth determining conditions, and variations in coloring density dependent on the cell depth. As seen, the coloring density may be identified once the conditions (i.e. etching time in the illustrated example) are identified.

The condition-to-color density conversion tables 21Y, 21M and 21C store relationships as shown in FIG. 22. When a setter 4 is operated to set the cell depth determining conditions such as a concentration of an etching solution, etching time, temperature, humidity and the like, the condition-to-color density conversion tables 21Y, 21M and 21C output coloring densities Ny, Nm and Nc based on these conditions, respectively. Output data Ny, Nm and Nc are applied to a signal editing circuit 20.

In this embodiment, the chemical conditions correspond to the cell forming conditions according to the present invention. The condition-to-color density conversion tables 21Y, 21M and 21C and K/YMC density conversion table (K/YMC dsty tbl) 22 described hereinafter correspond to the coloring density identifying device of the present invention. The setter 4 corresponds to the input device of the present invention. The condition-to-color density conversion tables 21Y, 21M and 21C and K/YMC density conversion table 22 also correspond to the conversion tables of the present invention.

When the cell depth determining conditions for K separation are set through the setter 4, the K/YMC density conversion table 22 identifies the coloring density of K separation as do the condition-to-color density conversion tables 21Y, 21M and 21C, converts the coloring density into coloring densities NKy, NKm and NKc of Y, M and C components by a conversion system similar to that of the K/YMC conversion table 52 in the first embodiment. Data NKy, NKm and NKc are applied to the signal editing circuit 20.

A construction of the signal editing circuit 20 will be described with reference to FIG. 21.

Coloring densities Ny, Nm and Nc of Y, M and C separations inputted to the signal editing circuit 20 are applied to coloring density-to-voltage conversion tables 51a, 51b and 51c and a color adding circuit 54, respectively.

The coloring density-to-voltage conversion tables 51a, 51b and 51c convert coloring densities Ny, Nm and Nc of Y, M and C separations into voltages for application to the AOMs. These voltages are converted into analog signals by digital-to-analog (D/A) converters 53, which are applied to input terminals Ia of multiplexers 6Y, 6M and 6C.

In this embodiment, the coloring density-to-voltage conversion tables 51a, 51b and 51c correspond to the modulating information identifying device of the present invention.

Coloring densities NKy, NKm and NKc of Y, M and C components of K separation inputted to the signal editing circuit 20 are applied to the coloring density-to-voltage conversion tables 51a, 51b and 51c and color adding circuit 54, respectively.

The coloring density-to-voltage conversion tables 51a, 51b and 51c convert coloring densities NKy, NKm and NKc of Y, M and C components into voltages for application to the AOMs. These voltages are converted into analog signals by D/A converters 53, which are applied to input terminals Ib of multiplexers 6Y, 6M and 6C.

The color adding circuit 54, as in the first embodiment, simply adds coloring density NKy of Y component of K separation to coloring density Ny of Y separation, coloring density NKm of M component of K separation to coloring density Nm of M separation, and coloring density NKc of C component of K separation to coloring density Nc of C separation. The results of the addition NY, NM and NC are converted into voltages by the coloring density-to-voltage conversion tables 51a, 51b and 51c, which are in turn converted into analog signals by the D/A converters 53 for application to input terminals Ic of multiplexers 6Y, 6M and 6C, respectively.

In this embodiment, K/YMC density conversion table 22 and color adding circuit 54 constitute the density distributing device of the present invention.

Figure 20:
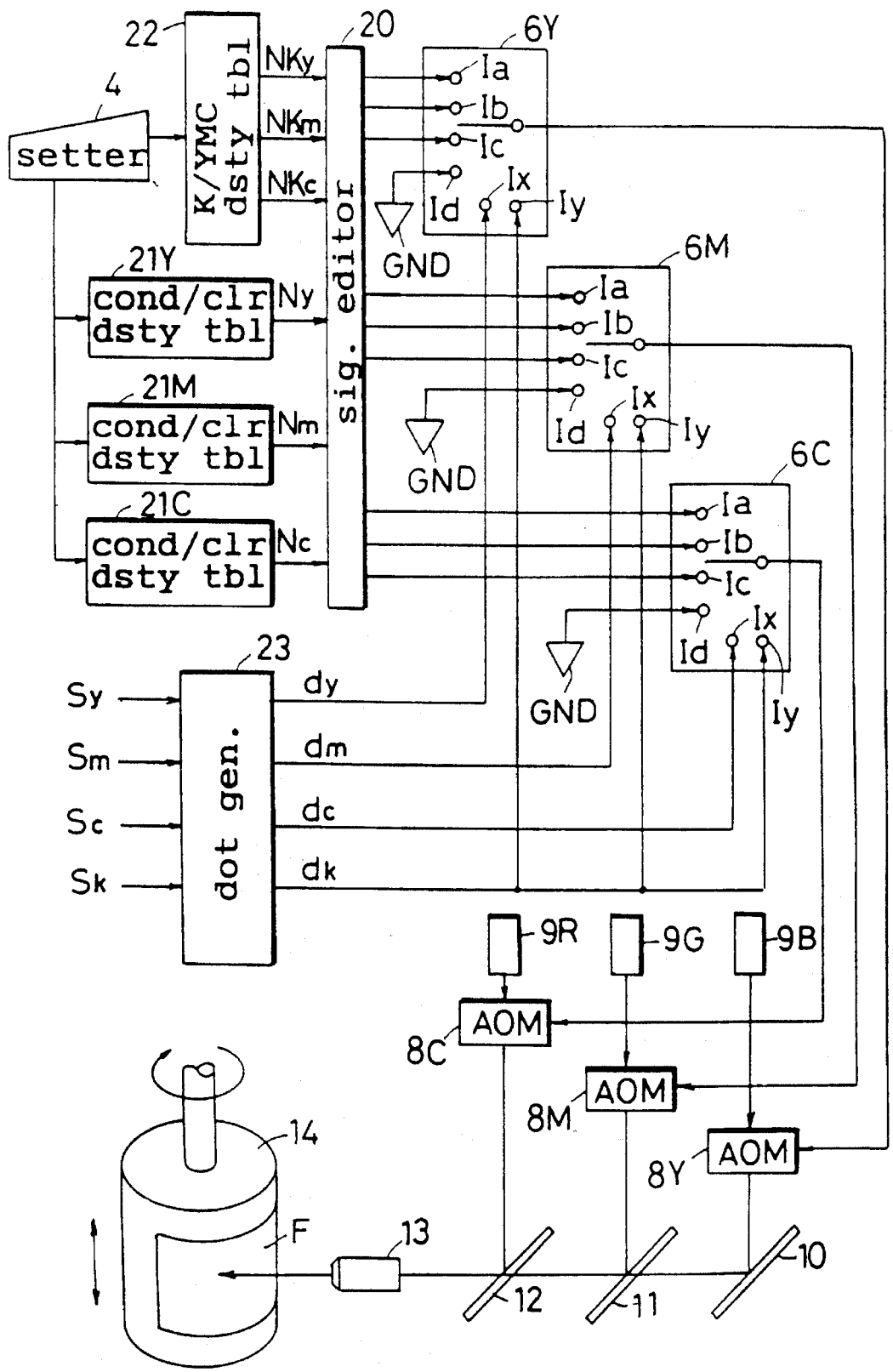
FIG. 20 is a block diagram of a color image proofing apparatus in a third embodiment of the present invention.
Figure 21:
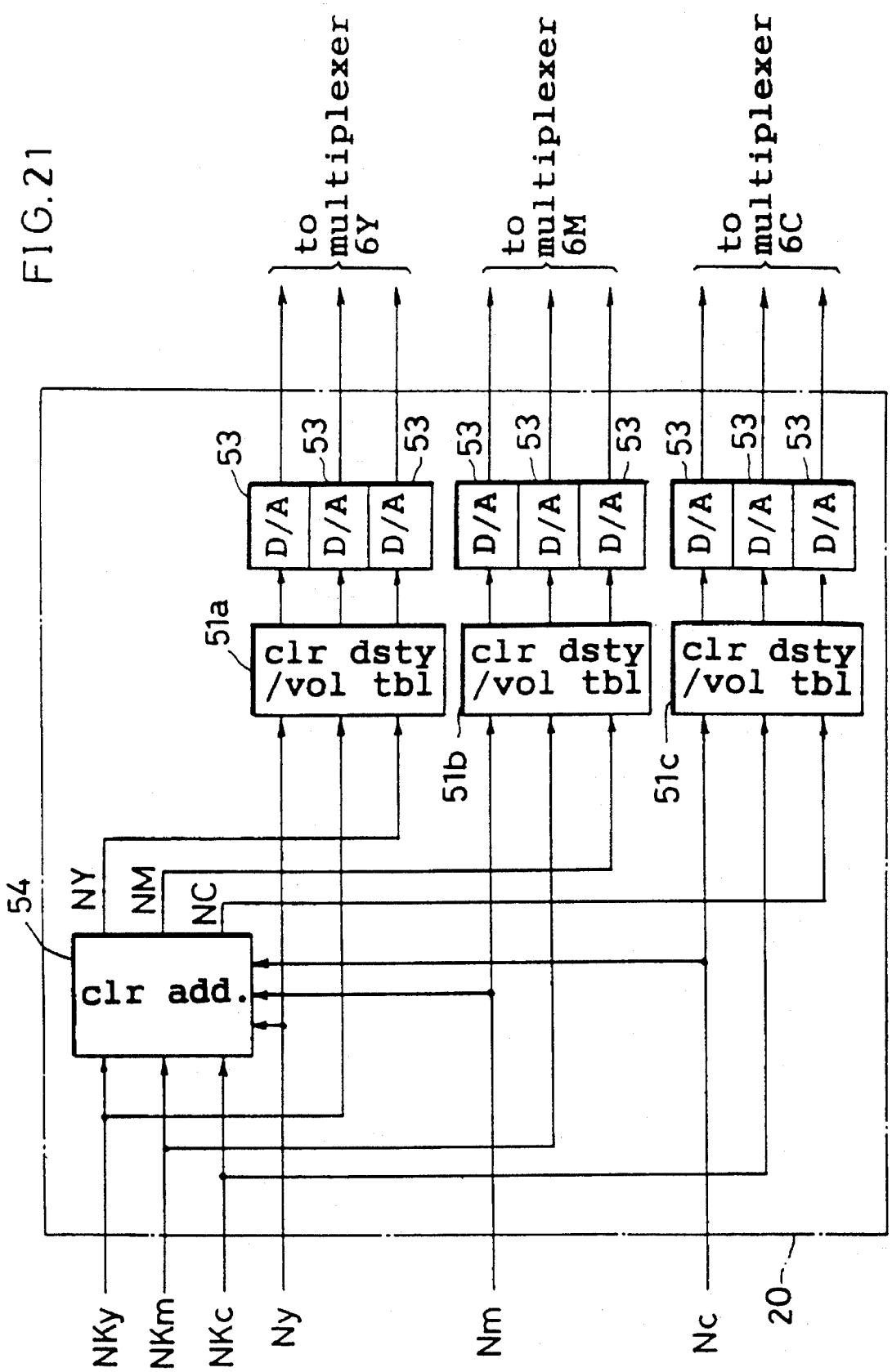
FIG. 21 is a block diagram of a signal editing circuit of the apparatus in the third embodiment.

Reverting to FIG. 20, a dot generator 23 receives image data Sy, Sm, Sc and Sk of Y, M, C and K separations from a layout system not shown. In this embodiment, image data Sy, Sm, Sc and Sk have density tones proportional to the areas of cells formed on cylinders used in production printing. The dot generator 23 stores halftone gravure positive patterns for the respective color separations used in preparing the printing cylinders, with angles for the respective separations applicable in preparing the cylinders. Densities of image data Sy, Sm, Sc and Sk applied are converted into dot % of cell forming areas. Based on dot % patterns, the dot generator 23 determines whether exposed unit dots are recessed (to hold ink) or not (not to hold ink) when cells are formed on the cylinders. The dot generator 23 outputs "ON" for recesses, and "OFF" for non-recesses.

Figure 23:
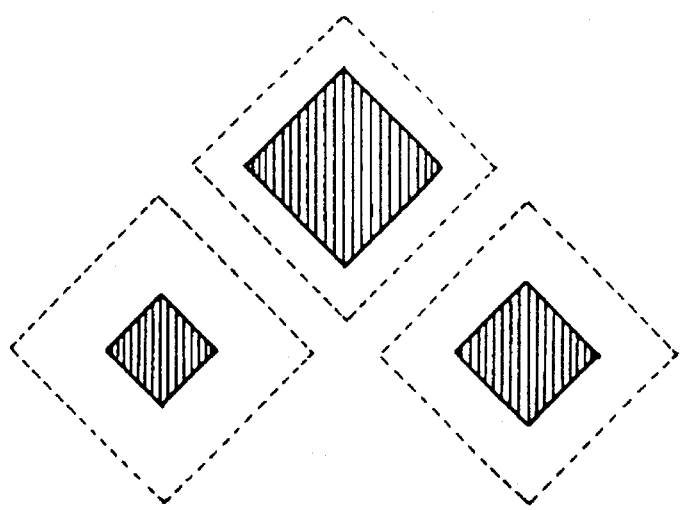
FIG. 23 is a view of a halftone gravure positive pattern.

FIG. 23 shows an example of plate patterns for Y separation, in which hatched central portions are recessed in preparing the cylinder. From the image data density of Y separation and the pattern shown in FIG. 23, the dot generator 23 determines recesses and non-recesses for respective discrete dots. Similar determining steps are taken for M, C and K separations also. However, since the cell patterns of the respective color separations have different arranging angles, the dot generator 23 takes these angles into account, determines "ON" and "OFF" of the respective color separations synchronously for the same positions (dots) on the photosensitive material F, and outputs the results. Signal "dy" representing the result for Y separation is applied to a control input terminal Ix of the multiplexer 6Y. Signal "dm" representing the result for M separation is applied to a control input terminal Ix of the multiplexer 6M. Signal "dc" representing the result for C separation is applied to a control input terminal Ix of the multiplexer 6C. Signal "dk" representing the result for K separation is applied to control input terminals Iy of the respective multiplexers 6Y, 6M and 6C.

In this embodiment, dot % of cell forming areas of the color separations obtained from image data Sy, Sm, Sc and Sk inputted, and the halftone gravure positive patterns and their arranging angles stored in the dot generator 23 correspond to the cell patterns formed on the gravure printing cylinders of the present invention. The dot generator 23 and multiplexers 6Y, 6M and 6C correspond to the exposure control device of the present invention.

In this embodiment, once the chemical conditions are set, the cell depth is fixed according to such conditions. It is unnecessary to vary coloring densities according to the image data as in the first embodiment. Based on timing of input to the input terminals Ix and Iy of multiplexers 6Y, 6M and 6C, halftone images may be exposed on the photosensitive material F in the same cell patterns as formed on the gravure printing cylinders as described hereinafter.

In response to the signals inputted to the control input terminals Ix and Iy, the multiplexers 6Y, 6M and 6C switch the applied voltage signals inputted to the respective input terminals Ia, Ib, Ic and Id, and output the voltage signals to AOMs 8Y, 8M and 8C. The multiplexers 6Y, 6M and 6C receive ground voltage GND at input terminals Id thereof, respectively.

In switching of the multiplexers 6Y, 6M and 6C, input terminals Ia are selected when terminals Ix are "ON" and terminals Iy are "OFF", and input terminals Ib are selected when terminals Ix are "OFF" and terminals Iy are "ON". Input terminals Ic are selected when both terminals Ix and Iy are "ON", and input terminals Id are selected when both terminals Ix and Iy are "OFF".

The applied voltages outputted from the multiplexers 6Y, 6M and 6C are applied to AOMs 8Y, 8M and 8C, respectively, whereby a color proof image is created on the photosensitive material (negative) F as in the first embodiment.

The proof image is produced according to a dot % pattern corresponding to density tones, such that predetermined coloring densities are given to inked areas in production printing, and no coloring to areas of no ink application. Moreover, the coloring densities for the inked areas are determined by the cell depths dependent on the chemical conditions. Thus, the proof has the same finish as production prints.

In this direct gravure system, as in the first embodiment, a color proof image may be produced on a positive photosensitive material, taking into account the conditions for forming cells on the cylinders of Y, M, C and K separations. However, in the direct gravure system, as noted hereinbefore, density tones in prints are expressed basically by cell areas. That is, variations in cell depth do not significantly influence the density tones in the prints. As described in the first embodiment, a positive material expresses the stronger coloring with the lower exposure. When a proof image is formed on a positive material, therefore, exposure must be lowered for areas where the color separations are printed. Exposure variations for such areas have little influence on finish of the proof image. Consequently, where a positive material is used for recording a color proof image of prints produced with the cylinders prepared by the direct gravure system, a color proof image closely resembling finish of production prints may be obtained without taking into account the coloring densities according to the conditions for forming cells for K separation. An embodiment specially adapted for realizing such a proof image will be described hereinafter as a fourth embodiment.

Fourth Embodiment

The apparatus in the fourth embodiment of the present invention will be described next with reference to FIG. 24.

Figure 24:
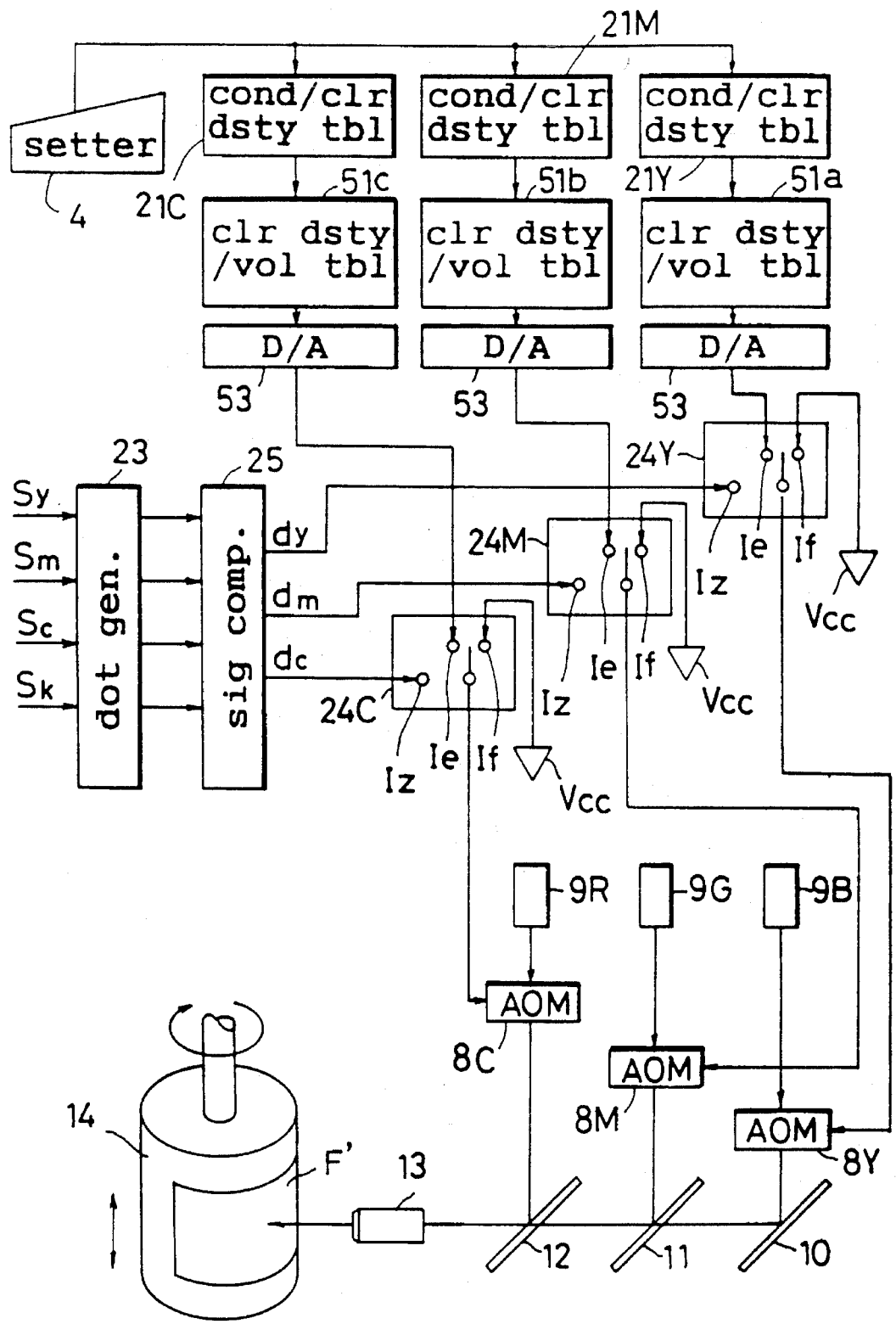
FIG. 24 is a block diagram of a color image proofing apparatus in a fourth embodiment of the present invention.

In FIG. 24, like reference numerals are used to identify like parts in the foregoing drawings, which will not particularly be described again.

Figure 25:
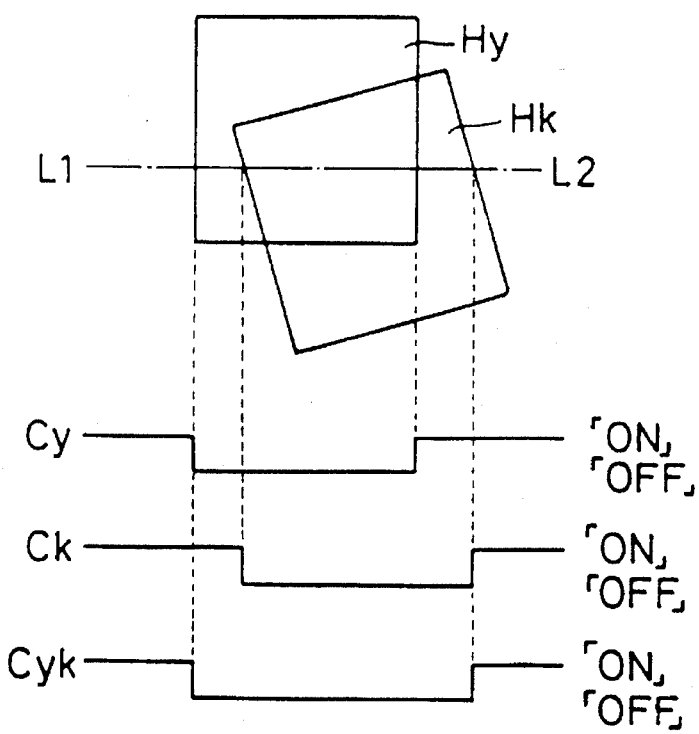
FIG. 25 is a view used for explaining a principle of exposure control in the fourth embodiment.

In this embodiment, as shown in FIG. 25, for example, areas where Y separation Hy and K separation Hk are superposed are exposed with the coloring density for printing only Y separation Hy as for areas where only Y separation Hy is printed or areas where only K separation Hk is printed. FIG. 25 shows states of exposure with B (blue) light beam according to a superposing mode of Y separation Hy and K separation Hk. Signal Cy is a signal for coloring only Y separation Hy at L1–L2. "ON" denotes a state of exposing with B light beam, with voltage Vcc applied to AOM 8Y. "OFF" denotes a state of exposing with B light beam, with the voltage lowered according to the coloring density of Y separation and applied to AOM 8Y. Signal Ck is a signal for coloring only K separation Hk at L1–L2. Signal Cyk is a signal for coloring Y separation and K separation Hy at L1–L2. This signal Cyk is derived from an AND of signal Cy and signal Ck. FIG. 25, when "ON" and "OFF" of signals Cy, Ck and Cyk are inverted, signal Cyk is derived from an OR of signal Cy and signal Ck.

In this embodiment, the coloring density of K separation (coloring density of Y, M or C component of K separation) need not be considered for superposing K separation and Y, M or C separation. Thus, the apparatus in this embodiment may have a simpler construction than in the third embodiment.

Specifically, as shown in FIG. 24, when cell depth conditions for Y, M and C separations are set through a setter 4, condition-to-color density conversion tables 21Y, 21M and 21C identify coloring densities for Y, M and C separations according to the respective cell depth conditions.

In this embodiment, the chemical conditions for determining cell depth correspond to the cell forming conditions according to the present invention. The condition-to-color density conversion tables 21Y, 21M and 21C correspond to the coloring density identifying device of the present invention.

Coloring density-to-voltage conversion tables 51a, 51b and 51c convert coloring densities Y, M and C into voltages for application to the AOMs. The conversion by the coloring density-to-voltage conversion tables 51a, 51b and 51c are effected according to the relationship shown in the dotted line in the second quadrant of FIG. 6. Output data of the coloring density-to-voltage conversion tables 51a, 51b and 51c are converted into analog signals by D/A converters 53, which are applied to input terminals Ie of switches 24Y, 24M and 24C, respectively. The switches 24Y, 24M and 24C receive Vcc at input terminals If.

In this embodiment, the coloring density-to-voltage conversion tables 51a, 51b and 51c correspond to the modulating information identifying device of the present invention.

A dot generator 23 receives image data Sy, Sm, Sc and Sk of Y, M, C and K separations from a layout system not shown. The dot generator 23 stores halftone gravure positive patterns with angles. Dot % of cell forming areas are determined from densities of the image data applied. Based on dot % patterns, the dot generator 23 determines whether exposed unit dots are recessed (to hold ink) or not (not to hold ink) when cells are formed on the cylinders. The dot generator 23 outputs "OFF" for recesses and "OFF" for non-recesses on a positive photosensitive material.

Output data of the dot generator 23 are applied to a signal composing circuit (sig comp.) 25. The signal composing circuit 25 determines an AND of "ON" and "OFF" signals of Y separation and "ON" and "OFF" signals of K separation, an AND of "ON" and "OFF" signals of M separation and "ON" and "OFF" signals of K separation, and an AND of "ON" and "OFF" signals of C separation and "ON" and "OFF" signals of K separation. The signal composing circuit 25 applies results "dy", "dm" and "dc" to control input terminals Iz of the switches 24Y, 24M and 24C, respectively.

In this embodiment, dot % of cell forming areas of the color separations obtained from image data Sy, Sm, Sc and Sk inputted, and the halftone gravure positive patterns and their arranging angles stored in the dot generator 23 correspond to the cell patterns formed on the gravure printing cylinders of the present invention. The dot generator 23, signal composing circuit 25 and switches 24Y, 24M and 24C correspond to the exposure control device of the present invention.

The switches 24Y, 24M and 24C select input terminals If (Vcc) when the signals inputted to the control input terminals Iz are "ON", and input terminals Ie when the signals inputted to the control input terminals Iz are "OFF". Applied voltages thereby selected are outputted to AOMs 8Y, 8M and 8C.

The applied voltages outputted from the switches 24Y, 24M and 24C are applied to AOMs 8Y, 8M and 8C, respectively, whereby a color proof image is created on the positive photosensitive material F as in the foregoing embodiments.

In this embodiment, the coloring density of K separation is not considered, and therefore additivity failure between K separation and other separations need not be compensated for. However, the apparatus may be adapted to compensate for additivity failure in Y, M and C separations.

Fifth Embodiment

A fifth embodiment of the present invention will be described next with reference to FIG. 26.

As in the third embodiment, the apparatus in the fifth embodiment is used to create a color proof image on a photosensitive material (negative) for prints to be made with printing cylinders prepared by the direct gravure system. In this embodiment, however, the apparatus in the third embodiment is adapted to compensate for an additive failure occurring when superposing chromatic and achromatic colors. Like reference numerals are used to identify like parts in the foregoing drawings, which are the same as in the second and third embodiments and will not be described again.

Figure 26:
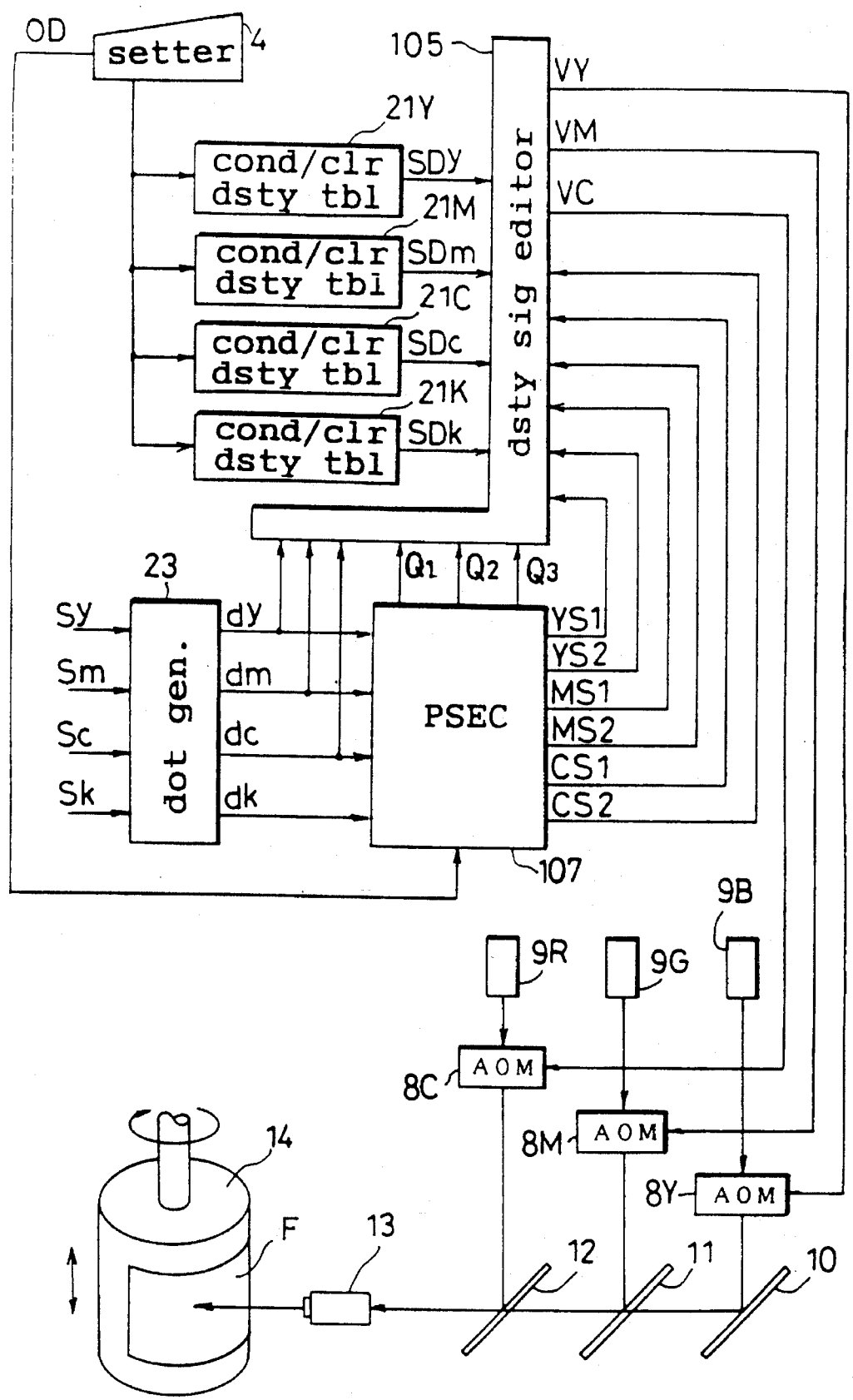
FIG. 26 is a block diagram of a color image proofing apparatus in a fifth embodiment of the present invention.

FIG. 26 shows a specific construction of this embodiment. As in the second embodiment relative to the first embodiment, a density signal editing circuit 105 (including multiplexers 6Y, 6M and 6C as shown in FIG. 13) is provided in place of the signal editing circuit 5 and multiplexers 6Y, 6M and 6C of the third embodiment (see FIG. 20). A pattern signal editing circuit 107 is added to the third embodiment. Further, since the coloring density of K separation is converted into Y, M and C components in the density signal editing circuit 105, a condition-to-color density conversion table 21K is provided in place of the K/YMC density conversion table 22 of the third embodiment. The condition-to-color density conversion table 21K serves the purpose of obtaining the coloring density of K separation according to the chemical conditions set through the setter 4 for forming cells on the cylinder of K separation. This table 21K has the same construction as the condition-to-color density conversion tables 21Y, 21M and 21C.

The density signal editing circuit 105 and pattern signal editing circuit 107 have been described in detail in the second embodiment, and will not particularly be described here. In this embodiment, necessary data are edited according to superposition of the color separations based on coloring densities (based on the chemical conditions set) SDy, SDm, SDc and SDk obtained from the condition-to-color density conversion tables 21Y, 21M, 21C and 21K. The edited data are inputted to the respective input terminals of multiplexers 6Y, 6M and 6C in the density signal editing circuit 105. At this time, a color adding circuit 154 (see FIGS. 13 and 14) adds data for areas of superposition of the chromatic colors and achromatic color, with adjustments made for density reductions due to additivity failure.

On the other hand, the pattern signal editing circuit 107, based on signals "dy", "dm", "dc" and "dk" supplied from the dot generator 23 and on the superposing order data OD, edits selection control signals YS1, YS2, MS1, MS2, CS1 and CS2 and color addition control signals Q1, Q2 and Q3.

The multiplexers 6Y, 6M and 6C in the density signal editing circuit 105, based on selection control signals YS1, YS2, MS1, MS2, CS1 and CS2, switch the input terminals to output data VY, VM and VC corresponding to cell patterns (i.e. voltages corresponding to coloring densities and applied to AOMs).

With the above construction, a color proof image with a compensation for additivity failure is created for prints made with cylinders prepared by the direct gravure system.

In this embodiment, the dot generator 23, pattern signal editing circuit 107, and multiplexers 6Y, 6M and 6C in the density signal editing circuit 105 correspond to the exposure control device of the present invention. The K/YMC conversion table 52 and color adding table 154 in the density signal editing circuit 105 correspond to the density distributing device of the present invention. The condition-to-color density conversion tables 21Y, 21M, 21C and 21K correspond to the coloring density identifying device and conversion tables of the present invention.

Sixth Embodiment

Figure 27:
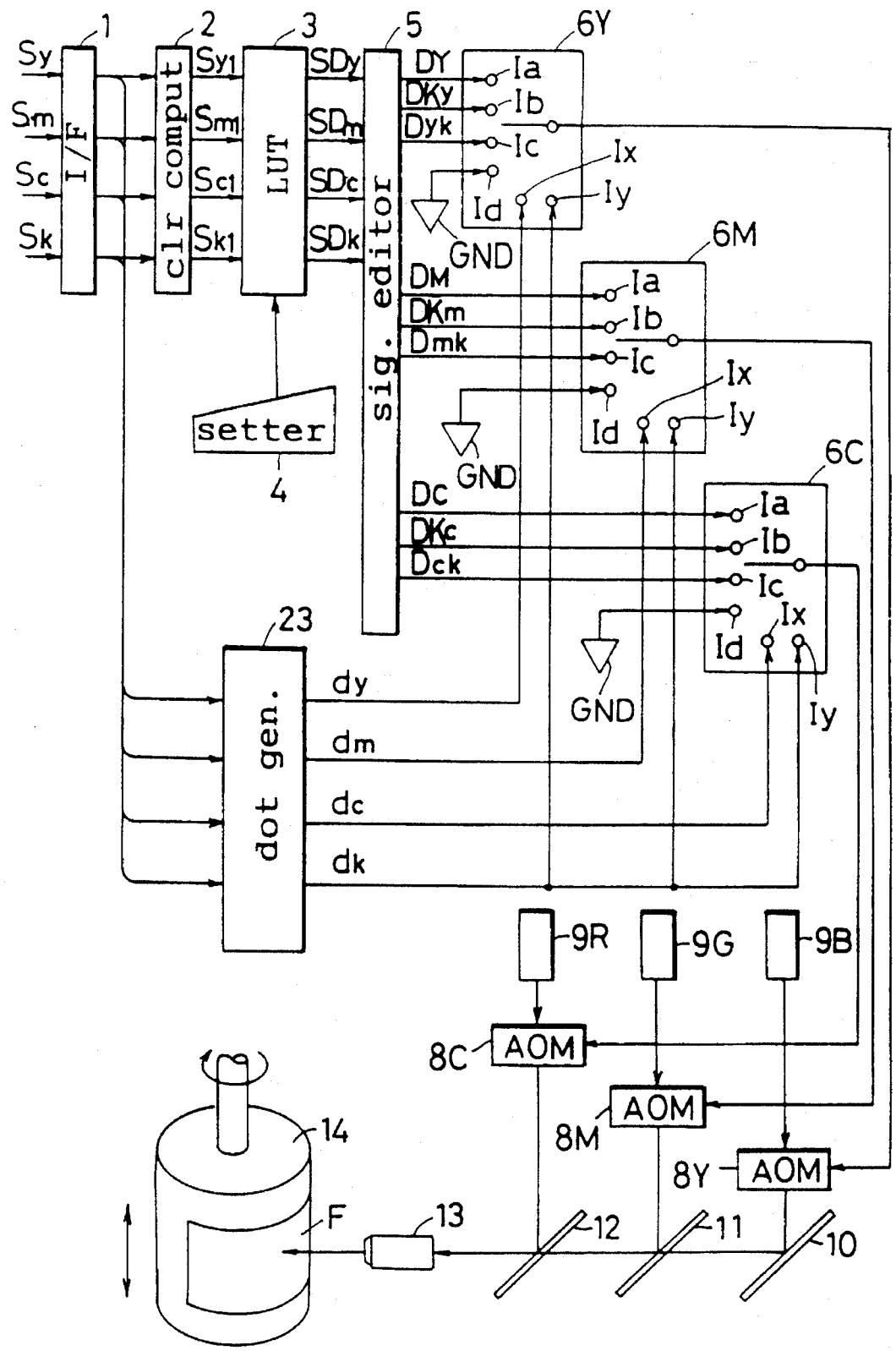
FIG. 27 is a block diagram of a color image proofing apparatus in a sixth embodiment of the present invention.

A sixth embodiment of the present invention will be described next with reference to FIG. 27.

The apparatus in the sixth embodiment is used to create a color proof image on a photosensitive material (negative) for prints to be made with printing cylinders prepared by the two-positive system using a continuous-tone positive and a halftone gravure positive. As noted hereinbefore, the two-positive system is a type of the halftone gravure system, which expresses density tones by varying both cell depth and cell area. In the following description, like reference numerals are used to identify like parts in the foregoing embodiments, and will not particularly be described again.

According to this system, the depths of cells formed are determined by the density tones of the continuous-tone positive and the chemical conditions for forming the cells. Cell patterns are determined by the patterns of the halftone gravure positive corresponding to the density tones of a color original (i.e. the density tones proportional to the areas of cells formed on production printing cylinders).

This embodiment, therefore, has a construction, as in the first embodiment, for adjusting coloring densities according to cell depth, and a construction, as in the third embodiment, for controlling switching of multiplexers 6Y, 6M and 6C according to the cell patterns.

Specifically, image data Sy, Sm, Sc and Sk from a system are transmitted through a color computation circuit 2, a chemical element adjusting LUT 3 and a signal editing circuit 5 (see FIG. 2) to be converted into applied voltages for providing coloring densities corresponding to cell forming conditions. These voltages are applied to input terminals Ia–Ic of multiplexers 6Y, 6M and 6C. This construction is the same as in the first embodiment. The multiplexers 6Y, 6M and 6C receive ground voltage GND at input terminals Id.

In this embodiment, the densities of data Sy1, Sm1, Sc1 and Sk1 and the chemical conditions applied to the chemical element adjusting LUT 3 correspond to the cell forming conditions according to the present invention. The chemical element adjusting LUT 3 corresponds to the coloring density identifying device of the present invention. The interface circuit 1 and setter 4 correspond to the input device of the present invention. The chemical element adjusting LUT 3 corresponds also to the conversion table of the present invention. Further, the coloring density-to-voltage conversion tables 51a, 51b and 51c in the signal editing circuit 5 correspond to the modulating information identifying device of the present invention. The K/YMC conversion table 52 and color adding circuit 54 in the signal editing circuit 5 constitute the density distributing device of the present invention.

The dot generator 23 receives image data Sy, Sm, Sc and Sk from the system. Based on halftone gravure positive patterns stored as associated with the densities of the image data, the dot generator 23 determines areas to which ink is applied and areas to which no ink is applied, and applies results "dy", "dm", "dc" and "dk" to control input terminals Ix and Iy of multiplexers 6Y, 6M and 6C. This construction is the same as in the third embodiment.

The production printing cylinders are prepared by superposing, exposing and etching the continuous-tone positive corresponding to the density tones of the color original and the halftone gravure positive of dot % corresponding to the density tones of the color original. Image data Sy, Sm, Sc and Sk are obtained by color-separating the color original. Thus, this embodiment determines coloring densities and controls exposure (exposure pattern analysis) based on image data Sy, Sm, Sc and Sk.

In this embodiment, dot % of cell forming areas of the color separations obtained from image data Sy, Sm, Sc and Sk inputted, and the halftone gravure positive patterns and their arranging angles stored in the dot generator 23 correspond to the cell patterns formed on the gravure printing cylinders of the present invention. The dot generator 23 and multiplexers 6Y, 6M and 6C correspond to the exposure control device of the present invention.

With the image data applied to the dot generator 23 as well as the color computation circuit 2, input timing of the voltage signals to input terminals Ia–Ic of multiplexers 6Y, 6M and 6C may be synchronized with input timing of "ON" and "OFF" signals to control input terminals Ix and Iy. Consequently, as described hereinafter, the halftone image exposed on the photosensitive material (negative) F is made to correspond to the cell patterns formed on the gravure printing cylinders.

The other aspects of this embodiment are the same as in the first and third embodiments, and will not be described here.

Seventh Embodiment

A seventh embodiment of the present invention will be described next with reference to FIG. 28.

As in the sixth embodiment, the apparatus in the seventh embodiment is used to create a color proof image on a photosensitive material (negative) for prints to be made with printing cylinders prepared by the two-positive system. In this embodiment, however, the apparatus in the sixth embodiment is adapted to compensate for an additive failure occurring when superposing chromatic and achromatic colors. Like reference numerals are used to identify like parts in the foregoing drawings, which are the same as in the second, fifth and sixth embodiments and will not be described again.

Figure 28:
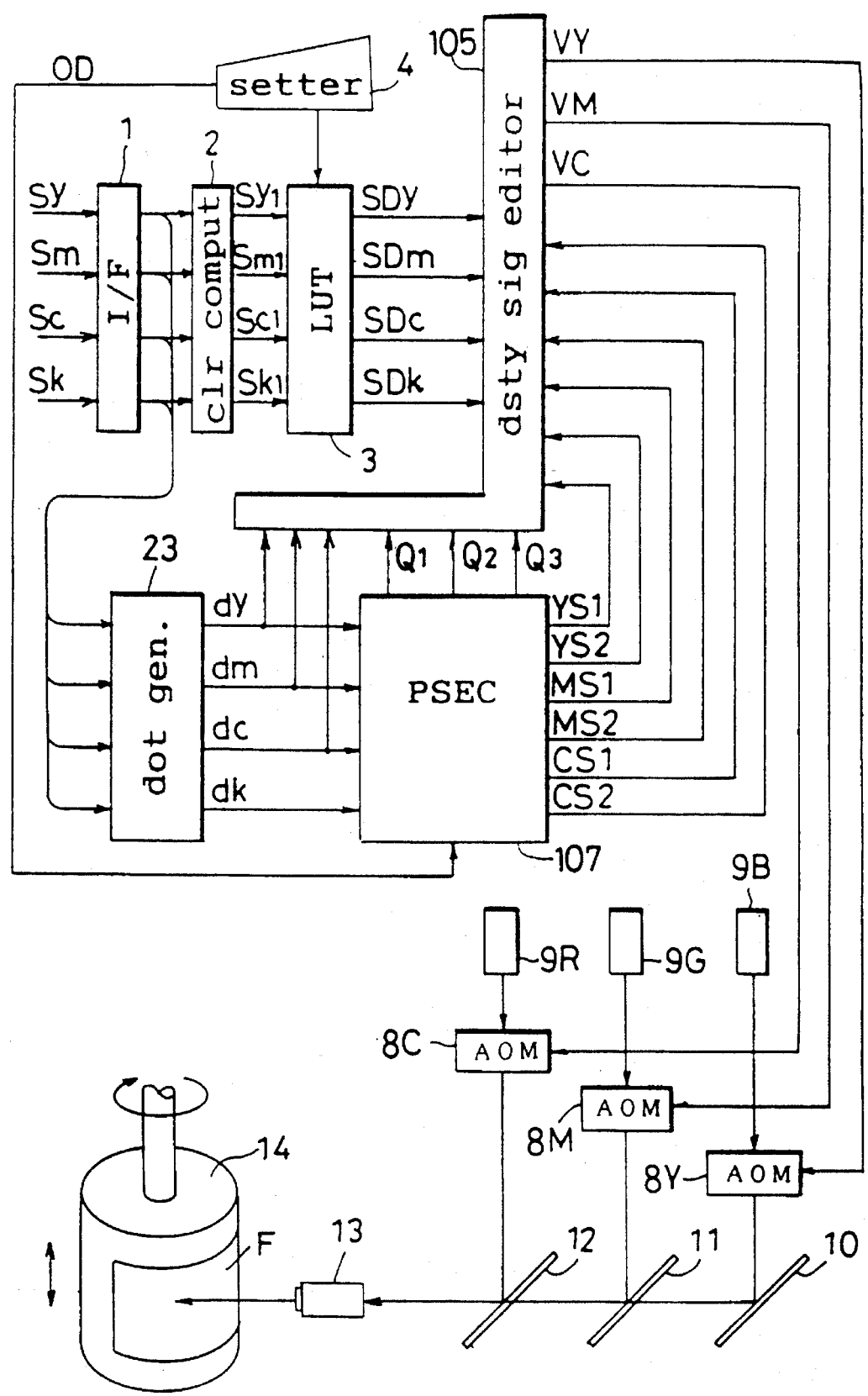
FIG. 28 is a block diagram of a color image proofing apparatus in a seventh embodiment of the present invention.

FIG. 28 shows a specific construction of this embodiment. As in the second embodiment relative to the first embodiment, a density signal editing circuit 105 is provided in place of the signal editing circuit 5 and multiplexers 6Y, 6M and 6C of the sixth embodiment (see FIG. 27). A pattern signal editing circuit 107 is added to the sixth embodiment.

Coloring densities are edited as in the second embodiment. The selection control signals and the like are edited as in the fifth embodiment (see FIG. 26).

With the above construction, a color proof image with a compensation for additivity failure is created on the photosensitive material (negative) F for prints made with cylinders prepared by the two-positive system.

In this embodiment, the dot generator 23, pattern signal editing circuit 107, and multiplexers 6Y, 6M and 6C in the density signal editing circuit 105 correspond to the exposure control device of the present invention.

Eighth Embodiment

Figure 29:
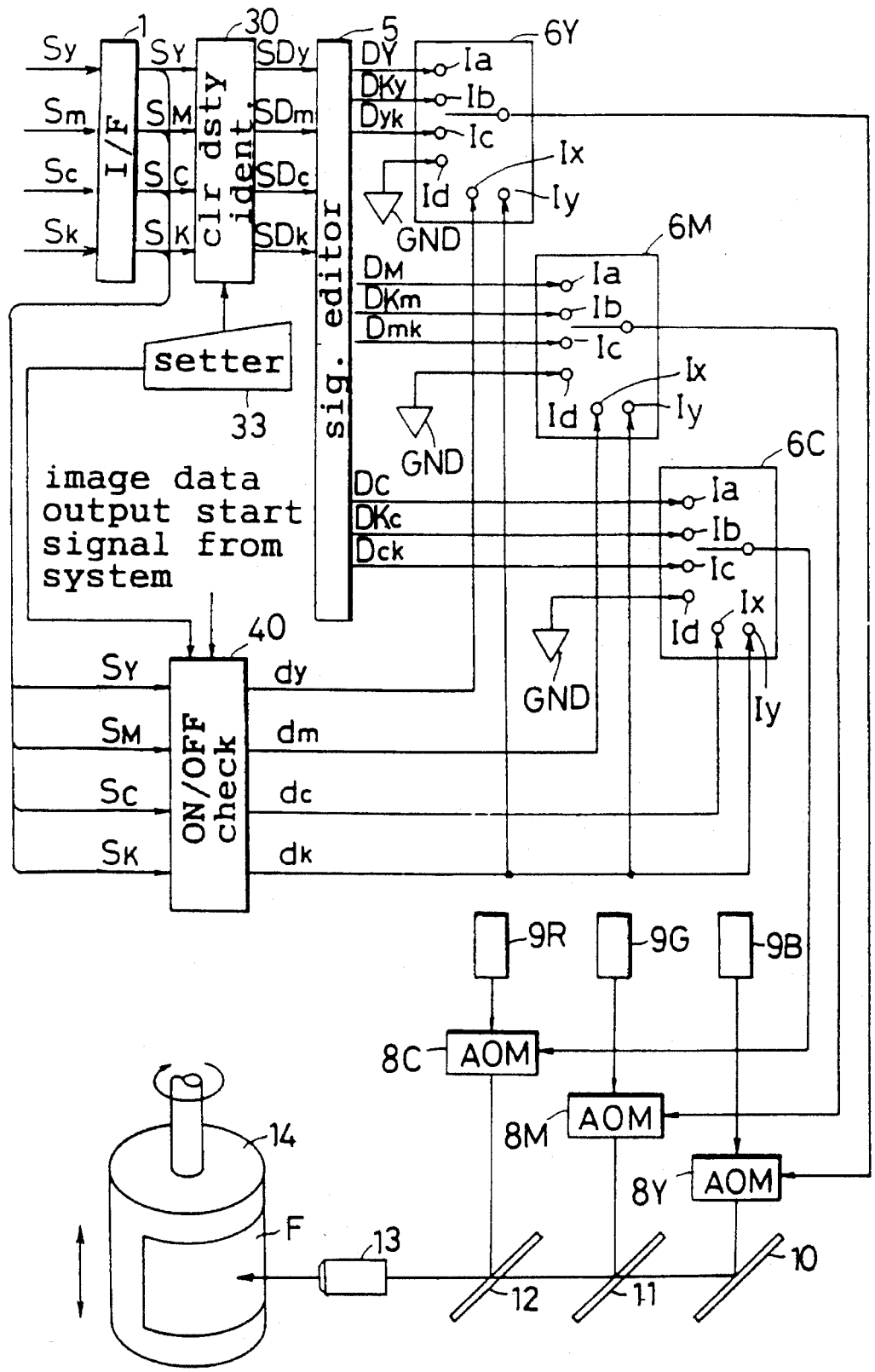
FIG. 29 is a block diagram of a color image proofing apparatus in an eighth embodiment of the present invention.

An eighth embodiment of the present invention will be described next with reference to FIGS. 29 through 31.

The apparatus in the third embodiment is used to create a color proof image on a photosensitive material (negative) for prints to be made with printing cylinders prepared by TH gravure system. As noted hereinbefore, the TH gravure system expresses density tones by varying cell depth and cell area. Like reference numerals are used to identify like parts in the foregoing drawings, which are the same as in the foregoing embodiments and will not be described again.

Image data Sy, Sm, Sc and Sk from the system are applied through an interface circuit 1 to a coloring density identifier (clr dsty ident.) 30 and an ON/Off checker 40. Image data Sy, Sm, Sc and Sk have density tones proportional to dot % of a halftone offset positive.

Figure 30:
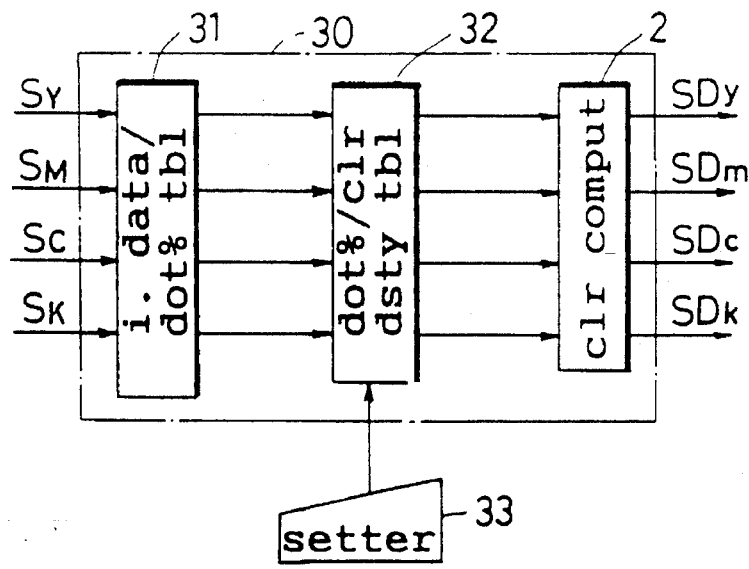
FIG. 30 is a block diagram of a coloring density identifier in the eighth embodiment.

As shown in FIG. 30, the coloring density identifier 30 includes an image data-to-dot % conversion table (i. data/dot % tbl) 31 for converting the image data into dot % of cells corresponding to densities thereof. The dot % converted is applied to a dot %-to-color density conversion table (dot %/clr dsty tbl) 32. The dot %-to-color density conversion table 32 identifies coloring densities corresponding to dot % from conditions set through a setter 33 for preparing printing cylinders.

Figure 32:
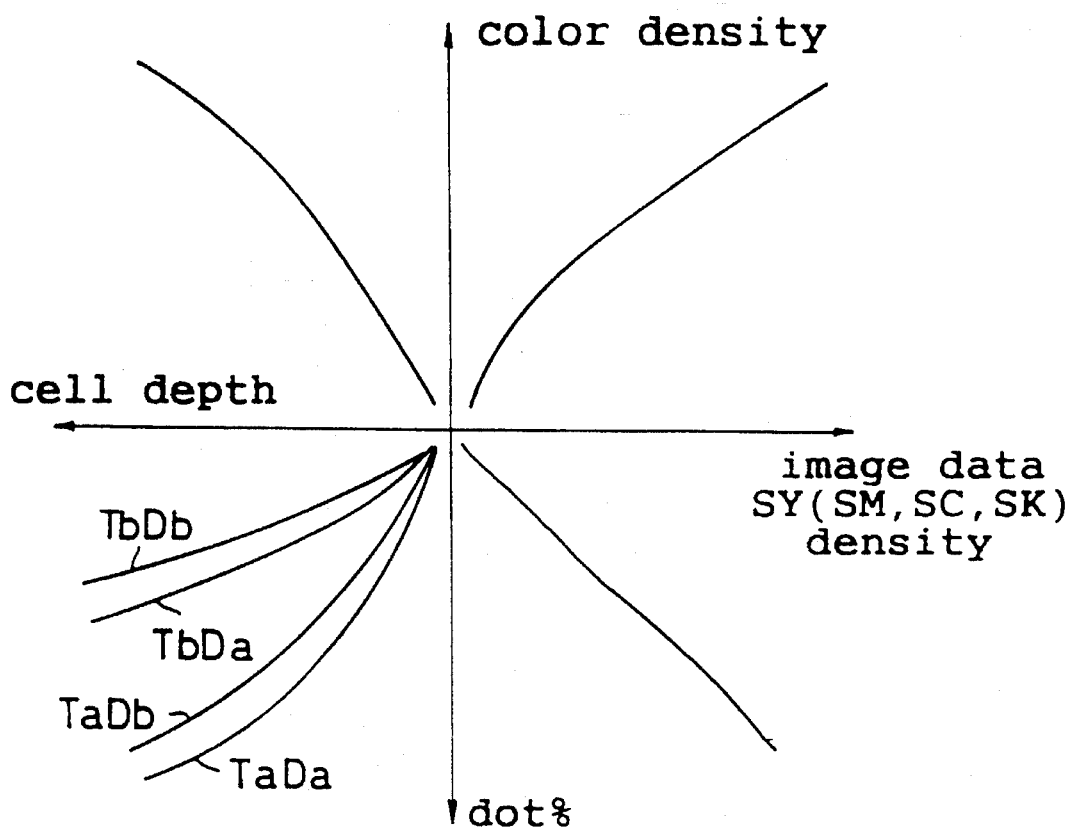
FIG. 32 is a view showing relationships among image date density, dot %, cell depth formed and coloring density.

FIG. 32 shows relationships among densities of the image data, dot %, cell depth and coloring density.

The image data-to-dot % conversion table 31 stores the relationship shown in the fourth quadrant of FIG. 32. The dot %-to-color density conversion table 32 stores the relationships shown in the third and second quadrants of FIG. 32. The relationships shown in the third quadrant of FIG. 32 are variable with the cell forming conditions.

In FIG. 32, reference "TaDa" denotes a graph showing a relationship between dot % and cell depth where exposure time is Ta and diffusion sheet condition is Da. The other graphs are referenced likewise. The diffusion sheet condition refers to the type and thickness of a diffusion sheet disposed between the printing cylinder and halftone offset positive during exposure time in gravure platemaking. Diffusion sheet condition Da, for example, indicates type A and thickness "a" of the diffusion sheet. Similarly, diffusion sheet condition Db indicates type B and thickness "b" of the diffusion sheet.

The dot %-to-color density conversion table 32 converts dot % into coloring densities based on the cell forming conditions set through the setter 33. These conditions include chemical conditions such as exposure time, concentration of an etching solution, etching time, temperature and humidity, and the diffusion sheet condition (type and thickness of the diffusion sheet).

In this embodiment, image data SY, SM, SC and SK, the chemical conditions and diffusion sheet conditions correspond to the cell forming conditions according to the present invention. The interface circuit 1 and setter 33 correspond to the input device of the present invention. The color density identifier 30 corresponds also to the conversion table of the present invention.

The coloring densities of the respective color separations identified by the dot %-to-color density conversion table 32 are applied to a color computation circuit 2 for color correction and tone correction. Resulting signals are applied to a signal editing circuit 5 (see FIG. 2) to be converted into predetermined applied voltages. These voltages are applied to input terminals Ia–Ic of multiplexers 6Y, 6M and 6C. The multiplexers 6Y, 6M and 6C receive ground voltage GND at input terminals Id thereof.

In this embodiment, coloring density-to-voltage conversion tables 51a, 51b and 51c correspond to the modulating information identifying device of the present invention.

Figure 31:
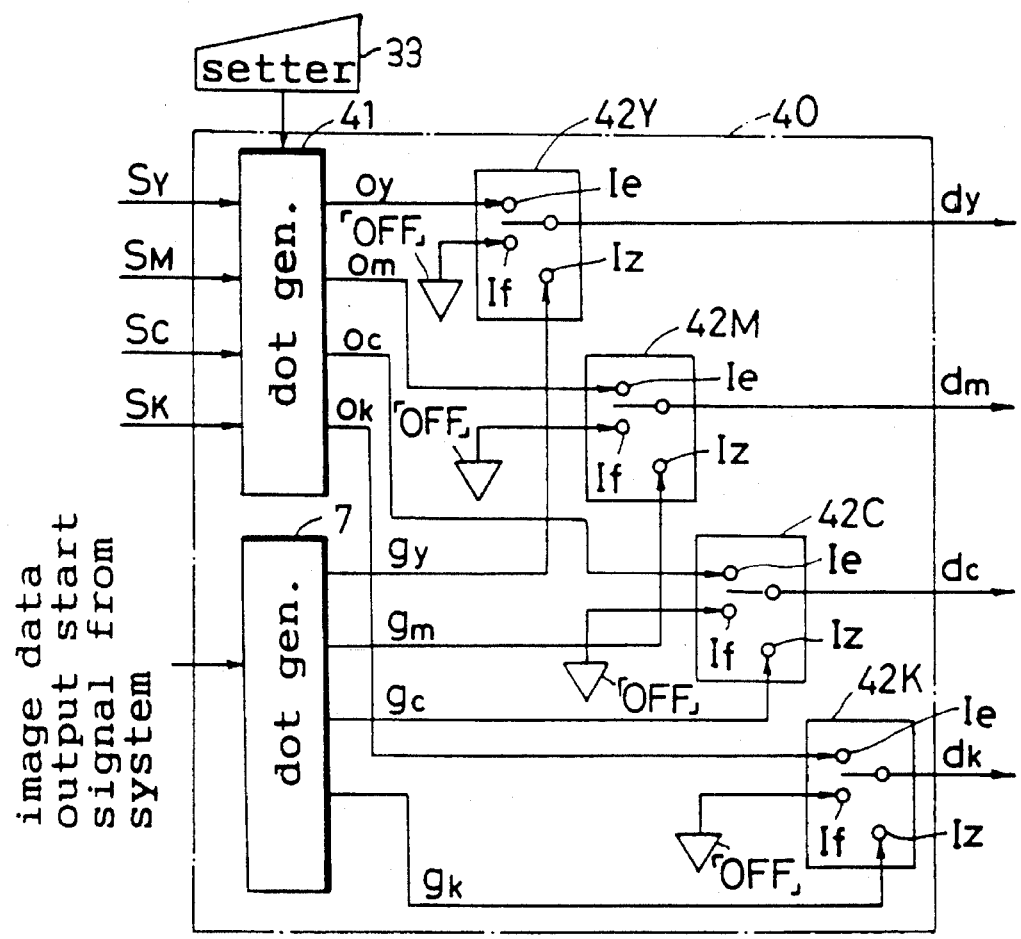
FIG. 31 is a block diagram of an ON/OFF checker in the eighth embodiment.

As shown in FIG. 31, the ON/Off checker 40 includes a dot generator 41 which receives image data SY, SM, SC and SK of Y, M, C and K separations. The dot generator 41 stores a plurality of patterns of the halftone offset positive spread according to the diffusion sheet conditions. When a diffusion sheet condition is set through the setter 33, a corresponding pattern is selected to identify dot % of cell forming areas based on the densities of image data SY, SM, SC and SK applied. The dot % pattern provides a basis for determining whether each dot should be recessed (to hold ink) or not (not to hold ink) when cells are formed on the printing cylinder. The dot generator 41 outputs "ON" for recesses and "OFF" for non-recesses. Output data "oy", "om", "oc" and "ok" are applied to input terminals Ie of switches 42Y, 42M, 42C and 42K, respectively.

A dot generator 7 storing a gravure screen with an overall screen pattern is actuated by an image data output start signal from the system, in synchronism with the image data output from the system, to determine overall screen pattern areas and other areas, and output "OFF" for the overall screen pattern areas and "ON" for other areas. Output data "gy", "gm", "gc" and "gk" are applied to input terminals Iz of switches 42Y, 42M, 42C and 42K, respectively.

The switches 42Y, 42M, 42C and 42K receive "OFF" signals at input terminals If thereof, respectively. The switches 42Y, 42M, 42C and 42K select input terminals Ie when the signals applied to input terminals Iz are "ON", and input terminals If when the signals applied to input terminals Iz are "OFF". As shown in FIG. 29, output data "dy", "dm" and "dc" of switches 42Y, 42M and 42C are applied to control input terminals Ix of multiplexers 6Y, 6M and 6C, respectively, while output data "dk" of switch 42K is applied to input terminals Iy of multiplexers 6Y, 6M and 6C.

These switches 42Y, 42M, 42C and 42K are provided in order to add a pattern of gravure screen walls where ink is not applied and which are formed with the gravure screen with an overall screen pattern, to the results of determination of inked areas and uninked areas from the densities of the image data and the pattern of the halftone offset positive. In TH gravure system, a printing cylinder is formed with a halftone offset positive and a gravure screen with an overall screen pattern having different screen angles and screen ruling. Thus, gravure screen walls may be formed in areas determined by the halftone offset positive to have ink applied thereto. Since ink is not applied to such areas, it is necessary to output "OFF" signals to the multiplexers 6Y, 6M and 6C for these areas.

In this embodiment, image data SY, SM, SC and SK inputted, the patterns of the halftone offset positive spread according to the diffusion sheet conditions and their screen angles stored in the dot generator 41, and the patterns of the gravure screen with an overall screen pattern and their screen angles stored in the dot generator 41 correspond to the patterns of cells formed on the gravure printing cylinders of the present invention. The ON/OFF checker 40 and multiplexers 6Y, 6M and 6C correspond to the exposure control device of the present invention.

With the image data applied to the dot generator 41 as well as the coloring density identifier 30, and the image data output start signal inputted to the dot generator 7, input timing of the voltage signals to input terminals Ia–Ic of multiplexers 6Y, 6M and 6C may be synchronized with input timing of "ON" and "OFF" signals to control input terminals Ix and Iy. Consequently, as described hereinafter, the halftone image exposed on the photosensitive material (negative) F is made to correspond to the cell patterns formed on the gravure printing cylinders.

In response to the signals inputted to the control input terminals Ix and Iy, the multiplexers 6Y, 6M and 6C switch the applied voltage signals inputted to the respective input terminals Ia, Ib, Ic and Id, and output the voltage signals to AOMs 8Y, 8M and 8C. Thus, input terminals Ia are selected when terminals Ix are "ON" and terminals Iy are "OFF", and input terminals Ib are selected when terminals Ix are "OFF" and terminals Iy are "ON". Input terminals Ic are selected when both terminals Ix and Iy are "ON", and input terminals Id are selected when both terminals Ix and Iy are "OFF".

The applied voltages outputted from the multiplexers 6Y, 6M and 6C are applied to AOMs 8Y, 8M and 8C, respectively, whereby a color proof image is created on the photosensitive material (negative) F as in the first embodiment.

Ninth Embodiment

A ninth embodiment of the present invention will be described next with reference to FIG. 33.

As in the eighth embodiment, the apparatus in the seventh embodiment is used to produce a color proof image on a photosensitive material (negative) for prints to be made with printing cylinders prepared by TH gravure system. In this embodiment, however, the apparatus in the eighth embodiment is adapted to compensate for an additive failure occurring when superposing chromatic and achromatic colors. Like reference numerals are used to identify like parts in the foregoing drawings, which are the same as in the second and eighth embodiments and will not be described again.

Figure 33:
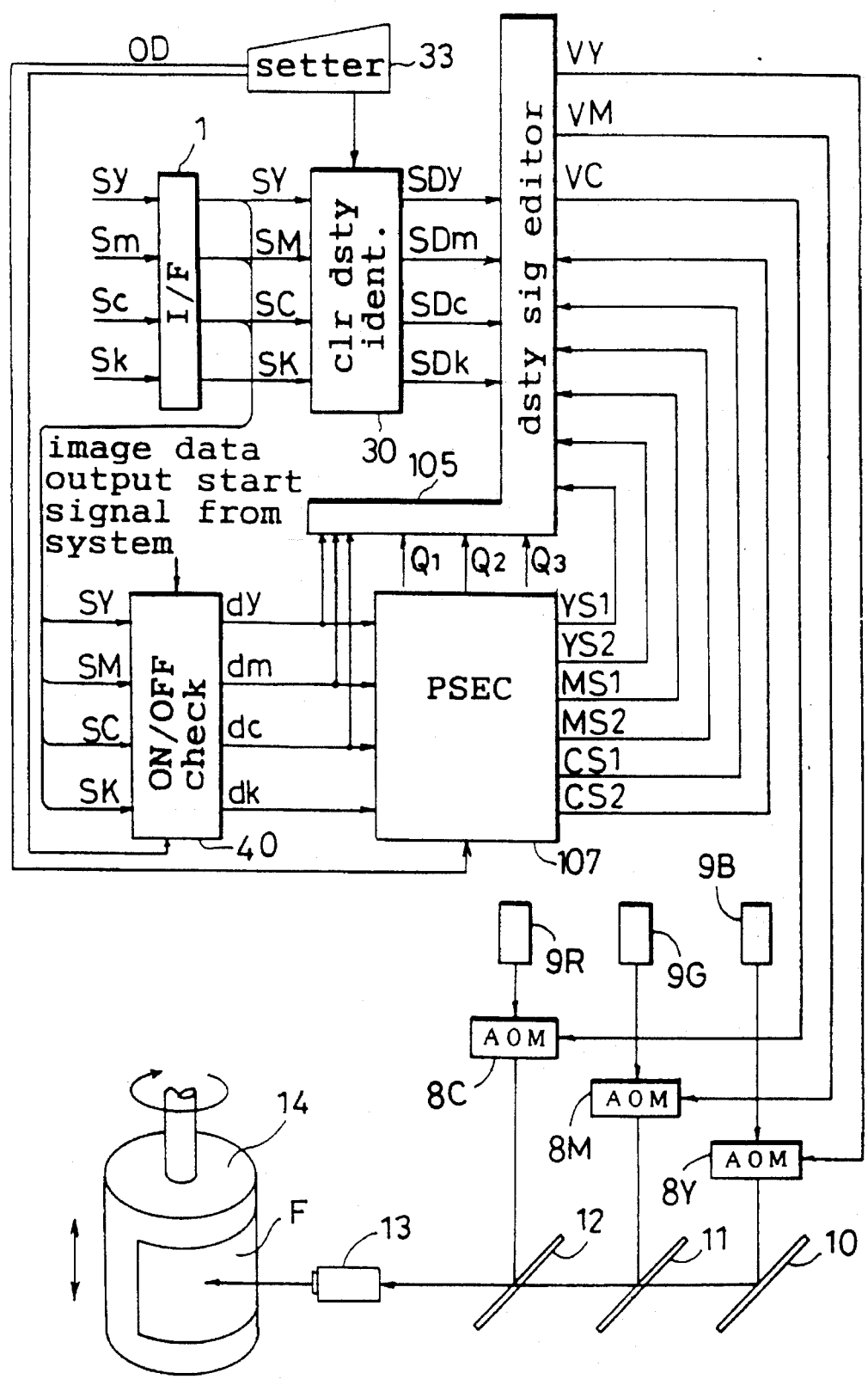
FIG. 33 is a block diagram of a color image proofing apparatus in a ninth embodiment of the present invention.

FIG. 33 shows a specific construction of this embodiment. As in the second embodiment relative to the first embodiment, a density signal editing circuit 105 is provided in place of the signal editing circuit 5 and multiplexers 6Y, 6M and 6C of the eighth embodiment (see FIG. 29). A pattern signal editing circuit 107 is added to the eighth embodiment.

Coloring densities are edited as in the second embodiment. The selection control signals and the like are edited based on signals "dy", "dm", "dc" and "dk", outputted from ON/OFF checker 40.

With the above construction, a color proof image with a compensation for additivity failure is created for prints made with cylinders prepared by TH gravure system.

In this embodiment, ON/OFF checker 40, pattern signal editing circuit 107, and multiplexers 6Y, 6M and 6C in the density signal editing circuit 105 correspond to the exposure control device of the present invention.

Tenth Embodiment

A tenth embodiment of the present invention will be described next.

The apparatus in the tenth embodiment is used to create a color proof image on a photosensitive material (negative) for prints to be made with printing cylinders prepared by the electronic engraving system.

The principle of this embodiment will be described before describing the apparatus in this embodiment.

Figure 34:
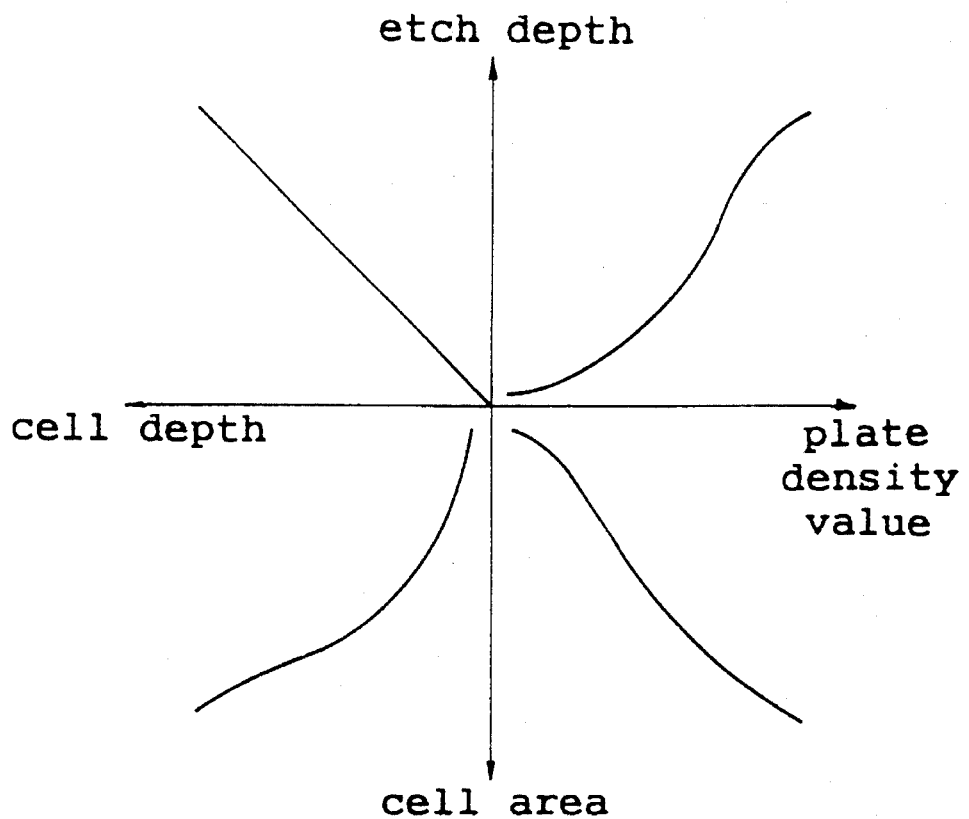
FIG. 34 is a view showing relationships among plate density, engraving depth, cell depth and cell area.

According to relationships as shown in FIG. 34, an engraving machine expresses cell depth and area by engraving depths (depth signals applied to the stylus) corresponding to density tones of a positive. The cell depth is variable with the type of stylus even when cells are formed by a constant engraving depth. The apparatus in this embodiment, which creates a proof by exposing dots with a plurality of beams, prepares a dot matrix and expresses cells with dots having density values.

Take, for example, a dot matrix for expressing a cell as shown in FIG. 35A (plan view showing a cell area) and FIG. 35B (sectional view showing cell depths along line F—F in FIG. 35A).

The cell area is expressed by a dot matrix as shown in FIG. 35C. Dots D forming the dot matrix have their density values to express cell depths. The dot D5 in the center has the greatest depth, and the density values diminish toward peripheries of the matrix. The cell depth and density value are correlated. Thus, FIG. 35D shows depths corresponding to the densities of dots D along line F—F in FIG. 35C.

The cell is expressed by the dot matrix as above. AOMs are turned on and off to expose only the dots constituting the dot matrix, and voltages corresponding to the densities of the dots in the dot matrix are applied to the AOMs.

Figure 36:
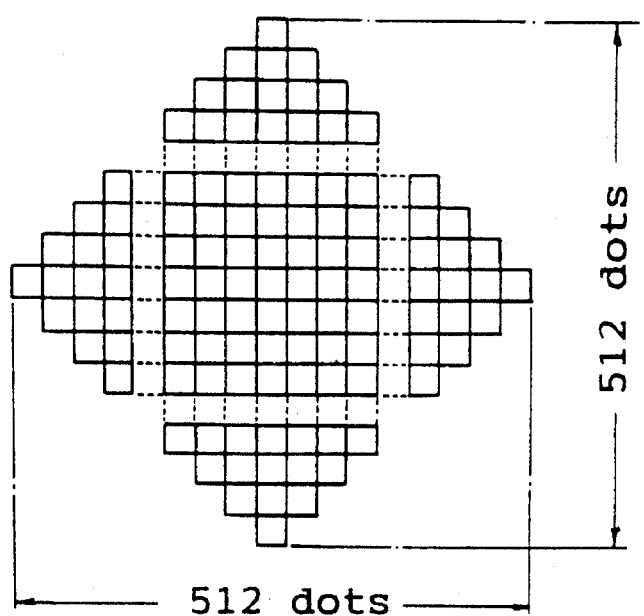
FIG. 36 is a view of a dot matrix for faithfully reproducing a cell shape when 256 density tones are applied to an engraving machine.

Where, for example, 256 density tones are applied to the engraving machine, it is necessary to form a dot matrix with numerous dots, i.e. maximum 512 dots vertically and maximum 512 dots horizontally as shown in FIG. 36, and to provide the dots with density values corresponding to the cell shape, in order to reproduce the cell shape faithfully with the dot matrix. However, controlling a plurality of light beams according to such a dot matrix is not practical in terms of exposure speed, memory and other respects.

Thus, a dot matrix is prepared with the number of dots corresponding to density tones, for example, and a cell is expressed approximately by varying densities of the dot matrix.

By giving patterns to determination of the number of dots corresponding to the density tones and density variations of the dot matrix, it is possible to cope with variations in the cell shape occurring with different types of stylus, for example.

A specific data development will be described hereinafter.

FIG. 37 shows a pattern of the number of dots related to the density of image data. In the pattern in FIG. 37, when density tone is "1", for example, one dot acts as a dot matrix, and when density tone is "3", four dots form a dot matrix. This pattern of the number of dots related to the density of image data is variable with the type and the like of stylus. The dots thus determined are arranged as shown in FIG. 38, for example. This dot arranging pattern also is variable with the type and the like of stylus. The numerals affixed to the dots in FIG. 38 denote dot numbers, and number "1" is given to the dot corresponding to the deepest part of the cell. The densities of the dots are determined according to these numbers. This dot numbering pattern also is variable with the type and the like of stylus.

With the relationships shown in FIG. 34, once plate density is determined, engraving depth and cell depth are determined and so is the density of the deepest part of the cell. Thus, once densities of image data are inputted to the proofing apparatus, the density of the dot representing the maximum density of the dot matrix (maximum density value) is determined. This relationship is shown in FIG. 39.

The shape of a cell engraved with a stylus is not a quadrangular pyramid but curves of the second or third order since the shape and oscillation (varying with the type) of the stylus describe a sine wave. This is illustrated in FIGS. 40A through 40C. FIG. 40A shows the shape of a cell having a maximum density (the deepest engraving depth). Engraving depth (D0–D1), for example, results in the shape D0 (deepest part) to D1 in FIG. 40A, which corresponds to the shape shown in FIG. 40B. Similarly, engaging depth (D0–D2) forms the shape shown in FIG. 40B.

Figure 41:
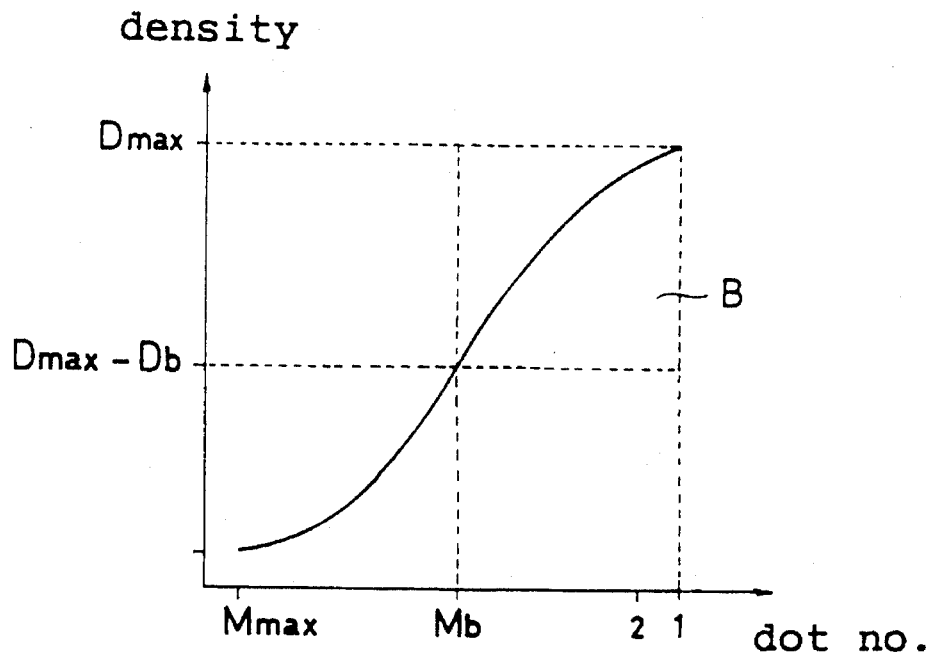
FIG. 41 is a view showing a relationship between numbers and densities of dots forming a dot matrix.

Thus, a relationship as shown in FIG. 41 is first established for density values with respect to the dot numbers of dots forming a dot matrix created for the cell having a maximum density. This relationship describes a subtle curve representing the cell shape shown in FIGS. 40A–40C. As the cell shape is variable with the type and the like of stylus, so the curve in FIG. 41 is variable with the type and the like of stylus.

In this graph, the horizontal axis represents dot numbers, with "Mmax" corresponding to the number of dots in the dot matrix for the cell having the maximum density. The vertical axis represents densities with respect to the dot numbers, with density "Dmax" for dot number "1" indicating the maximum density, i.e. the maximum density for the deepest part.

Figure 42:
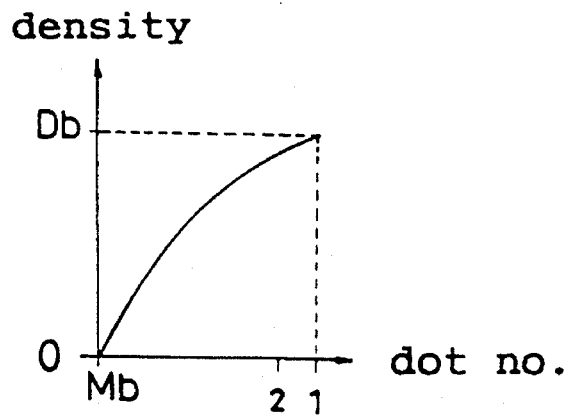
FIG. 42 is a view showing a utilized portion of FIG. 41.

When, for example, image data Pb is applied, maximum density Db for data Pb is determined from FIG. 39. As shown in FIGS. 40A–40C, the cell shape follows the shape formed with the maximum density (see FIG. 40A). Thus, the density variation curve in area B extending between Dmax and Dmax–Db is utilized. That is, the density variation curve is utilized, regarding Dmax as Db and Dmax–Db as zero. Dot number Mb corresponding to Dmax–Db corresponds to a maximum number of dots derived from the relationship shown in FIG. 37. If Db is "3", for example, the number of dots for Db ("3") is "4" according to the relationship shown in FIG. 37, and hence Mb in FIG. 41 is "4". FIG. 42 is a graph of area B extracted. This enables densities to be determined for dots having the respective dot numbers. Since the densities determined as above correspond to the cell depth, these densities serve as coloring densities in exposing the photosensitive material F with light beams.

Cell engraving positions will be described next.

Generally, the engraving machine engraves cells by spiral scanning or stepped feed scanning.

Figure 43A:
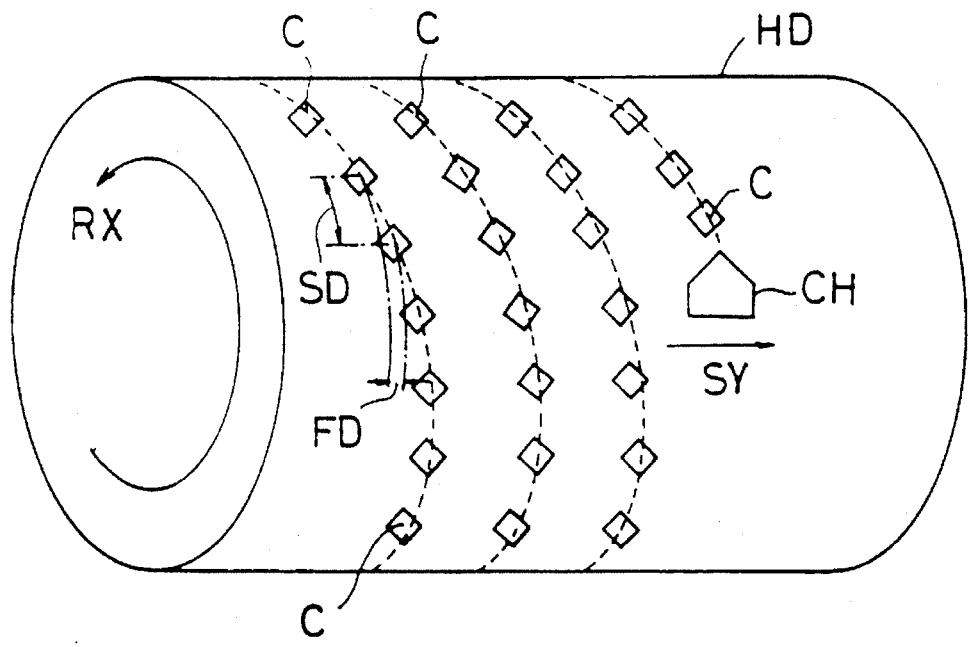
FIGS. 43A and 43B are views used for explaining a relationship between positions of cells engraved in spiral scanning and exposure positions of halftone images on a photosensitive material.
Figure 43B:
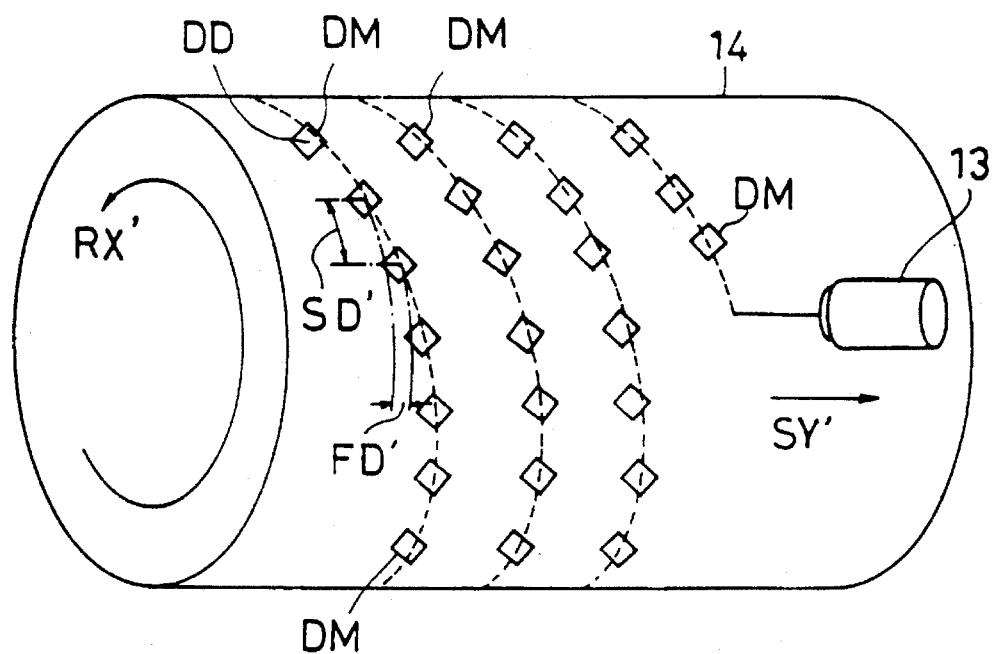

Spiral scanning is a method of engraving cells C in spiral form, as shown in FIG. 43A, in which a stylus (engraving head CH) is moved at constant velocity in an auxiliary scanning direction while rotating a printing cylinder HD at constant velocity. The stylus engraves cells C in a fixed oscillating cycle (sine cycle). In spiral scanning, therefore, cell intervals SD in a main scanning direction are determined by rotating velocity RX of cylinder HD and oscillating cycle of the stylus. Cell intervals FD in the auxiliary scanning direction are determined by moving velocity SY in the auxiliary scanning direction of engraving head CH and oscillating cycle of the stylus. Engraving positions of cells C are determined from the above. Once engraving positions of cells C are determined, these positions may be set to the dots in the deepest parts of dot matrices for exposure on the photosensitive material F. The photosensitive material F is mounted on a rotary cylinder. Thus, in the image proofing apparatus, as shown in FIG. 43B, for example, dot matrices DM may be exposed on the photosensitive material F according to the engraving positions of cell C by adjusting rotating velocity RX' of rotary cylinder 14 with reference to rotating rate RX of printing cylinder HD, and adjusting moving velocity SY' in the auxiliary scanning direction of an exposure head including an imaging lens 13 with reference to moving velocity SY of engraving head CH and oscillating cycle of the stylus. Usually a shorter time is required for proof creation than for cylinder engraving. Assuming, for example, that, with the apparatus in this embodiment, one line of gravure cells is exposed in one rotation of cylinder 14 and that the cylinder 14 of this apparatus is substantially the same size as cylinder HD, rotating velocity RX' of rotary cylinder 14 and moving velocity SY' in the auxiliary scanning direction of the exposure head of this apparatus may be increased at substantially the same rate with respect to the corresponding velocities of the engraving machine. In FIG. 43B, reference DD denotes a dot in the deepest part, reference SD' corresponds to cell intervals SD in the main scanning direction on the cylinder HD, and reference FD' corresponds to cell intervals in the auxiliary scanning direction on the cylinder HD.

Figure 44A:
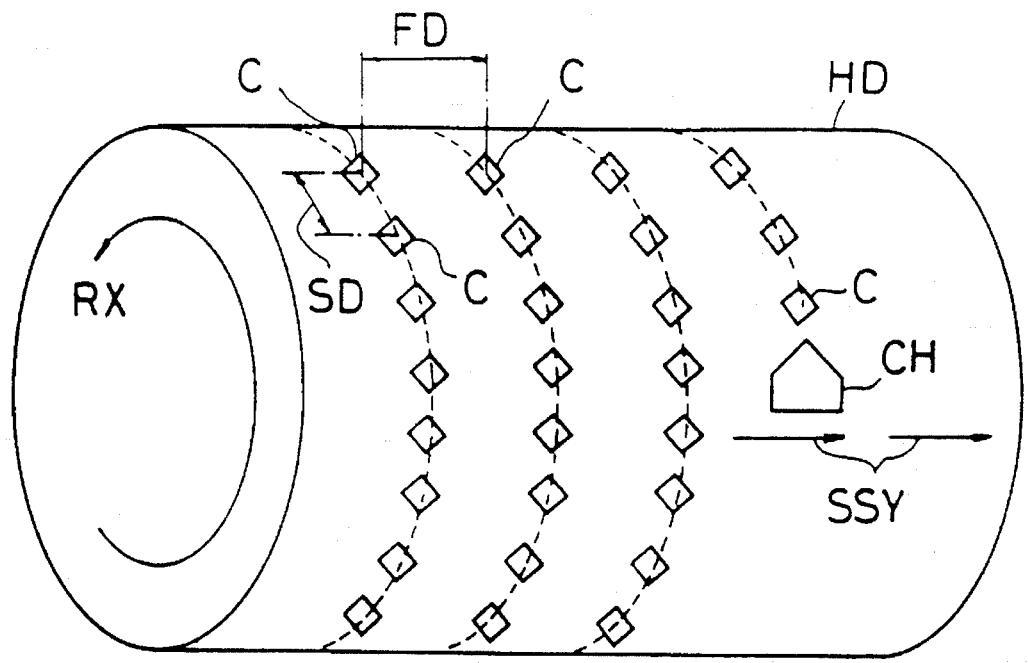
FIGS. 44A and 44B are views used for explaining a relationship between positions of cells engraved in stepped feed scanning and exposure positions of a halftone image on a photosensitive material.
Figure 44B:
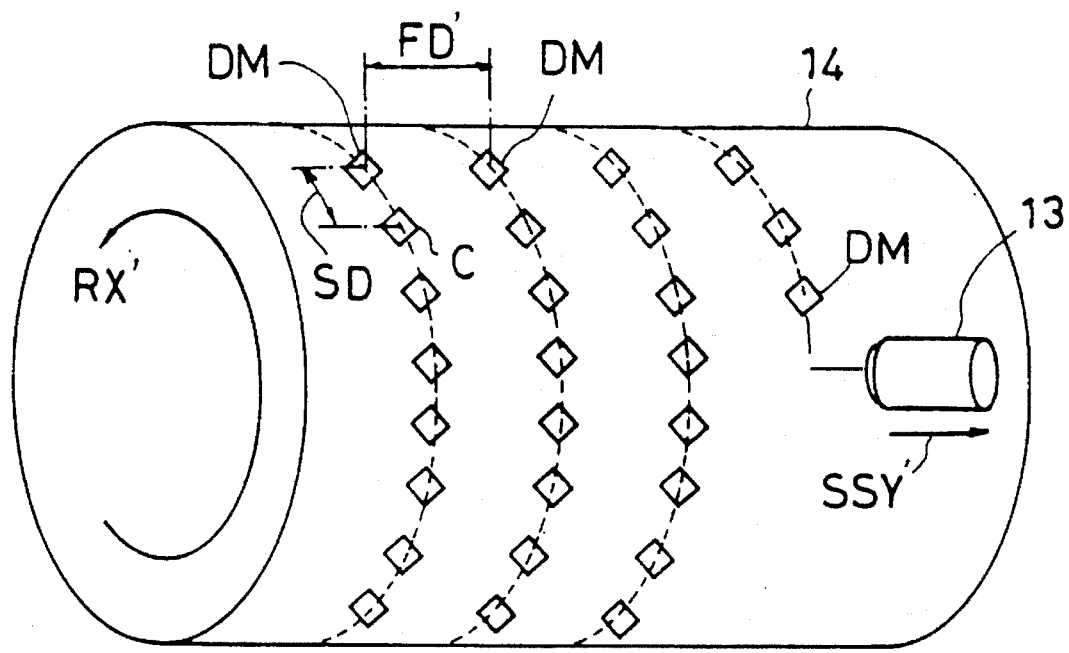

Stepped feed scanning is a method of engraving cells C along lines in the main scanning direction as shown in FIG. 44A. In this method, the printing cylinder HD is rotated at constant velocity but the engraving head CH is not moved in the auxiliary scanning direction, to engrave cells C in one line in the main scanning direction on the cylinder Hd. Upon completion of cell engraving for each line in the main scanning direction, the engraving head CH is moved a predetermined amount in the auxiliary scanning direction. In the stepped feed scanning, therefore, cell intervals SD in the main scanning direction are determined by rotating velocity RX of cylinder HD and oscillating cycle of the stylus. Cell intervals FD between adjacent rows extending in the main scanning direction are determined by the amount of stepped movement SSY in the auxiliary scanning direction of engraving head CH. Engraving positions of cells C are determined from the above. Once engraving positions of cells C are determined, the image proofing apparatus may set these positions to the dots in the deepest parts of dot matrices for exposure on the photosensitive material F. Thus, as shown in FIG. 44B, for example, dot matrices DM may be exposed on the photosensitive material F according to the engraving positions of cell C by adjusting rotating velocity RX' of rotary cylinder 14 with reference to rotating rate RX of printing cylinder HD, and adjusting an amount of stepped movement SSY' in the auxiliary scanning direction of the exposure head including imaging lens 13 with reference to the amount of stepped movement SSY of engraving head CH.

A construction of the apparatus in the tenth embodiment will be described hereinafter, based on the above principle, and with reference to FIGS. 45 through 47.

Like reference numerals are used to identify like parts in the foregoing drawings, which are the same as in the foregoing embodiments and will not be described again.

Figure 45:
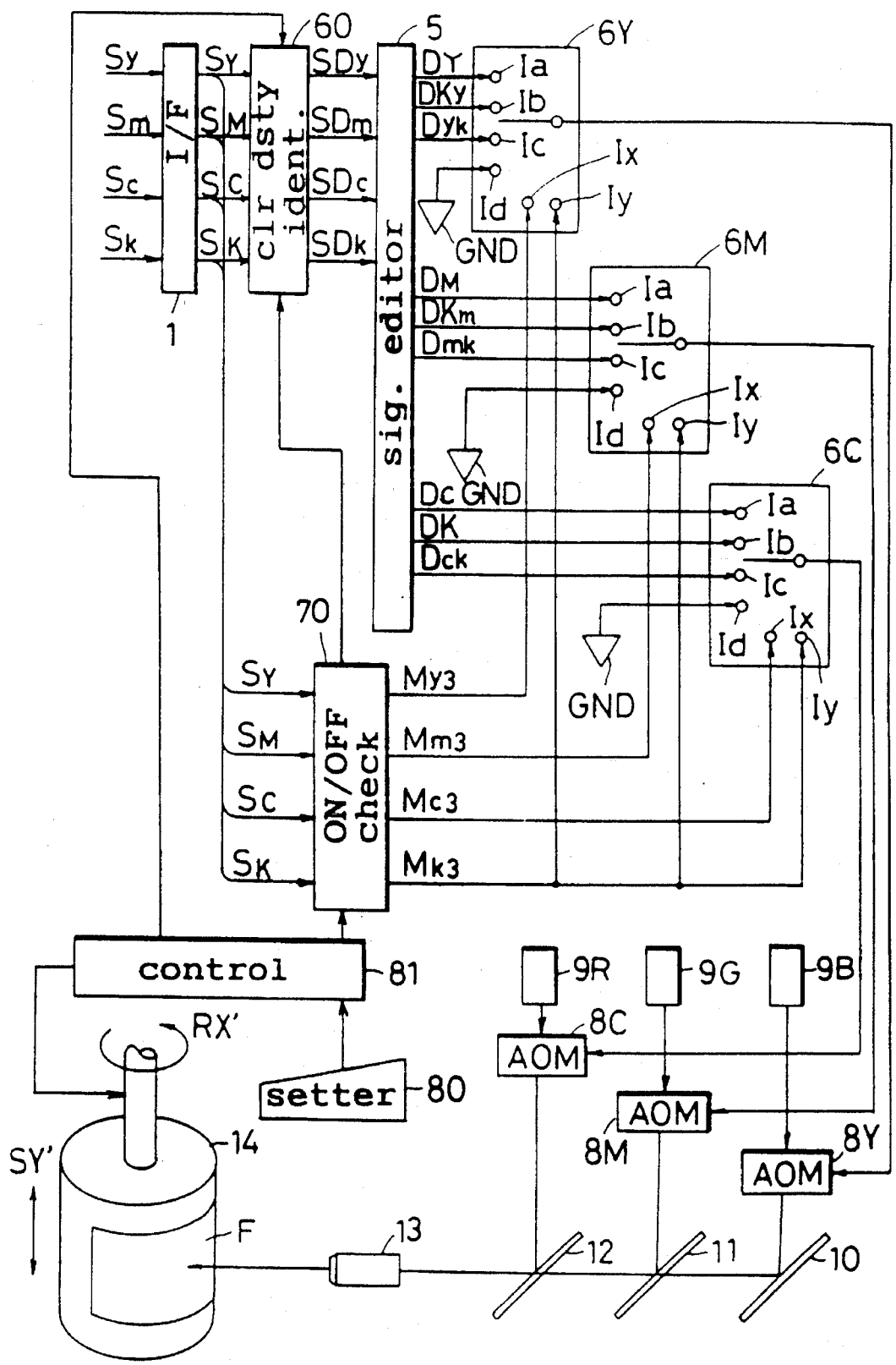
FIG. 45 is a block diagram of a color image proofing apparatus in a tenth embodiment of the present invention.

Reference is made to FIG. 45. Image data Sy, Sm, Sc and Sk from the system are applied through an interface (I/F) circuit 1 to a coloring density identifier (clr dsty ident.) 60 and an ON/Off checker 70. In this embodiment, image data Sy, Sm, Sc and Sk derived from the layout system have the same density tones (corresponding to engraving depths) as original plates supplied to an input scanning device of the engraving machine.

Figure 46:
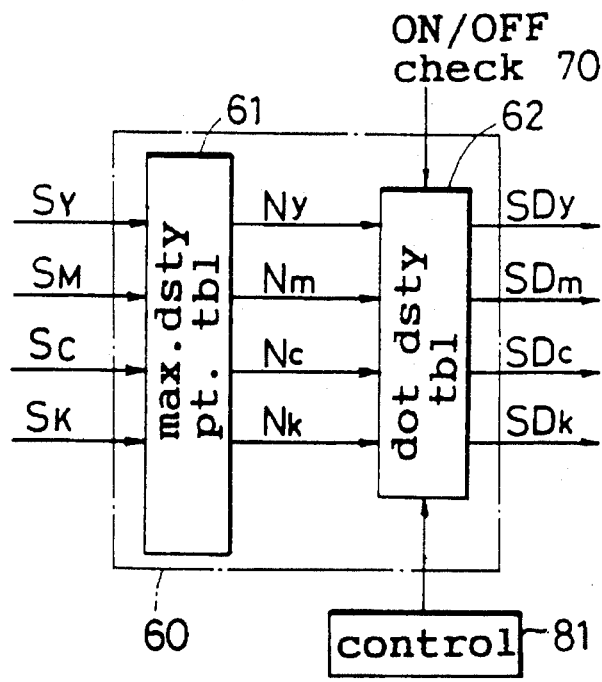
FIG. 46 is a block diagram of a coloring density identifier in the tenth embodiment.

As shown in FIG. 46, the coloring density identifier 60 includes an image data/maximum density point identifier table (max. dsty pt. tbl) 61 which receives image data SY, SM, SC and SK. The image data/maximum density point identifier table 61 stores the relationship shown in FIG. 39, and identifies maximum density points of cells corresponding to the densities of the image data. Maximum density point data Ny, Nm, Nc and Nk are applied to a dot density conversion table (dot dsty tbl) 62.

The dot density conversion table 62 stores a plurality of relationships between dot numbers and densities as shown in FIG. 41 for different types and the like of stylus. Based on maximum density point data Ny, Nm, Nc and Nk applied, the dot density conversion table 62 identifies densities for respective dot numbers from dot number 1 corresponding to the maximum density points (Ny, Nm, Nc and Nk) to a dot number corresponding to the number of dots (My1, Mm1, Mc1 and Mk1) outputted from an ON/OFF checker 70 described hereinafter. It is to be noted that the relationship shown in FIG. 41 is variable with the type and the like of stylus. Consequently, the dot density conversion table 62 identifies densities for the respective dot numbers, using a relationship table corresponding to a cell shape set through a setter 80 and identified by a control unit 81 as described hereinafter. The densities identified for the respective dot numbers are allotted to beam numbers. Information on the beam numbers is supplied from a dot number/beam number allotting table (dot no./beam no. allot. tbl) 73 described hereinafter.

Figure 2:
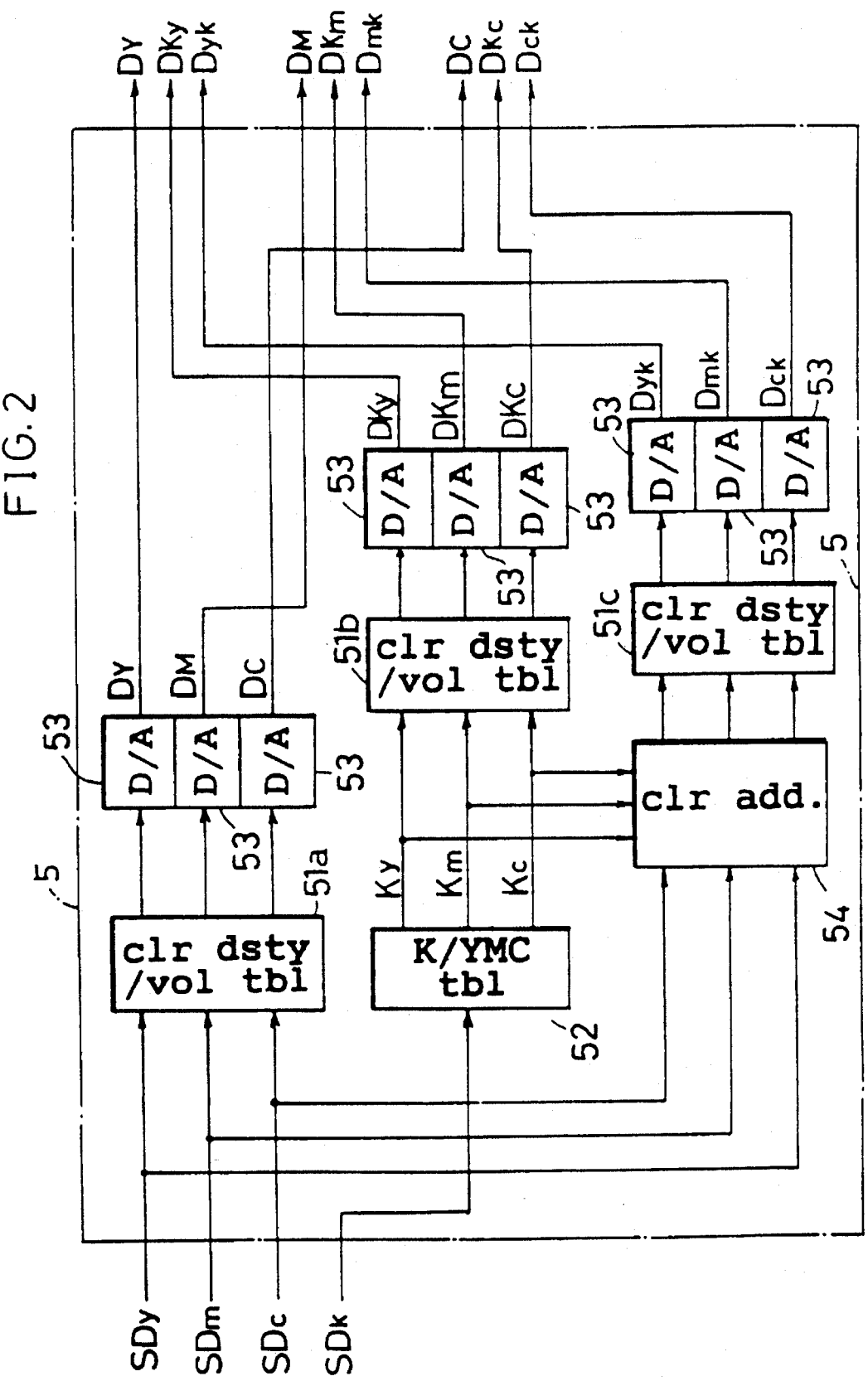
FIG. 2 is a block diagram of a signal editing circuit of the apparatus in the first embodiment.

Output data SDy, SDm, SDc and SDk of dot density conversion table 62 are applied to a signal editing circuit 5 (see FIG. 2). Each of the data SDy, SDm, SDc and SDk is a data corresponding to a different number of beams. The signal editing circuit 5 edits the respective beam number data and generates signals for application to input terminals Ia–Ic of multiplexers 6Y, 6M and 6C. The multiplexers 6Y, 6M and 6C receive ground voltage GND at input terminals Id thereof.

Information set through the setter 80 includes a type of scanning (spiral scanning or stepped feed scanning), a type of stylus, an oscillating cycle of the engraving head, a rotating velocity of the printing cylinder, and a moving velocity in the auxiliary scanning direction of the engraving head (for spiral scanning) or an amount of stepped feed in the auxiliary scanning direction of the engraving head (for stepped feed scanning). The information set through the setter 80 is applied to the control unit 81. Based on the information applied, the control unit 81 determines a shape of cells formed on the printing cylinder, cell engraving positions on the cylinder, and the like.

Figures 48A, 48B, 48C:
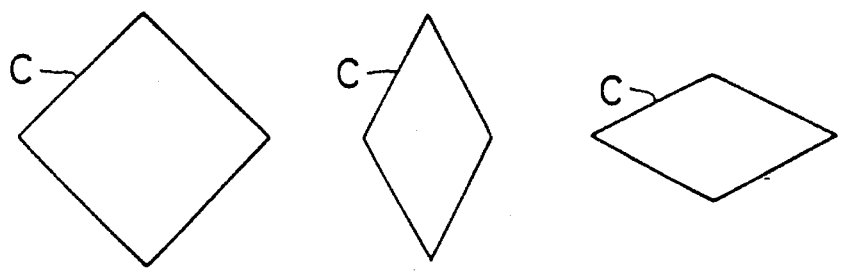
FIGS. 48A through 48C are views showing the shape of cells engraved varying with rotating velocities of a printing cylinder.

The shape of cells formed on the cylinder is determined by the type of stylus, rotating velocity of the cylinder, oscillating cycle of the engraving head, and the like. Naturally, the cell shape varies with the type of stylus, especially with the shape of stylus. Even if the same type of stylus is used, the cell shape varies with the rotating velocity of the cylinder and the like. FIGS. 48A through 48C show examples of shapes of cells engraved in the main scanning direction in stepped feed scanning. If the cylinder rotates at high velocity, cell C, as shown in FIG. 48B, has an area elongated in the main scanning direction (compared with cell C in FIG. 48A). If the cylinder rotates at low velocity, cell C, as shown in FIG. 48C, has an area shortened in the main scanning direction (compared with cell C in FIG. 48A). FIG. 48A shows cell C with an area engraved at standard rotating velocity of the cylinder. The control unit 81 determines a cell shape on the cylinder from the type of stylus, rotating velocity of the cylinder, oscillating cycle of the engraving head and the like. Information on the cell shape determined is applied to the dot density conversion table 62 in the coloring density identifier 60, and to an image data-to-number of dots conversion table (i. data/no. of dots tbl) 71 and a dot number allotting table (dot no. allot. tbl) 72 of ON/OFF checker 70 described hereinafter.

As described with reference to FIGS. 43A, 43B, 44A and 44B, cell engraving positions on the printing cylinder are determined by the type of scanning, type of stylus, oscillating cycle of the engraving head, rotating velocity of the cylinder, and moving velocity in the auxiliary scanning direction of the engraving head (in spiral scanning) or amount of stepped feed in the auxiliary scanning direction of the engraving head (in stepped feed scanning). The control unit 81 determines cell engraving positions based on the information set and, based on the cell engraving positions, determines rotating velocity RY' and moving velocity SX' in the auxiliary scanning direction of rotary cylinder 14 on which the photosensitive material F is mounted. Operation of rotary cylinder 14 is controlled according to rotating velocity RY' and moving velocity SX' in the auxiliary scanning direction of rotary cylinder 14 determined.

In this embodiment, the rotating velocity of the cylinder, oscillating cycle of the engraving head and the like correspond to the mechanical conditions for cell formation on the cylinder according to the present invention. The mechanical conditions, type of stylus, and image data SY, SM, SC and SK inputted correspond to the cell forming conditions according to the present invention. The coloring density identifier 60 corresponds to the coloring density identifying device of the present invention. The interface circuit 1, setter 80 and control unit 81 correspond to the input device of the present invention. The image data/maximum density point identifier table 61 and dot density conversion table 62 in the coloring density identifier 60 correspond to the conversion tables of the present invention. The coloring density-to-voltage conversion tables 51a, 51b and 51c in the signal editing circuit 5 (see FIG. 2) correspond to the modulating information identifying device of the present invention.

Figure 47:
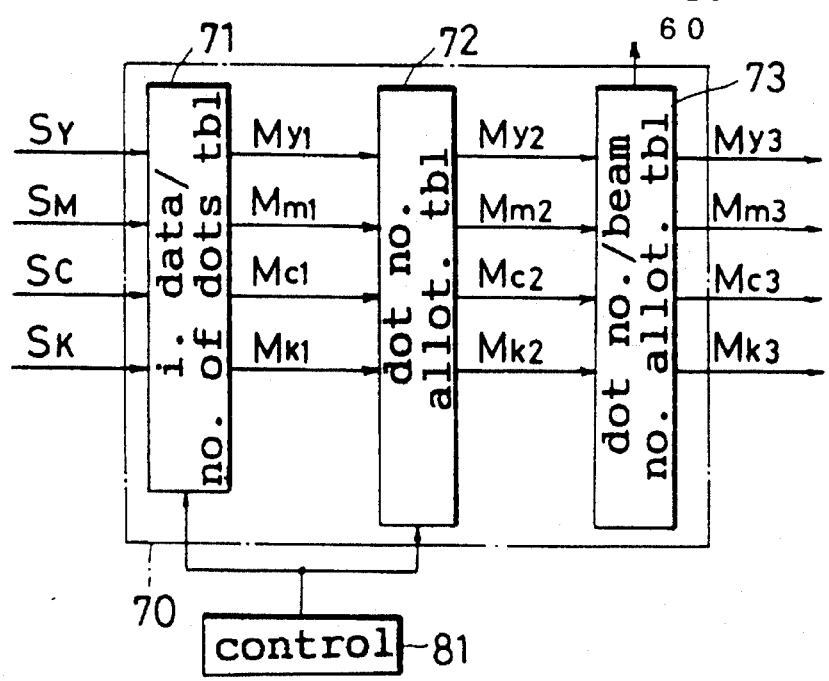
FIG. 47 is a block diagram of an ON/OFF checker in the tenth embodiment.

As shown in FIG. 47, the ON/Off checker 70 has the image data-to-number of dots conversion table 71 which determines the numbers of dots corresponding to the image data densities from image data SY, SM, SC and SK applied thereto. The image data-to-number of dots conversion table 71 stores a plurality of relationships as shown in FIG. 37 and corresponding to cell shapes. The image data-to-number of dots conversion table 71 determines the numbers of dots by referring to a relationship corresponding to the cell shape identified by the control unit 81.

The dot number allotting table 72 arranges the numbers of dots My1, Mm1, Mc1 and Mk1 determined by the image data-to-number of dots conversion table 71, as shown in FIG. 38 and according to the cell shape, and allots the dot numbers thereto. The dot number allotting table 72 stores a plurality of arranging and number allotting patterns corresponding to different cell shapes. The dot number allotting table 72 arranges the dots and allots the numbers by referring to a relationship corresponding to the cell shape identified by the control unit 81.

The dot number/beam number allotting table 73 allots the dot numbers to beam numbers.

Assume, for example, that AOMs are constructed to expose the largest dot matrix with one light beam emission (one halftone point).

Figure 49A:
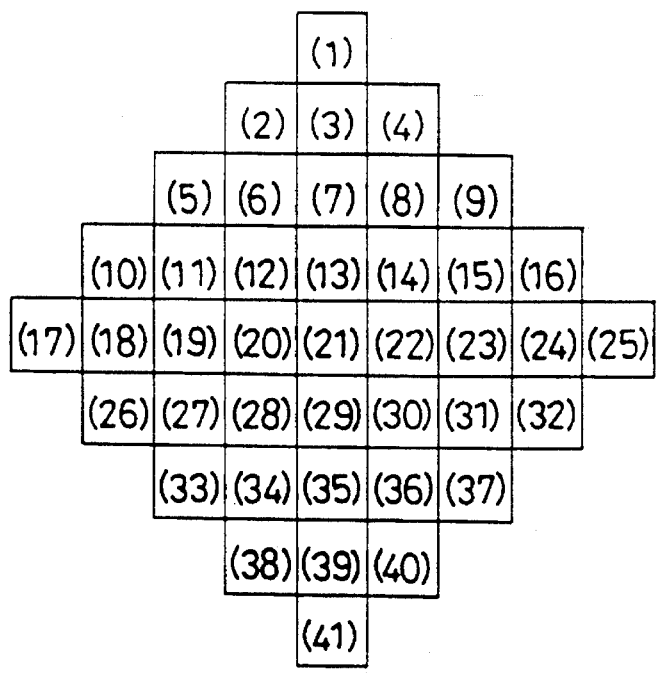
FIGS. 49A through 49C are views used for explaining allotment of a dot matrix to beam numbers.
Figure 49B:
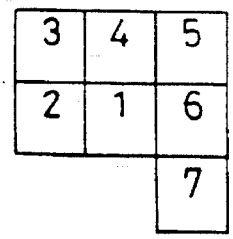
Figure 49C:
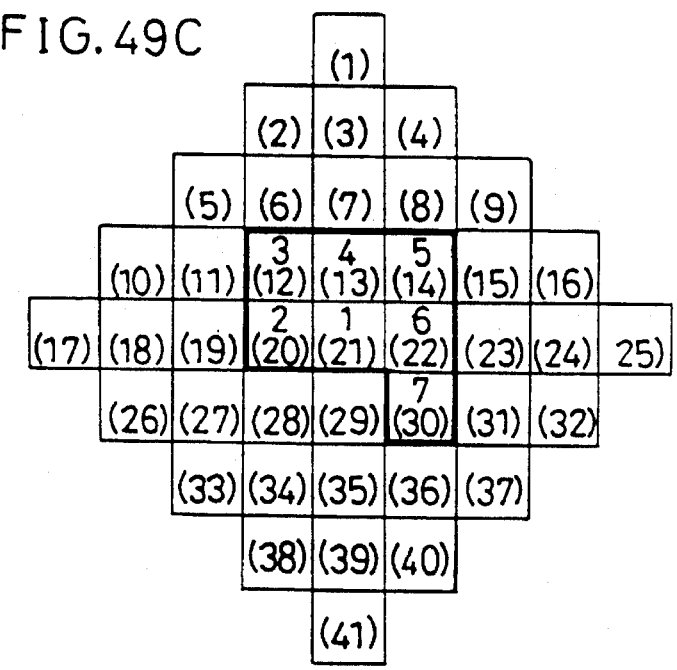

It is assumed also that beams are composed as shown in FIG. 49A. Beam numbers (numerals in parentheses) are affixed to the respective beams. When all the beams are emitted, the largest matrix (formed of 41 dots in FIG. 49A) is formed. When a dot matrix is identified to have seven dots arranged and numbered as shown in FIG. 49B, the dot numbers are allotted to beam numbers as shown in FIG. 49C. In FIG. 49C, the beam numbers to which the matrix is allotted are "ON" and the other beam numbers "OFF". The dot number/beam number allotting table 73 outputs "ON" or "OFF" for each beam number. Signal My3 is a result for Y separation applied to control input terminal Ix of multiplexer 6Y. Signal Mm3 is a result for M separation applied to control input terminal Ix of multiplexer 6M. Signal Mc3 is a result for C separation applied to control input terminal Ix of multiplexer 6C. Signal Mk3 is a result for K separation applied to control input terminals Iy of multiplexers 6Y, 6M and 6C, respectively.

When the matrix is allotted as shown in FIG. 49C, the dot density conversion table 62 allots the densities of dot numbers 1 to 7 identified to beam numbers (12), (13), (14), (20), (21), (22) and (30).

Next, it is assumed that, in this embodiment, dots are exposed in lines with nine beams, for example.

In this case, the largest matrix of 9 dots by 9 dots is exposed with nine emissions as shown in FIG. 50A. Thus, in the case of the matrix shown in FIG. 4B, the dots are allotted to beam numbers (4), (5) and (6) of the beams in the fourth emission, beam numbers (4), (5) and (6) of the beams in the fifth emission, and beam number (6) of the beams in the sixth emission. Data for respective lines are stored in a line buffer not shown, to emit the beams successively.

In response to "ON" and "OFF" states inputted to control input terminals Ix and Iy, the multiplexers 6Y, 6M and 6C select one of input terminals Ia–Id for each beam number. The selection control for each beam number is the same as in the first embodiment.

Output signals (applied voltages) of the multiplexers 6Y, 6M and 6C are applied to AOMs 8Y, 8M and 8C, respectively, whereby dots corresponding to one cell are exposed on the photosensitive material F.

These dots are exposed in exposure positions corresponding to the cell engraving positions by controlling the rotary cylinder 14 according to rotating velocity RY' and moving velocity SX' in the auxiliary scanning direction of rotary cylinder 14 determined by the control unit 81 as described hereinbefore.

In order to synchronize signal output timing of multiplexers 6Y, 6M and 6C and timing of rotation and movement in the auxiliary scanning direction of rotary cylinder 14, the control unit 81 causes the coloring density identifier 60 and ON/OFF checker 70 to start computation after the rotary cylinder 14 is rotated and moved in the auxiliary scanning direction according to cell engraving positions.

In this embodiment, "ON" and "OFF" states of the dots forming a dot matrix determined by ON/OFF checker 70 provide a pattern for each cell. A halftone image corresponding to cell patterns formed on gravure printing cylinders may be exposed on the photosensitive material F by adjusting exposure positions of the dot matrices according to cell engraving positions.

Thus, in this embodiment, the type of scanning, oscillating cycle of the engraving head, rotating velocity of the cylinder, moving velocity in the auxiliary scanning direction of the engraving head (in spiral scanning) and amount of stepped feed in the auxiliary scanning direction of the engraving head (in stepped feed scanning) correspond to the scanning conditions according to the present invention. Cell shapes determined by the cell forming conditions and engraving positions determined by the scanning conditions correspond to the cell patterns according to the present invention. The ON/OFF checker 70, multiplexers 6Y, 6M and 6C and control unit 81 correspond to the exposure control device of the present invention.

With the apparatus constructed as above, density tones corresponding to the shapes of cells are simulated, and dots corresponding to the cells are exposed in positions corresponding to the cell engraving positions. Consequently, a proof created has the same finish as production prints.

This image proofing apparatus may be connected to the engraving machine.

In this case, the interface circuit 1 receives the image data used in the engraving machine for identifying engraving depths. These image data are transmitted in lots each corresponding to one cell and one cycle of sine oscillation of the stylus. Thus, cycle data of sine oscillation of the stylus is applied to the control unit 81, so that the control unit 81 effects movement of the rotary cylinder 14 and computation by the coloring density identifier 60 and ON/OFF checker 70 synchronously with input timing of the image data. The information set through the setter 80, such as the type of scanning, type of the stylus, oscillating cycle of the engraving head, rotating velocity of the cylinder, moving velocity in the auxiliary scanning direction of the engraving head, and amount of stepped feed in the auxiliary scanning direction of the engraving head, is supplied from the engraving machine to the control unit 81.

Eleventh Embodiment

An eleventh embodiment of the present invention will be described next with reference to FIG. 51.

The apparatus in the eleventh embodiment also is used to create a color proof image on a photosensitive material (negative) for prints to be made with printing cylinders prepared by the electronic engraving system.

Like reference numerals are used to identify like parts in the foregoing drawings, which are the same as in the foregoing embodiments and will not be described again.

The characterizing feature of the eleventh embodiment lies in simplification of the process of identifying coloring densities of dots by the coloring density identifier 60 and checking of "ON" and "OFF" states by the ON/OFF checker 70 in the tenth embodiment.

Figure 52:
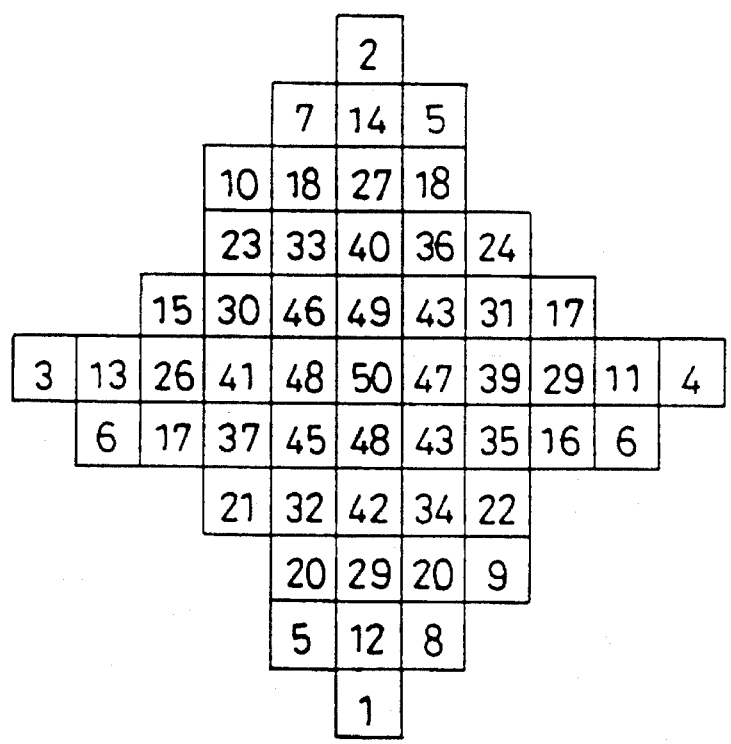
FIGS. 52 and 53 are views used for explaining a principle of the eleventh embodiment.

First, a dot matrix (hereinafter referred to as maximum matrix) corresponding to a cell of maximum density is prepared and densities are allotted to the dots. One example is shown in FIG. 52. As seen, the dot in the center has the greatest density (density value: 50), with the densities diminishing toward peripheries. This maximum dot matrix is variable with the shape of cells engraved on a printing cylinder.

The densities of image data and the maximum density of dots are proportional to the relationship shown in FIG. 39. The maximum density of dots with respect to the densities of image data for forming the largest cell is referred to herein as "Dmax". Where, for example, the densities of image data are expressed in 256 tones, the maximum density Dmax of dots with respect to the maximum density (256) of image data is 50 in the example shown FIG. 52.

If maximum density of dots is Da (Da≦Dmax) with respect to the densities of image data inputted, DA is derived from the following equation:

$$Dmax - Da = DA \quad (10)$$

Further, a difference between density Di ("i" being 1 to the number of dots in the dot matrix, which is 1 to 53 in the example shown in FIG. 52) and DA derived from equation (10) is derived from the following equation (11):

$$Di - DA = Dxi \quad (11)$$

where "i" in Dxi is 1 to the number of dots in the dot matrix, which is 1 to 53 in the example shown in FIG. 52.

The dots having densities Dxi found to be 0 or below do not form a dot matrix.

Figure 53:
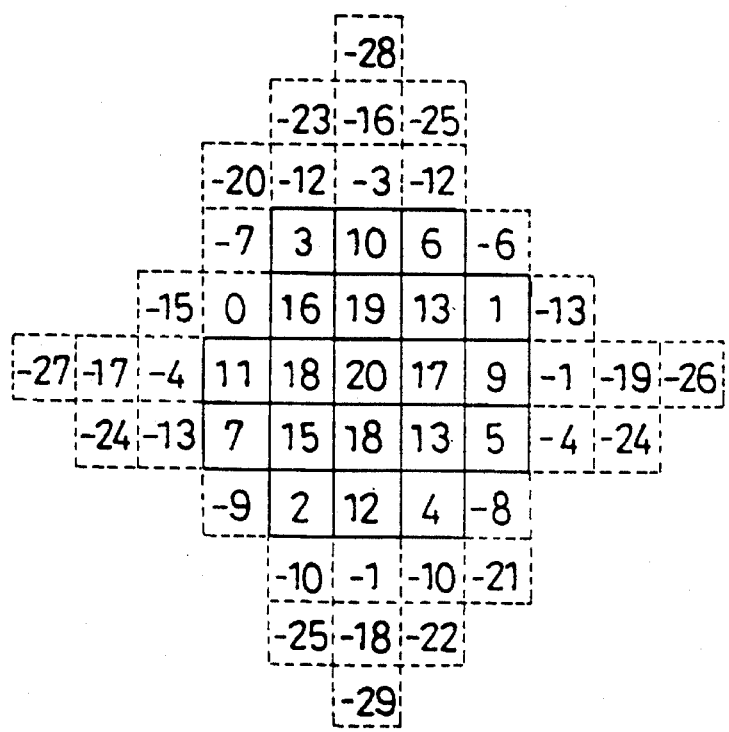

Assume, for example, that the image data are in 256 tones, Dmax is 50, density of image data inputted is 100, and the maximum density of dots then is 20. In this case, DA is 30 (50–20) according to equation (10) above. Then, a difference between density Di of each dot and DA (30) is derived from equation (11) above. When a dot matrix is formed only with the dots having densities exceeding zero, the dot matrix of FIG. 52 becomes one as shown in FIG. 53. The dots in dotted lines in FIG. 53 do not form the dot matrix. The calculations based on equations (10) and (11) result in a density determining process similar to the extraction of area B from FIG. 41 for representation in FIG. 42 as described in the tenth embodiment.

After the calculations based on equations (10) and (11), the dots not exceeding zero may be treated as "OFF" and the dots exceeding zero as "ON". This enables checking of "ON" and "OFF" for the dots to be carried out simultaneously.

The apparatus in the eleventh embodiment is constructed to employ the above principle in the process of determining the densities of dots and in checking of "ON" and "OFF" for the dots.

The image data/maximum density point identifier table 61 determines maximum density point data Ny, Nm, Nc and Nk, and applies these data to a signal regulator (sig. regul.) 63.

The signal regulator 63 stores a plurality of maximum dot matrices corresponding to different cell shapes. The signal regulator 63 carries out the calculations of equations (10) and (11), using a maximum dot matrix corresponding to a cell shape determined by the control unit 81 based on information set through the setter 80, and maximum density point data Ny, Nm, Nc and Nk received from the image data/maximum density point identifier table 61. Results of the calculations are applied to the signal editing circuit 5 and ON/OFF checker 74.

The signal editing circuit 5 edits the above results for the respective dots and generates signals for application to input terminals Ia–Ic of multiplexers 6Y, 6M and 6C. The multiplexers 6Y, 6M and 6C receive ground voltage GND at input terminals Id thereof.

The ON/OFF checker 74 regards the dots not exceeding zero as "OFF" and the dots exceeding zero as "ON", and applies these signals to control input terminals Ix and Iy of multiplexers 6Y, 6M and 6C.

In response to "ON" and "OFF" states inputted to control input terminals Ix and Iy, the multiplexers 6Y, 6M and 6C select one of the signals inputted to input terminals Ia–Id. At this time, ground voltage GND is selected for the dots having densities not exceeding zero, which are determined as a result of processing at the signal regulator 63. The dots and beam numbers of the maximum dot matrix are set in advance.

The other aspects of this embodiment are the same as in the tenth embodiment, and will not be described here.

In this embodiment, the image data/maximum density point identifier table 61 and signal regulator 63 correspond to the coloring density identifying device of the present invention. The ON/OFF checker 74, multiplexers 6Y, 6M and 6C and control unit 81 correspond to the exposure control device of the present invention.

Twelfth Embodiment

A twelfth embodiment of the present invention will be described next with reference to FIG. 54.

As in the tenth embodiment, the apparatus in the eleventh embodiment is used to create a color proof image on a photosensitive material (negative) for prints to be made with printing cylinders prepared by the electronic engraving system. In this embodiment, the apparatus in the tenth embodiment is adapted to compensate for an additive failure occurring when superposing chromatic and achromatic colors. Like reference numerals are used to identify like parts in the foregoing drawings, which are the same as in the second and tenth embodiments and will not be described again.

Figure 54:
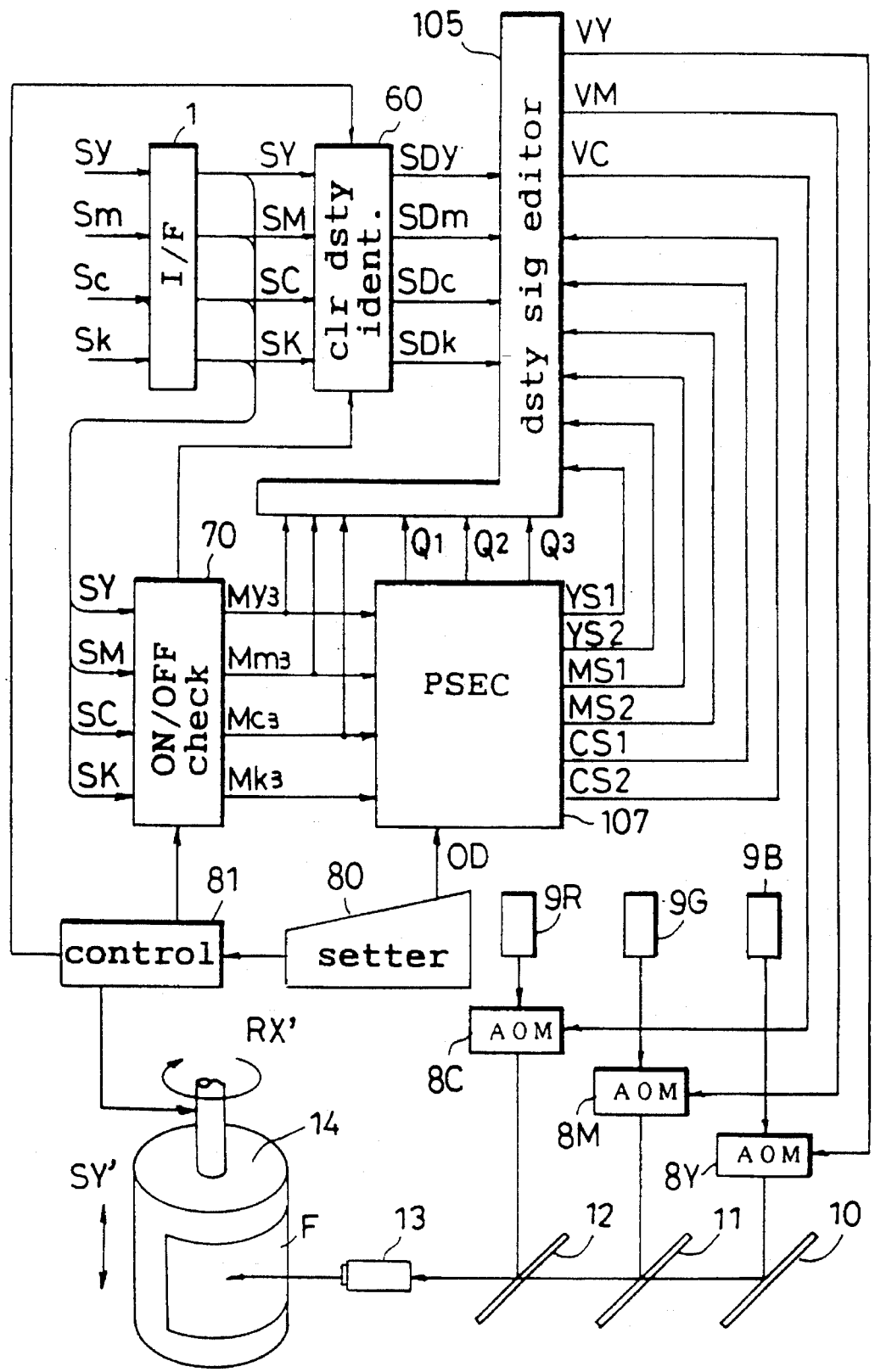
FIG. 54 is a block diagram of a color image proofing apparatus in a twelfth embodiment of the present invention.

FIG. 54 shows a specific construction of this embodiment. As in the second embodiment relative to the first embodiment, a density signal editing circuit 105 is provided in place of the signal editing circuit 5 and multiplexers 6Y, 6M and 6C of the tenth embodiment (see FIG. 45). A pattern signal editing circuit 107 is added to the tenth embodiment.

Coloring densities are edited as in the second and tenth embodiments. The selection control signals are edited based on signals My3, Mm3, Mc3 and Mk3 outputted from ON/OFF checker 70.

With the above construction, a color proof image with a compensation for additivity failure is created for prints made with cylinders prepared by the electronic engraving system.

In this embodiment, ON/OFF checker 70, pattern signal editing circuit 107, multiplexers 6Y, 6M and 6C in the density signal editing circuit 105, and control unit 81 correspond to the exposure control device of the present invention.

Thirteenth Embodiment

A thirteenth embodiment of the present invention will be described next with reference to FIG. 55.

As in the eleventh embodiment, the apparatus in the eleventh embodiment is used to create a color proof image on a photosensitive material (negative) for prints to be made with printing cylinders prepared by the electronic engraving system. In this embodiment, the apparatus in the eleventh embodiment is adapted to compensate for an additive failure occurring when superposing chromatic and achromatic colors. Like reference numerals are used to identify like parts in the foregoing drawings, which are the same as in the second and eleventh embodiments and will not be described again.

Figure 55:
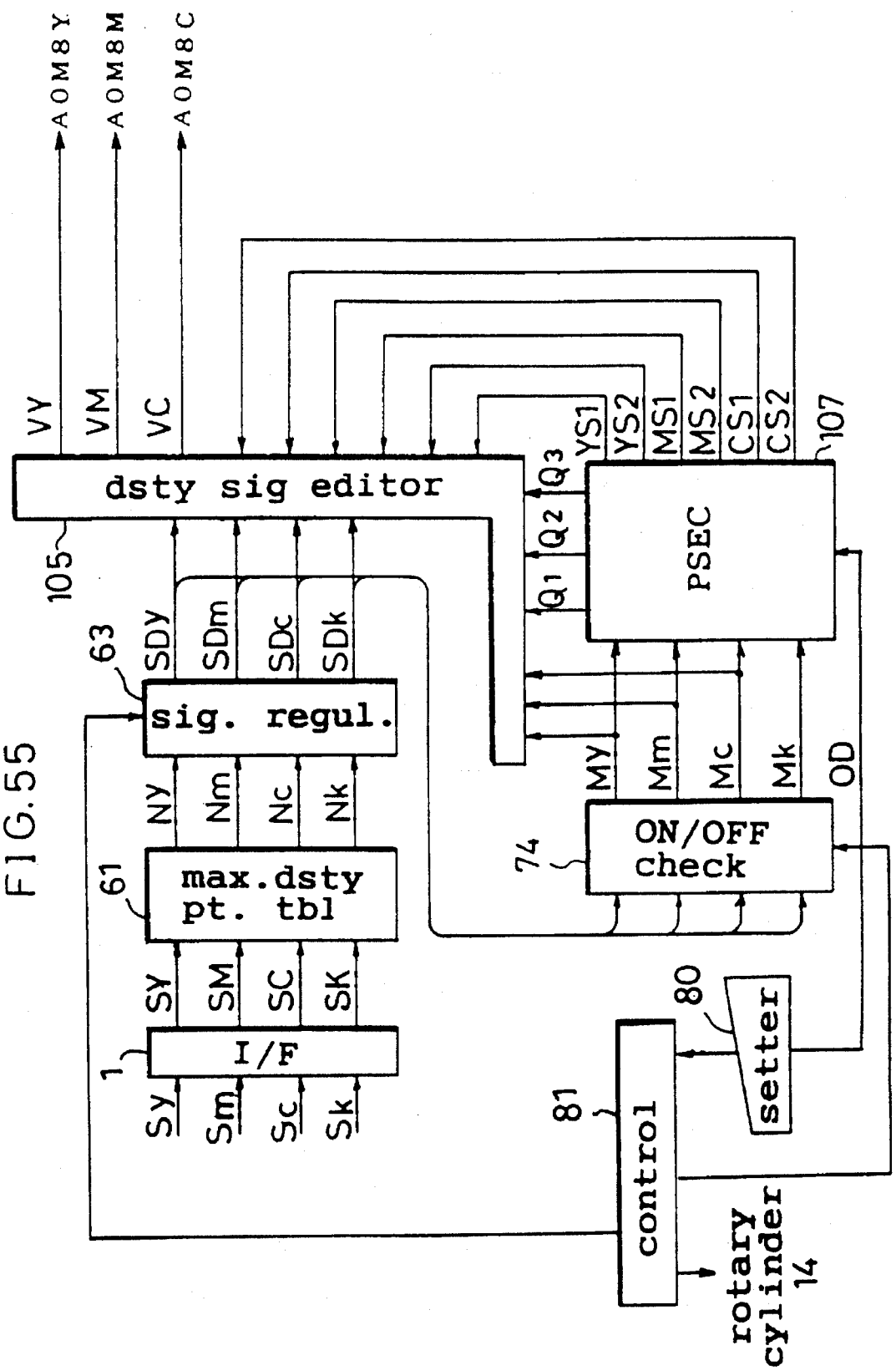
FIG. 55 is a block diagram of a color image proofing apparatus in a thirteenth embodiment of the present invention.

FIG. 55 shows a specific construction of this embodiment. As in the second embodiment relative to the first embodiment, a density signal editing circuit 105 is provided in place of the signal editing circuit 5 and multiplexers 6Y, 6M and 6C of the eleventh embodiment (see FIG. 51). A pattern signal editing circuit 107 is added to the eleventh embodiment.

Coloring densities are edited as in the second and eleventh embodiments. The selection control signals are edited based on signals My, Mm, Mc and Mk outputted from ON/OFF checker 74.

With the above construction, a color proof image with a compensation for additivity failure is created for prints made with cylinders prepared by the electronic engraving system.

In this embodiment, ON/OFF checker 74, pattern signal editing circuit 107, multiplexers 6Y, 6M and 6C in the density signal editing circuit 105, and control unit 81 correspond to the exposure control device of the present invention.

The foregoing embodiments have been described, exemplifying image proofing apparatus for executing the typical gravure printing systems. The present invention is not limited to these embodiments, but is applicable to image proofing apparatus for executing other types of gravure printing systems. Such apparatus may also expose halftone images according to cell patterns, and determine coloring densities according cell forming conditions, following a sequence of preparing printing cylinders. Further, the coloring densities may be adjusted so as to compensate for additivity failure.

In the foregoing embodiments, as described, a proof image is created by exposing a photosensitive material in exposure light patterns corresponding to shapes of cells formed on printing cylinders. Inks used in gravure printing are fluid, and therefore the shapes of inks adhering to paper differ from the shapes of cells on the cylinders. However, viewed in units of cells (or in units of gravure dots in the case of a proof), this presents no problem in practice since the average density of cells in prints corresponds to the average density of gravure dots in a proof. Thus, the proof image may be formed by exposing, the gravure dots corresponding to the cells with a uniform amount of exposure light according to the cell (ink) capacity determined by the cell shape, instead of exposing the photosensitive material with the exposure light pattern corresponding to the cell shape.

Figure 56A:
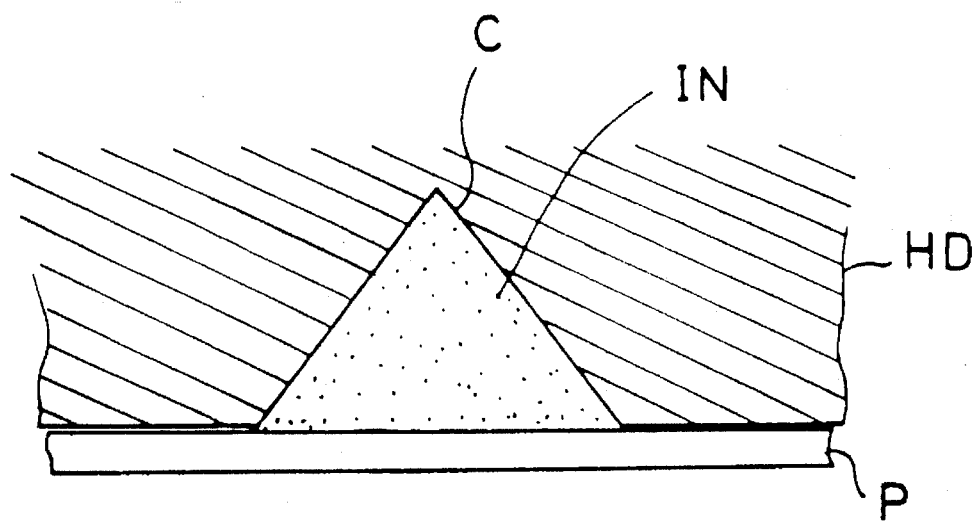
FIGS. 56A and 56B are views showing a relationship between cell shape on a gravure printing cylinder and ink adhesion to paper.
Figure 56B:
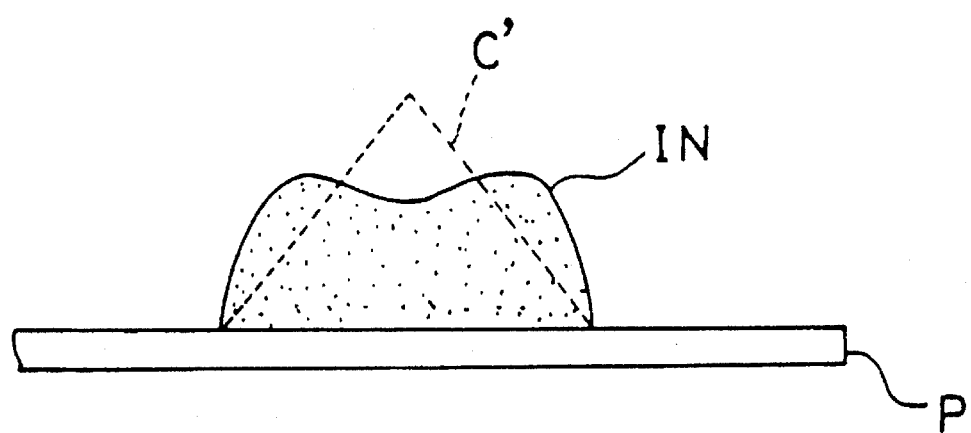

However, to obtain a proof with a higher degree of faithfulness to prints, the exposure light pattern for forming the proof image may be determined by taking into account the shapes of cells on the printing cylinders and the shapes of inks adhering to paper in time of gravure printing. In the electronic engraving system, for example, cell C formed on a printing cylinder HD may have a quadrangular pyramid shape as shown in FIG. 56A. In this case, as shown in FIG. 56B, gravure printing results in ink IN adhering to paper P in larger quantities in peripheral regions than at the center. Thus, the photosensitive material maybe exposed with an exposure light pattern taking this ink adhering pattern into account.

The foregoing embodiments have been described, in which color proofs are created. The first, third, fourth, sixth, eighth, tenth and eleventh embodiments may be used to create proofs for monochromatic prints. Such proofs may be created according to similar cell forming conditions to express density tones.

The constructions in the second, fifth, seventh, ninth, twelfth and thirteenth embodiments have been described by way of example only. The apparatus in these embodiments may be constructed otherwise as long as halftone images are exposed according to cell patterns following the sequence of preparing printing cylinders by the respective platemaking systems, and a compensation is effected for the additivity failure occurring in superposed printing.

In each of the foregoing embodiments, a color proof is created according to the predetermined cell forming conditions, for use in confirmation of a finished state of prints. The apparatus in these embodiments may be used also for determining optimal cell (cylinder) forming conditions. That is, the setter 4 (33 or 80) may be operated to adjust the cell forming conditions until a proof of optimal finish is obtained. The cell forming conditions resulting in the proof of optimal finish are used to prepare the cylinders, thereby to realize prints having a desired finish.

The present invention may be embodied in other specific forms without departing from the spirit or essential attributes thereof and, accordingly, reference should be made to the appended claims, rather than to the foregoing specification, as indicating the scope of the invention.

What is claimed is:

1. An image proofing apparatus for gravure printing, in which halftone images with coloring densities adjusted according to conditions for forming cells on a gravure cylinder are exposed on a photosensitive material in cell patterns on the cylinder to record a proof image on the photosensitive material, said apparatus comprising:

light sources for emitting light beams to expose said halftone images on said photosensitive material;

light quantity modulating means for modulating quantity of said light beams;

coloring density identifying means for identifying coloring densities of said halftone images according to conditions for forming cells on said gravure cylinder;

modulating information identifying means for identifying, according to said coloring densities, modulating information to be applied to said light quantity modulating means; and exposure control means for causing the light beams modulated by said light quantity modulating means based on said modulating information to expose said halftone images on said photosensitive material in said cell patterns on said gravure cylinder.

2. An image proofing apparatus for gravure printing as defined in claim 1, further comprising density distributing means for distributing a coloring density of an achromatic K (black) separation to coloring densities of chromatic Y (yellow), M (magenta) and C (cyan) separations, wherein:

said light sources are operable to emit light beams of B (blue), G (green) and R (red) which are complementary colors of the three chromatic colors;

said light quantity modulating means is operable to modulate said light beams of R, G and B;

said coloring density identifying means is operable to identify the coloring densities of halftone images of the three chromatic and one achromatic color separations according to conditions for forming cells on gravure cylinders for said three chromatic and one achromatic color separations;

said modulating information identifying means is operable to identify, according to said coloring densities of said three chromatic color separations identified by said coloring density identifying means with the coloring density of said achromatic color separation distributed by said density distributing means, modulating information on said three chromatic color separations to be applied to said light quantity modulating means; and said exposure control means is operable to cause the light beams of B, G and R modulated by said light quantity modulating means based on said modulating information to expose said halftone images on said photosensitive material in cell patterns on said gravure cylinders for said three chromatic and one achromatic color separations;

whereby a color proof image for color gravure printing is recorded on said photosensitive material.

3. An image proofing apparatus for gravure printing as defined in claim 2, wherein said coloring density identifying means comprises:

input means for inputting said conditions for forming cells on said gravure cylinders for said three chromatic and one achromatic color separations; and conversion tables for storing a plurality of relationships of the coloring densities of the respective color separations to said conditions for forming cells;

whereby said coloring density identifying means derives the coloring densities for the respective color separations from said conversion tables according to said conditions for forming cells inputted through said input means.

4. An image proofing apparatus for gravure printing as defined in claim 2, further comprising coloring density adjusting means for decreasing the coloring densities identified by said coloring density identifying means to expose halftone positions (dots) corresponding to areas of superposition of said color separations, by amounts of density lowered by additivity failure occurring with the superposition of said color separations.

5. An image proofing apparatus for gravure printing as defined in claim 4, wherein:

said coloring density adjusting means is operable to decrease coloring density of one of said Y, M and C separations superposed on said K separation when exposing dots corresponding to areas of superposition of a chromatic color separation (i.e. at least one of Y, M and C separations) on said K separation, by an amount of density lowered by additivity failure occurring with the superposition of said one of said Y, M and C separations on said K separation, and to decrease coloring density of said K separation when exposing dots corresponding to areas of superposition of said K separation on said chromatic color separations, by an amount of density lowered by additivity failure occurring with the superposition of said K separation on one of said Y, M and C separations;

said density distributing means comprises:

K/YMC conversion means for converting the coloring density of said K separation into chromatic Y, M and C components; and color adding means for adding coloring densities of said Y, M and C separations including the coloring density of one of said Y, M and C separations adjusted by said coloring density adjusting means, and coloring densities of said Y, M and C components of said K separation converted by said K/YMC conversion means, for dots corresponding to areas of superposition of said chromatic color separations on said K separation, and adding the coloring densities of said Y, M and C components converted by said K/YMC conversion means from the coloring density of said K separation adjusted by said coloring density adjusting means, and the coloring densities of said Y, M and C separations, for dots corresponding to areas of superposition of said K separation on said chromatic color separations; and said exposure control means is operable to expose said photosensitive material with the densities added by said color adding means, for the dots corresponding to the areas of superposition of said K separation and said chromatic color separations.

6. An image proofing apparatus for gravure printing as defined in claim 3, further comprising coloring density adjusting means for decreasing coloring densities identified by said coloring density identifying means to expose halftone positions (dots) corresponding to areas of superposition of said color separations, by amounts of density lowered by additivity failure occurring with the superposition of said color separations.

7. An image proofing apparatus for gravure printing as defined in claim 6, wherein:

said coloring density adjusting means is operable to decrease coloring density of one of said Y, M and C separations superposed on said K separation when exposing dots corresponding to areas of superposition of a chromatic color separation (i.e. at least one of Y, M and C separations) on said K separation, by an amount of density lowered by additivity failure occurring with the superposition of said one of said Y, M and C separations on said K separation, and to decrease coloring density of said K separation when exposing dots corresponding to areas of superposition of said K separation on said chromatic color separations, by an amount of density lowered by additivity failure occurring with the superposition of said K separation on one of said Y, M and C separations;

said density distributing means comprises:

K/YMC conversion means for converting the coloring density of said K separation into chromatic Y, M and C components; and color adding means for adding coloring densities of said Y, M and C separations including the coloring density of one of said Y, M and C separations adjusted by said coloring density adjusting means, and coloring densities of said Y, M and C components of said K separation converted by said K/YMC conversion means, for dots corresponding to areas of superposition of said chromatic color separations on said K separation, and adding the coloring densities of said Y, M and C components converted by said K/YMC conversion means from the coloring density of said K separation adjusted by said coloring density adjusting means, and the coloring densities of said Y, M and C separations, for dots corresponding to areas of superposition of said K separation on said chromatic color separations; and said exposure control means is operable to expose said photosensitive material with the densities added by said color adding means, for the dots corresponding to the areas of superposition of said K separation and said chromatic color separations.

8. An image proofing apparatus for gravure printing as defined in claim 4, wherein:

said coloring density identifying means is operable to identify coloring densities of halftone images of said color separations according to image data having the same density tones as continuous tone positives of said color separations, and chemical conditions for preparing cells on cylinders for said color separations, which are conditions for forming the cells on gravure printing cylinders of said three chromatic and one achromatic color separations in conventional gravure platemaking; and said exposure control means is operable to cause said light beams of B, G and R modulated by said light quantity modulating means based on said modulating information to expose said halftone images on said photosensitive material according to patterns of gravure screens with an overall screen pattern of said color separations and arranging angles of said patterns, which are cell patterns on said gravure cylinders for said three chromatic and one achromatic color separations in said conventional gravure platemaking;

whereby a color proof image is created using the cylinders prepared by said conventional gravure platemaking.

9. An image proofing apparatus for gravure printing as defined in claim 5, wherein:

said coloring density identifying means is operable to identify coloring densities of halftone images of said color separations according to image data having the same density tones as continuous tone positives of said color separations, and chemical conditions for preparing cells on cylinders for said color separations, which are conditions for forming the cells on gravure printing cylinders of said three chromatic and one achromatic color separations in conventional gravure platemaking; and said exposure control means is operable to cause said light beams of B, G and R modulated by said light quantity modulating means based on said modulating information to expose said halftone images on said photosensitive material according to patterns of gravure screens with an overall screen pattern of said color separations and arranging angles of said patterns, which are cell patterns on said gravure cylinders for said three chromatic and one achromatic color separations in said conventional gravure platemaking;

whereby a color proof image is created using the cylinders prepared by said conventional gravure platemaking.

10. An image proofing apparatus for gravure printing as defined in claim 4, wherein:

said coloring density identifying means is operable to identify coloring densities of halftone images of said color separations according to chemical conditions for preparing cells on cylinders for said color separations, which are conditions for forming the cells on gravure printing cylinders of said three chromatic and one achromatic color separations in halftone gravure platemaking by direct gravure system; and said exposure control means is operable to cause said light beams of B, G and R modulated by said light quantity modulating means based on said modulating information to expose said halftone images on said photosensitive material according to patterns of halftone gravure positives of said color separations and arranging angles of said patterns, and dot % of cells of said color separations obtained from image data having coloring densities proportional to areas of the cells formed on cylinders used in production printing of said color separations, which are cell patterns on said gravure cylinders for said three chromatic and one achromatic color separations in said halftone gravure platemaking by direct gravure system;

whereby a color proof image is created using the cylinders prepared by said direct gravure system.

11. An image proofing apparatus for gravure printing as defined in claim 5, wherein:

said coloring density identifying means is operable to identify coloring densities of halftone images of said color separations according to chemical conditions for preparing cells on cylinders for said color separations, which are conditions for forming the cells on gravure printing cylinders of said three chromatic and one achromatic color separations in halftone gravure platemaking by direct gravure system; and said exposure control means is operable to cause said light beams of B, G and R modulated by said light quantity modulating means based on said modulating information to expose said halftone images on said photosensitive material according to patterns of halftone gravure positives of said color separations and arranging angles of said patterns, and dot % of cells of said color separations obtained from image data having coloring densities proportional to areas of the cells formed on cylinders used in production printing of said color separations, which are cell patterns on said gravure cylinders for said three chromatic and one achromatic color separations in said halftone gravure platemaking by direct gravure system;

whereby a color proof image is created using the cylinders prepared by said direct gravure system.

12. An image proofing apparatus for gravure printing as defined in claim 4, wherein:

said coloring density identifying means is operable to identify coloring densities of halftone images of said color separations according to image data having the same density tones as a continuous-tone positive of each color separation and chemical conditions for preparing cells on cylinders for said color separations, which are conditions for forming the cells on gravure printing cylinders of said three chromatic and one achromatic color separations in halftone gravure platemaking by two-positive system; and said exposure control means is operable to cause said light beams of B, G and R modulated by said light quantity modulating means based on said modulating information to expose said halftone images on said photosensitive material according to patterns of halftone gravure positives of said color separations and arranging angles of said patterns, and dot % of cells of said color separations obtained from image data having coloring densities proportional to areas of the cells formed on cylinders used in production printing of said color separations, which are cell patterns on said gravure cylinders for said three chromatic and one achromatic color separations in said halftone gravure platemaking by two-positive system;

whereby a color proof image is created using the cylinders prepared by said two-positive system.

13. An image proofing apparatus for gravure printing as defined in claim 5, wherein:

said coloring density identifying means is operable to identify coloring densities of halftone images of said color separations according to image data having the same density tones as a continuous-tone positive of each color separation and chemical conditions for preparing cells on cylinders for said color separations, which are conditions for forming the cells on gravure printing cylinders of said three chromatic and one achromatic color separations in halftone gravure platemaking by two-positive system; and said exposure control means is operable to cause said light beams of B, G and R modulated by said light quantity modulating means based on said modulating information to expose said halftone images on said photosensitive material according to patterns of halftone gravure positives of said color separations and arranging angles of said patterns, and dot % of cells of said color separations obtained from image data having coloring densities proportional to areas of the cells formed on cylinders used in production printing of said color separations, which are cell patterns on said gravure cylinders for said three chromatic and one achromatic color separations in said halftone gravure platemaking by two-positive system;

whereby a color proof image is created using the cylinders prepared by said two-positive system.

14. An image proofing apparatus for gravure printing as defined in claim 4, wherein:

said coloring density identifying means is operable to identify coloring densities of halftone images of said color separations according to image data having density tones proportional to dot % of a halftone offset positive of each color separation, chemical conditions for preparing cells on cylinders for said color separations, and diffusion sheet conditions for forming cells on the cylinder of each color separation, which are conditions for forming the cells on gravure printing cylinders of said three chromatic and one achromatic color separations in halftone gravure (TH gravure) platemaking in which cell patterns are formed on the cylinders by exposing the halftone offset positive through a diffusion sheet; and said exposure control means is operable to cause said light beams of B, G and R modulated by said light quantity modulating means based on said modulating information to expose said halftone images on said photosensitive material according to patterns of halftone offset positives of said color separations and arranging angles of said patterns, the image data having density tones proportional to dot % of said halftone offset positive of each color separation, and patterns of gravure screens with an overall screen pattern of said color separations and arranging angles of said patterns, which are cell patterns on said gravure cylinders for said three chromatic and one achromatic color separations in said TH gravure platemaking;

whereby a color proof image is created using the cylinders prepared by said TH gravure system.

15. An image proofing apparatus for gravure printing as defined in claim 5, wherein:

said coloring density identifying means is operable to identify coloring densities of halftone images of said color separations according to image data having density tones proportional to dot % of a halftone offset positive of each color separation, chemical conditions for preparing cells on cylinders for said color separations, and diffusion sheet conditions for forming cells on the cylinder of each color separation, which are conditions for forming the cells on gravure printing cylinders of said three chromatic and one achromatic color separations in halftone gravure (TH gravure) platemaking in which cell patterns are formed on the cylinders by exposing the halftone offset positive through a diffusion sheet; and said exposure control means is operable to cause said light beams of B, G and R modulated by said light quantity modulating means based on said modulating information to expose said halftone images on said photosensitive material according to patterns of halftone offset positives of said color separations and arranging angles of said patterns, the image data having density tones proportional to dot % of said halftone offset positive of each color separation, and patterns of gravure screens with an overall screen pattern of said color separations and arranging angles of said patterns, which are cell patterns on said gravure cylinders for said three chromatic and one achromatic color separations in said TH gravure platemaking;

whereby a color proof image is created using the cylinders prepared by said TH gravure system.

16. An image proofing apparatus for gravure printing as defined in claim 4, wherein:

said coloring density identifying means is operable to identify coloring densities of halftone images of said color separations according to image data having the same density tones as an original plate of each color separation supplied to an engraving machine, a type of stylus for forming cells on a cylinder of each color separation, and mechanical conditions for forming the cells on said cylinder of each color separation, which are conditions for forming the cells on gravure printing cylinders of said three chromatic and one achromatic color separations in electronic engraving gravure platemaking; and said exposure control means is operable to cause said light beams of B, G and R modulated by said light quantity modulating means based on said modulating information to expose said halftone images on said photosensitive material according to cell shapes determined by the conditions for forming the cells of each color separation, and cell engraving positions on the cylinder of each color separation determined by scanning conditions for forming cells on the cylinder of each color separation, which are cell patterns on said gravure cylinders for said three chromatic and one achromatic color separations in said electronic engraving gravure platemaking;

whereby a color proof image is created using the cylinders prepared by said electronic engraving system.

17. An image proofing apparatus for gravure printing as defined in claim 5, wherein:

said coloring density identifying means is operable to identify coloring densities of halftone images of said color separations according to image data having the same density tones as an original plate of each color separation supplied to an engraving machine, a type of stylus for forming cells on a cylinder of each color separation, and mechanical conditions for forming the cells on said cylinder of each color separation, which are conditions for forming the cells on gravure printing cylinders of said three chromatic and one achromatic color separations in electronic engraving gravure platemaking; and said exposure control means is operable to cause said light beams of B, G and R modulated by said light quantity modulating means based on said modulating information to expose said halftone images on said photosensitive material according to cell shapes determined by the conditions for forming the cells of each color separation, and cell engraving positions on the cylinder of each color separation determined by scanning conditions for forming cells on the cylinder of each color separation, which are cell patterns on said gravure cylinders for said three chromatic and one achromatic color separations in said electronic engraving gravure platemaking;

whereby a color proof image is created using the cylinders prepared by said electronic engraving system.

* * * * *